US009959469B2

(12) United States Patent
Inutsuka

(10) Patent No.: US 9,959,469 B2
(45) Date of Patent: May 1, 2018

(54) OBJECT DISPLAY SYSTEM, MANAGEMENT APPARATUS, AND OBJECT DISPLAY METHOD FOR IDENTIFYING AN ESTIMATED POSITION OF AN OBJECT APPARATUS

(71) Applicant: NEC CORPORATION, Tokyo (JP)

(72) Inventor: Yusuke Inutsuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 14/993,629

(22) Filed: Jan. 12, 2016

(65) Prior Publication Data

US 2016/0203369 A1 Jul. 14, 2016

(30) Foreign Application Priority Data

Jan. 13, 2015 (JP) ................................ 2015-003977

(51) Int. Cl.
*G06K 9/00* (2006.01)
*G06K 9/52* (2006.01)
(Continued)

(52) U.S. Cl.
CPC ..... *G06K 9/00744* (2013.01); *G06K 9/00476* (2013.01); *G06K 9/00671* (2013.01);
(Continued)

(58) Field of Classification Search
None
See application file for complete search history.

(56) References Cited

U.S. PATENT DOCUMENTS 8,131,019 B2 * 3/2012 Miller .............. G07B 17/00661 348/371
2004/0178760 A1 * 9/2004 Kobayashi ............ B60S 1/0822 318/483

(Continued)

FOREIGN PATENT DOCUMENTS

CN 102893307 A 1/2013
EP 2418621 A1 2/2012

(Continued)

OTHER PUBLICATIONS

Communication dated Jun. 8, 2016 issued by the European Patent Office in counterpart application No. 16150830.4.

(Continued)

*Primary Examiner* — Tahmina Ansari
(74) *Attorney, Agent, or Firm* — Sughrue Mion, PLLC

(57) ABSTRACT

An object display system according to an aspect of the present invention includes: management means for generating an object identifier capable of distinguishing an object apparatus to which the object identifier is assigned in a predetermined region; signal information transmitting means for transmitting the object identifier generated, to an object apparatus which is an originating apparatus selected from a plurality of originating apparatuses each sending a signal representing the object identifier; signal detecting means for detecting the signal representing the object identifier transmitted to the object apparatus as an object signal which is a signal to be sent by the object apparatus; identifying means for identifying an origination region from which the object signal is sent in a captured video; and display control means for outputting the video in which a mark is provided on the origination region identified in the video.

9 Claims, 53 Drawing Sheets

(51) Int. Cl.
*G06T 7/60* (2017.01)
*G06K 9/46* (2006.01)
*H04W 4/02* (2018.01)

(52) U.S. Cl.
CPC .................. *G06K 9/52* (2013.01); *G06T 7/60* (2013.01); *G06K 2009/4666* (2013.01); *H04W 4/02* (2013.01)

(56) References Cited

U.S. PATENT DOCUMENTS

| | | | | |
|---|---|---|---|---|
| 2006/0205416 | A1* | 9/2006 | Kayzar | H04M 1/27455 455/456.1 |
| 2007/0048084 | A1 | 3/2007 | Jung et al. | |
| 2008/0180641 | A1* | 7/2008 | Chiang | H04N 5/7408 353/33 |
| 2009/0097703 | A1* | 4/2009 | Miller | G07B 17/00661 382/101 |
| 2009/0295738 | A1* | 12/2009 | Chiang | G06F 3/013 345/173 |
| 2013/0088516 | A1 | 4/2013 | Ota et al. | |
| 2013/0293586 | A1 | 11/2013 | Kaino et al. | |
| 2016/0203369 | A1* | 7/2016 | Inutsuka | G06K 9/00476 382/113 |

FOREIGN PATENT DOCUMENTS

| | | | |
|---|---|---|---|
| JP | 2009-33366 | A | 2/2009 |
| JP | 2012-37919 | A | 2/2012 |
| WO | 2012101720 | A1 | 8/2012 |

OTHER PUBLICATIONS

Communication dated Feb. 9, 2018, issued by the Taiwanese Intellectual Property Office in counterpart application No. 105100771.

* cited by examiner

Fig. 7

| APPARATUS IDENTIFIER | APPARATUS STATUS | | | | | | |
|---|---|---|---|---|---|---|---|
| | EMISSION STATUS | INSTALLATION LOCATION | REQUESTING TERMINAL | NAME | OPERATION STATUS | TYPE | SERVICE |
| ORIGINATING APPARATUS 1 | SIGNAL IDENTIFIER 1 | (X1, Y1) | TERMINAL 1 | APPARATUS 1 | NORMAL | STORAGE DEVICE | |
| ORIGINATING APPARATUS 2 | NO EMISSION | (X2, Y2) | | APPARATUS 2 | FAULTY | INFORMATION PROCESSING DEVICE | |
| ORIGINATING APPARATUS 3 | NO EMISSION | (X3, Y3) | | APPARATUS 3 | NORMAL | VENDING MACHINE | DRINK |
| ORIGINATING APPARATUS 4 | SIGNAL IDENTIFIER 4 | (X4, Y4) | TERMINAL 2 | APPARATUS 4 | NORMAL | VENDING MACHINE | PHOTO PRINTING |
| ⋮ | | | | | | | |

OBJECT DISPLAY SYSTEM, MANAGEMENT APPARATUS, AND OBJECT DISPLAY METHOD FOR IDENTIFYING AN ESTIMATED POSITION OF AN OBJECT APPARATUS

This application is based upon and claims the benefit of priority from Japanese Patent Application No. 2015-003977, filed on Jan. 13, 2015, the disclosure of which is incorporated herein in its entirety by reference.

TECHNICAL FIELD

The present invention relates to a technique of identifying the position of an object using an image.

BACKGROUND ART

A concept called Internet of Things (IoT) has been proposed recently in which various things are connected to the Internet. It is expected that various things are to be connected the Internet and that the number of things connected to the Internet will increase at an increasingly fast rate. There is a prediction that the number of IoT devices will exceed 26 billion units by the year 2020.

Examples of "things" here include not only IT (Internet Technology) equipment such as computers but also household electric appliances, kiosk terminals, automobiles, lighting apparatuses, and various types of sensors installed in buildings and streets. Not only these things, but anything in the real can be "things" in IoT.

As many things in the real world is connected to communication networks, there will be situations in which it is difficult for a user to identify a "thing" in the real world although the user can identify the "thing" by an identifier on a communication network and can communicate with the "thing". A communication network will be hereinafter also simply referred to as a network.

PTL 1 describes a home information appliance operation system that recognizes, in a video, a marker in which an ID (Identification) is represented by a pattern of blinking of a light source such as an LED (Light Emitting Diode). The ID in PTL 1 is a MAC (Media Access Control) address or an IP (Internet Protocol) address, for example.

PTL 2 describes an optical marker system in which an LED marker implemented by an LED that blinks in a unique blinking pattern is detected in an image captured by a camera. The LED marker system described in PTL 2 estimates the position of the camera that captured an image of an LED marker on the basis of the position of the LED marker in a space in which the image was captured and the position of the LED marker detected in an image.

CITATION LIST

Patent Literature

PTL 1: Japanese Laid-open Patent Publication No. 2012-037919

PTL 2: Japanese Laid-open Patent Publication No. 2009-033366

SUMMARY

One of the objects of the present invention is to provide an object display system that is capable of minimizing the increase in the time required for recognizing an object based on a signal emitted by an object even when the number of objects increases.

An object display system according to an aspect of the present invention includes: management means for generating an object identifier capable of distinguishing an object apparatus to which the object identifier is assigned in a predetermined region; signal information transmitting means for transmitting the object identifier generated, to an object apparatus which is an originating apparatus selected from a plurality of originating apparatuses each sending a signal representing the object identifier, in response to reception of the object identifier; signal detecting means for detecting the signal representing the object identifier transmitted to the object apparatus as an object signal which is a signal to be sent by the object apparatus, on the basis of on a sensing result by a sensor detecting the signal; identifying means for identifying an origination region from which the object signal is sent in a captured video; and display control means for outputting the video in which a mark is provided on the origination region identified in the video.

A management apparatus according to an aspect of the present invention includes: instructions receiving means for receiving an object apparatus identifier from a terminal apparatus transmitting the object apparatus identifier, the object apparatus identifier identifying an object apparatus which is an originating apparatus selected from originating apparatuses sending a signal representing the object identifier, in response to reception of the object identifier capable of distinguishing the object apparatus to which the object identifier is provided in a predetermined region; and signal information transmitting means for transmitting the object identifier generated by the management means which generates the object identifier to the object apparatus, wherein the signal information transmitting means further transmits the object identifier to the terminal apparatus, and the terminal apparatus captures a video, detects the signal representing the object identifier on the basis of a sensing result by a sensor which senses the signal in response to reception of the object identifier, identifies a part in which the signal detected is sent in the video captured, and outputs the video in which a mark is provided on the part specified.

An object display method according to an aspect of the present invention includes: generating an object identifier capable of discriminating an object apparatus to which the object identifier is assigned in a predetermined region; transmitting the object identifier generated, to an object apparatus which is an originating apparatus selected from a plurality of originating apparatuses each sending a signal representing the object identifier, in response to reception of the object identifier; detecting the signal representing the object identifier transmitted to the object apparatus as an object signal which is a signal to be sent by the object apparatus, on the basis of on a sensing result by a sensor detecting the signal; identifying an origination region from which the object signal is sent in a captured video; and outputting a video in which a mark is provided on the origination region specified in the video.

A management program according to an aspect of the present invention causes a computer to execute: instructions receiving processing of receiving an object apparatus identifier from a terminal apparatus transmitting the object apparatus identifier, the object apparatus identifier identifying the object apparatus which is an originating apparatus selected from the originating apparatuses transmitting a signal indicating the object identifier, in response to reception of the object identifier capable of distinguishing the object apparatus to which the object identifier is assigned in a predetermined region; and signal information transmitting processing of transmitting the object identifier generated by a management means which generates the object identifier to the object apparatus, wherein the signal information transmitting processing further transmits the object identifier to the terminal apparatus, and the terminal apparatus captures a video, detects the signal representing the object identifier on the basis of a sensing result by a sensor which senses the signal in response to reception of the object identifier, identifies a part in which the signal detected is sent in the video captured, and outputs the video in which a mark is provided on the part identified.

BRIEF DESCRIPTION OF THE DRAWINGS

Exemplary features and advantages of the present invention will become apparent from the following detailed description when taken with the accompanying drawings in which:

FIG. 7 is a drawing illustrating an example of an apparatus status stored in an apparatus information storage unit of each exemplary embodiment of the present invention;

EXEMPLARY EMBODIMENT

Figure 1:
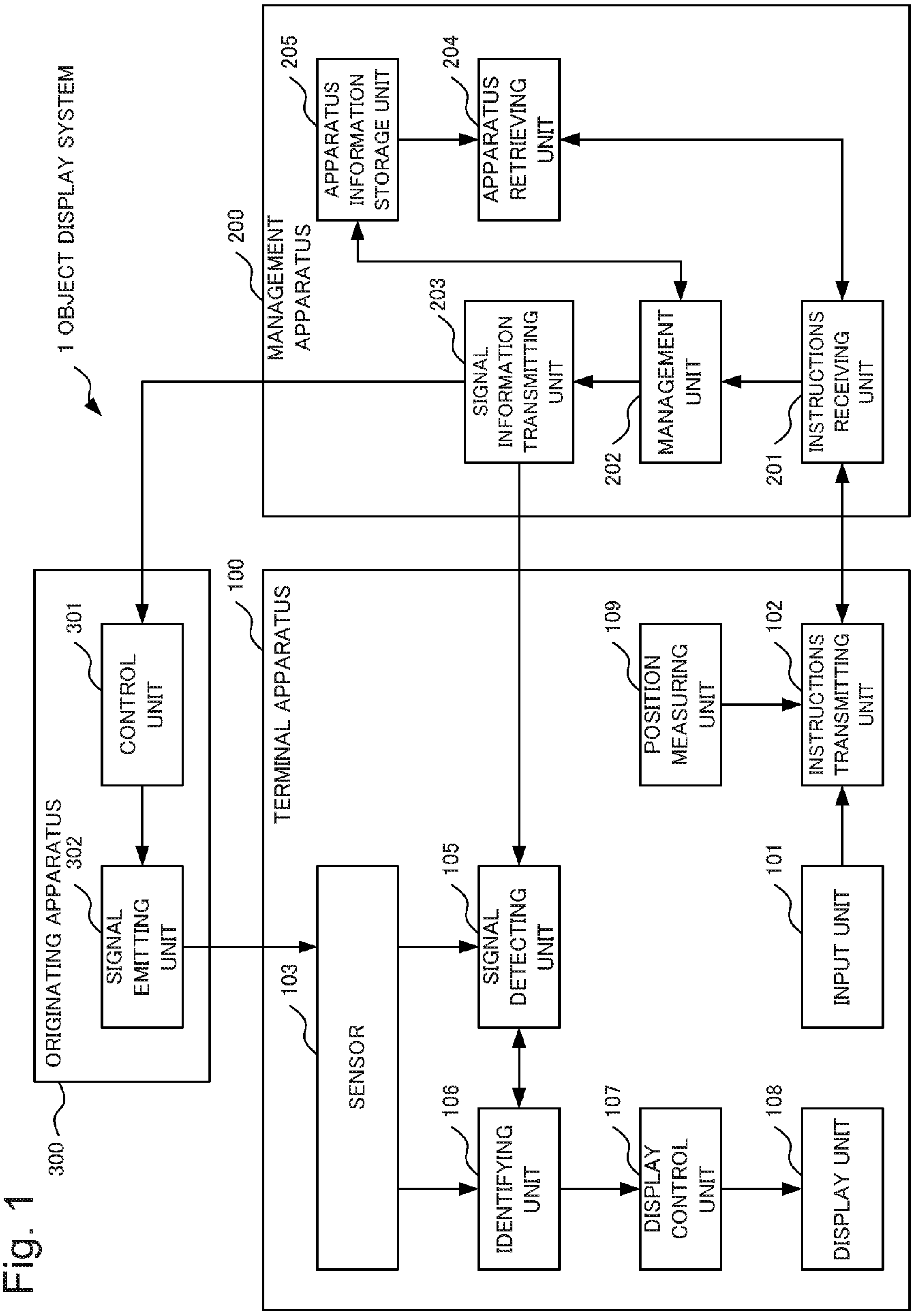
FIG. 1 is a block diagram illustrating a configuration of an object display system according to first and second exemplary embodiments of the present invention.

As described above, the concept called Internet of Things (IoT) has been proposed and various "things" are connected to the Internet. As the number of things connected to the Internet increases, it will be difficult for users to find and identify "things" in the real world that the users have identified on a network.

To indicate the real-world position of such a "thing" that has been identified on a network (i.e. an electronically found "thing"), Augmented Reality (AR) technology is useful.

Augmented Reality (AR) is technology that augments, by a computer, a real environment perceived by humans. A device based on the augmented reality technology generally superimposes an electronically generated image on a real-time video of the real world captured by a camera and displays the video with the superimposed image on a display. Alternatively, a device based on the augmented reality technology renders an electronically generated image on a see-through screen of a display to superimpose the electronically generated image on a real scene behind the see-through screen. A user can acquire additional information that cannot be acquired through a real video alone in real time by viewing such a display.

Augmented reality broadly falls into two types: position-information-based and image-recognition-based.

In the position-information-based augmented reality, GPS (Global Positioning System), a wireless network and the like is used to locate the current position of a user. The coordinates of an object for which information is to be displayed is retrieved from a database or the like. The position of the object on a display is calculated on the basis of relative positions of the user and the object and the attitude of the user acquired with an electronic compass. Information about the object, for example, is superimposed on an image of the object on a display. This method is most often used for searching for landmarks and shops. However, the precision of the position in which an object is displayed on the display is dependent of precision of positioning with GPS and the like. The precision of positioning with GPS or the like is not high enough to pinpoint the position of an object smaller than buildings and the like. The position-information-based augmented reality is therefore not suitable for object-level information presentation. However, the position-information-based augmented reality has an advantage over the image-recognition-based augmented reality in that the position-information-based augmented reality is able to present a broad direction of an object to a user when the object is not in the sight of the user. The position-information-based augmented reality can therefore be used as a supplement to the image-recognition-based augmented reality.

In the image-recognition-based augmented reality, an object for which information is to be displayed is recognized in a captured image. Information about the object, for example, is superimposed on the position of the recognized object in the captured image. The object is recognized by detecting a pattern that is characteristic of the object. The position in which the pattern characteristic to the object is detected is identified as the position of the object. Patterns that are detected include the shape of the object itself, a two-dimensional code tag attached to the object, and a one-dimensional blinking pattern of light emitted from a source such as an LED.

However, the method of recognizing an object by detecting the shape of an object itself has a lower precision than other methods. Another problem with the method of recognizing an object by detecting the shape of the object itself is that an object to be recognized cannot be distinguished from other objects that have the same shape as the object to be recognized in a situation in which there are many objects having the same shape. The method of recognizing an object by detecting a two-dimensional code tag involves attaching a two-dimensional code tag to every object to be recognized. If many things can be objects to be recognized as in IoT, a two-dimensional code tag needs to be attached to every object to be recognized (i.e. every thing). However, attaching a two-dimensional code tag to everything as an object to be recognized is unrealistic. Another problem is that if a two-dimensional code tag is attached to everything, the scenery will be impaired.

Therefore, the method of recognizing an object by detecting a one-dimensional blinking light pattern generated by blinking an LED or the like is suitable for the field addressed by the present invention. This is because the method of recognizing by detecting a blinking pattern of an LED or the like does not impair the appearance of an object while recognition processing is not performed. In addition, the method is flexible since a light emission pattern can be controlled by software. Another advantage of the method is low additional cost because almost all electronic apparatuses are equipped with an LED as an indicator device.

Object display systems according to exemplary embodiments of the present invention are systems that use augment reality technology to aid a user in identifying in the real world a “thing” that the user has identified on a network.

A specific usage scene may be a case where a thing that needs to be replaced among maintained things such as terminals, lighting apparatuses, and sensors that is indicated to a person such as maintenance worker. In this case, the thing that needs to be replaced is probably faulty and unable to communicate and emit light. To address this, another thing that is located near the thing may be caused to emit light in the real world and the thing that is located near the thing that needs to be replaced may be recognized.

A second usage scene may be a case in which a real thing that provides a service is indicated to a user who uses the service provided by the thing. In this case, the user searches for the thing that provides the service through the Internet, for example, in advance in a place where the user can access the Internet. The user selects the thing that provides the service from among candidate things found by the search. In order to receive the service, the user accesses the selected thing that provides the service. Specifically, the user goes to the place where the selected thing is located in the real world. At this time, the object display system described above indicates to the user the real-world position of the thing that provides the service. If preparation for providing the service takes a while, the user may use the Internet, for example, to request the service from the thing selected by the user to receive the service. When the thing that provides the service is selected on the Internet by the user, the thing that provides the service may start preparation for the service to be provided to the user in response to the request for the service. An example of the second usage scene is the use of a vehicle reserved in car sharing. A user may reserve a vehicle through the Internet and may use the object display system of the present exemplary embodiment to check the reserved car when using the vehicle. Another example of the second usage scene is requesting for printing of photographs through the Internet. A user may request printing of photographs through the Internet and may use the object display system of the present exemplary embodiment to search for a terminal that has output the photographs when receiving the photographs. Another example of the second usage scene is placement of an order for a cup of coffee or the like with a vending machine through the Internet. The user may order in advance food, drink or the like that takes time to prepare, such as coffee that requires time to drip from the vending machine. The vending machine may further acquire information about the position of the user at the time of the advance order. The vending machine may estimate the time at which the user will arrive at the location of the vending machine on the basis of the acquired position information and may prepare the food or drink ordered by the user in advance so that the preparation of the food or drink is completed at the estimated time. The user may use the object display system of the present exemplary embodiment to search for the vending machine that prepares the food or drink.

A third usage scene is navigation of a user. The object display system of the present exemplary embodiment may use an LED or the like of equipment located close to a route to a destination (for example a thing specified by the user) to navigate the user.

Exemplary embodiments will be described below by taking the usage scenes given above as examples.

First Exemplary Embodiment

A first exemplary embodiment of the present invention will be described below in detail with reference to drawings.

FIG. 1 is a block diagram illustrating a configuration of an object display system 1 according to the present exemplary embodiment. Referring to FIG. 1, the object display system 1 of the present exemplary embodiment includes a terminal apparatus 100, a management apparatus 200, and one or more originating apparatuses 300. The terminal apparatus 100 and the management apparatus 200 are communicatively interconnected. The terminal apparatus 100 and the originating apparatus 300 are communicatively interconnected.

Figure 2:
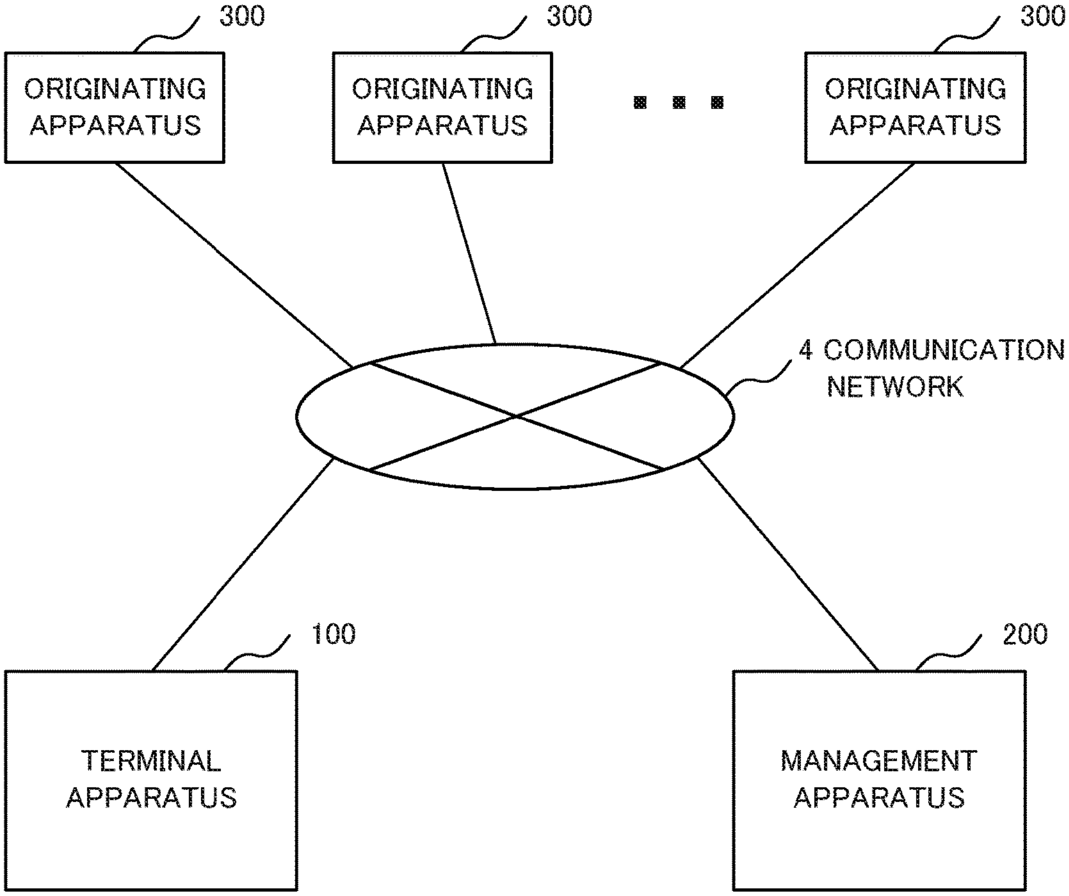
FIG. 2 is a block diagram schematically illustrating an example of overall picture of the object display system according to the first and second exemplary embodiments of the present invention.

FIG. 2 is a diagram schematically illustrating an exemplary overview of the object display system 1 of the present exemplary embodiment. Referring to FIG. 2, the terminal apparatus 100, the management apparatus 200 and the originating apparatuses 300 are communicatively interconnected through a communication network 4. The communication network 4 may be a wireless network, a wired network, or a combination of wireless and wired networks.

The object display system 1 of the first exemplary embodiment of the present invention generally operates as follows, for example. First, the terminal apparatus 100 retrieves apparatus identifiers which are identifiers of the originating apparatuses 300 which are stored in the management apparatus 200 connected with the terminal apparatus 100 through the communication network 4 from the management apparatus 200. The terminal apparatus 100 selects any of the originating apparatuses 300 having the retrieved apparatus identifiers in response to a user operation. The management apparatus 200 (or the terminal apparatus 100) assigns a signal identifier representing a signal to be emitted.

The management apparatus 200 (or the terminal apparatus 100) which has assigned the signal identifier transmits the assigned signal identifier to the selected originating apparatus 300. The originating apparatus 300 emits a signal representing the received signal identifier. The signal may be blinking light, for example. For example, the originating apparatus 300 emits light that blinks in a blinking pattern corresponding to the signal identifier by causing an LED to emit the light in the blinking pattern according to the signal identifier.

The terminal apparatus 100 detects a signal that corresponds to a signal identifier transmitted to the originating apparatus 300 and is from the originating apparatus 300 with a sensor. If the signal is blinking light as stated above, the sensor is a camera. The terminal apparatus 100 detects a region in a video captured by the camera that is blinking in a blinking pattern representing the signal identifier transmitted to the originating apparatus 300. The terminal apparatus 100 displays a mark in a region including the detected region or near the detected region in the video captured by the camera. The mark may be an arrow, a rectangle, a circle, or other graphic symbol. The mark may be the detected region highlighted, for example, by changing at least one of a gray value or color or by blinking. The terminal apparatus 100 outputs the video in which the mark is displayed. The terminal apparatus 100 indicates the position of the originating apparatus 300 to the user by the mark displayed in the video. The user can identify the position of the originating apparatus 300 by the mark displayed in the video.

The object display system 1 which operates as described above will be described below in further detail.

Referring to FIG. 1, the terminal apparatus 100 includes an input unit 101, an instructions transmitting unit 102, a sensor 103, a signal detecting unit 105, an identifying unit 106, a display control unit 107, a display unit 108 and a position measuring unit 109.

The management apparatus 200 includes an instructions receiving unit 201, a management unit 202, a signal information transmitting unit 203, an apparatus retrieving unit 204 and an apparatus information storage unit 205.

Each originating apparatus 300 includes a control unit 301 and a signal emitting unit 302.

The position measuring unit 109 measures the position of the terminal apparatus 100 using GPS (Global Positioning System), for example. In that case, the position measuring unit 109 may be implemented by circuitry that measures positions using GPS. The position measuring unit 109 may measure the direction of the terminal apparatus 100 using an electronic compass, for example. In that case, the terminal apparatus 100 may be implemented by circuitry that implements the electronic compass.

The input unit 101 accepts user operations. The input unit 101 translates, for example, an operation made by a user on the input unit 101 into a signal. The input unit 101 then transmits the signal representing the operation performed by the user to the instructions transmitting unit 102. The input unit 101 may be a touch panel or a keyboard, for example.

The instructions transmitting unit 102 identifies an instruction input by the user operation of the on the basis of a signal received from the input unit 101 that represents the operation performed by the user. The instructions transmitting unit 102 then transmits a data value representing the identified instruction input by the user to the instructions receiving unit 201 of the management apparatus 200. In other words, the instructions transmitting unit 102 transmits the instruction input by the user to the instructions receiving unit 201. The instructions transmitting unit 102 may transmit the position of the terminal apparatus 100 measured by the position measuring unit 109 to the instructions receiving unit 201 in addition to the instruction input by the user.

In the present exemplary embodiment, the user operates the input unit 101 to specify an originating apparatus 300 that emits a signal as follows, for example.

The user first inputs an instruction to request transmission of a list of originating apparatuses 300 (for example a set of apparatus identifiers) through the input unit 101. In that case, the instructions transmitting unit 102 transmits an instruction that requests transmission of a list of originating apparatuses 300 to the instructions receiving unit 201 as an instruction from the user. In that case, a list of originating apparatuses 300 is transmitted back from the instructions receiving unit 201 as a reply to the instruction, for example, as will be described later. The user may transmit a search condition for searching for an originating apparatus 300 as the instruction that requests transmission of a list of originating apparatuses 300. In that case, the instructions transmitting unit 102 transmits the search condition for searching the originating apparatus 300 to the instructions receiving unit 201 as an instruction from the user. In that case, a list of originating apparatuses 300 that meet the transmitted search condition is transmitted back from the instructions receiving unit 201 as a reply to the instruction, for example, as will be descried later. The list of originating apparatuses 300 transmitted back is displayed on the display unit 108, for example. The search condition may be the position measured by the position measuring unit 109 and the distance from the position, for example. The instructions receiving unit 201 may transmitted back a list of originating apparatuses 300 that are located within the distance from the position measured by the position measuring unit 109, the distance being transmitted as a search condition, and have been found by the apparatus retrieving unit 204.

The user uses the input unit 101 to perform an operation to select any of the originating apparatuses 300 on the list of originating apparatuses 300 displayed on the display unit 108, for example. In that case, the instructions transmitting unit 102 transmits information (i.e. an object apparatus identifier) identifying the selected originating apparatus 300 (i.e. an object apparatus) to the instructions receiving unit 201. Information identifying an originating apparatus 300 will be hereinafter referred to as an "apparatus identifier". Information identifying an object apparatus that is an originating apparatus 300 selected by the user among the originating apparatuses 300 will be also referred to as an "object apparatus identifier".

Note that the user may directly input information identifying the originating apparatus 300 into the terminal apparatus 100 instead of selecting one of the originating apparatuses 300 on the list of originating apparatuses 300. In that case, the instructions transmitting unit 102 may transmit the information identifying the originating apparatus 300 input by the user (i.e. the apparatus identifier mentioned above) to the instructions receiving unit 201.

Upon reception of an apparatus identifier from the terminal apparatus 100, the management apparatus 200 generates a signal identifier represented by an emitted signal as will be detailed later. The management apparatus 200 then assigns the generated signal identifier to the originating apparatus 300 indicated by the received apparatus identifier. The management apparatus 200 transmits the assigned signal identifier to the signal detecting unit 105 of the terminal apparatus 100. The management apparatus 200 also transmits the assigned signal identifier to the originating apparatus 300 selected by the user and indicated by the received apparatus identifier (i.e. the object apparatus). Upon reception of the signal identifier, the originating apparatus 300 emits a signal representing the received signal identifier.

The sensor 103 senses signal emitted from each originating apparatus 300 with a precision that allows the pattern of blinking of the signal to be identified. The sensor 103 then outputs, as a sensor signal representing the sensed signal, a sensor signal that allows the direction in which the signal is being emitted to be identified. If signals emitted from an originating apparatus 300 are light emitted by an LED, the sensor 103 is a camera capable of capturing moving images (i.e. video), for example. The sensor 103 then outputs a video as the sensor signal. As will be described later, if signals emitted from an originating apparatus 300 are soundwaves, the sensor 103 is a microphone array, for example. In that case, the terminal apparatus 100 further includes a camera. An example in which signals emitted from an originating apparatus 300 are soundwaves will be detailed in the description of a third variation of the present exemplary embodiment, which will be described later. In the descriptions of embodiments of the present invention, examples in which signals emitted from originating apparatuses 300 are light emitted by LEDs will be mainly described.

The signal detecting unit 105 receives a signal identifier from the management apparatus 200. The signal detecting unit 105 detects a signal represented by the received signal identifier on the basis of the sensor signal output from the sensor 103.

The identifying unit 106 identifies the position of a source of the signal detected by the signal detecting unit 105 in a video captured by the sensor 103 of the terminal apparatus 100 (or an image-capturing device included in the terminal apparatus 100).

As described above, if the sensor 103 is a camera, the sensor signal is video. In that case, the identifying unit 106 may identify a region that is blinking in a video captured. Then the signal detecting unit 105 may detect whether the blinking is a signal represented by the received signal identifier. A region of a video identified by the identifying unit 106 as a blinking region will be hereinafter referred to as a "possible originating region". A possible originating region in which a signal represented by a signal identifier has been detected by the signal detecting unit 105 will be referred to as an "originating region". A signal identifier assigned to an object apparatus among signal identifiers will be referred to as an "object identifier". An originating region in which a signal representing an object identifier has been detected will be also referred to as an "originating region of an object signal".

The display control unit 107 displays a predetermined mark, for example, in the position of the signal source identified by the identifying unit 106 in a captured video. The display control unit 107 then outputs the video with the mark displayed in the position of the detected signal source to the display unit 108.

The display unit 108 outputs a video in which the mark is displayed by the display control unit 107. The display unit 108 may be implemented by a display device, a touch panel or the like, for example.

The instructions receiving unit 201 of the management apparatus 200 receives a user instruction from the instructions transmitting unit 102 of the terminal apparatus 100.

When the received instruction is an instruction that requests a list of originating apparatuses 300, the instructions receiving unit 201 retrieves information representing a list of originating apparatuses 300 from the apparatus information storage unit 205 through the apparatus retrieving unit 204, for example. The instructions receiving unit 201 then transmits the information representing the list of originating apparatuses 300 to the instructions transmitting unit 102 of the terminal apparatus 100 as a reply to the instruction. When receiving a search condition for searching for an originating apparatus 300 as the instruction that requests a list of originating apparatuses 300, the instructions receiving unit 201 transmits the search condition to the apparatus retrieving unit 204. The instructions receiving unit 201 then receives a list of originating apparatuses 300 meeting the search condition and retrieved by the apparatus retrieving unit 204 from the apparatus retrieving unit 204. The instructions receiving unit 201 transmits the list of originating apparatuses 300 received from the apparatus retrieving unit 204 back to the instructions transmitting unit 102 of the terminal apparatus 100 as a reply to the instruction, for example.

When the received instruction is an apparatus identifier that identifies an originating apparatus 300 that is an object apparatus, the instructions receiving unit 201 transmits the received apparatus identifier to the management unit 202.

The apparatus information storage unit 205 stores an apparatus status of each originating apparatus 300. In the present exemplary embodiment, an apparatus status of an originating apparatus 300 is associated with an apparatus identifier that is an identifier of the originating apparatus 300. The "apparatus status of an originating apparatus 300" in the following description is an apparatus status associated with the apparatus identifier of the originating apparatus 300. An apparatus status includes an apparatus position which is a data value representing the position in which the originating apparatus 300 is installed and an emission status representing the status of signal emission of the originating apparatus 300. The apparatus information storage unit 205 may store apparatus statuses of a plurality of originating apparatuses 300. When an apparatus status of an originating apparatus 300 is stored in the apparatus information storage unit 205, it will be stated that "the originating apparatus 300 is under the management of the management apparatus 200 including the apparatus information storage unit 205".

FIG. 7 is a diagram illustrating exemplary apparatus statuses stored in the apparatus information storage unit 205.

In the example illustrated in FIG. 7, when an originating apparatus 300 is emitting a signal, the value of the emission status of the originating apparatus 300 is a signal identifier represented by the signal being emitted from the originating apparatus 300. When an originating apparatus 300 is not emitting a signal, the value of the emission status of the originating apparatus 300 is a value indicating "No emission", which represents that the originating apparatus 300 is not emitting a signal. The value of the emission status of an originating apparatus 300 when the originating apparatus 300 is emitting a signal may be a predetermined value that represents that no signal is emitted. The apparatus status may further include a value of the signal identifier assigned to the originating apparatus 300. A value of the installation location may be the latitude and longitude of the location in which the originating apparatus 300 is installed, for example. The value of the installation location may be coordinates represented in a coordinate system defined in a building, for example.

As illustrated in FIG. 7, the apparatus status may include "type" which is the type of an originating apparatus 300, "name" which is the name assigned to the originating apparatus 300, and other data values. For example, "Requesting terminal" indicates the identifier of a terminal apparatus 100 that has selected the originating apparatus 300 as an object apparatus. The "Requesting terminal" may include the identifiers of two or more terminal apparatuses 100. "Operation status" indicates whether the originating apparatus 300 is properly operating. In the example in FIG. 7, "Normal" indicates that the originating apparatus 300 is properly operating. "Faulty" indicates that the originating apparatus 300 is not properly operating. "Service" indicates the type of a service that the originating apparatus 300, which is an apparatus that provides a service to users, can provide. These apparatus statuses are used by the object display apparatus according to other embodiments of the present invention.

The apparatus retrieving unit 204 searches for an apparatus status that meets the search condition received from the instructions receiving unit 201 among the apparatus statuses stored in the apparatus status storage unit 205. By the search, the apparatus retrieving unit 204 retrieves an originating apparatus 300 whose apparatus status meets the search condition received from the instructions receiving unit 201 among the originating apparatuses 300 under the management of the management apparatus 200. The apparatus retrieving unit 204 transmits the apparatus identifier of the retrieved originating apparatus 300 to the terminal apparatus 100 through the instructions receiving unit 201. The apparatus retrieving unit 204 may transmit a value of another apparatus status of the retrieved originating apparatus 300 to the terminal apparatus 100 through the instructions receiving unit 201 in addition to the apparatus identifier.

When the management unit 202 receives an apparatus identifier of an originating apparatus 300 that is an object apparatus from the terminal apparatus 100 through the instructions receiving unit 201, the management unit 202 generates a signal identifier to be assigned to the originating apparatus 300 indicated by the apparatus identifier. The management unit 202 then assigns the generated signal identifier to the originating apparatus 300 indicated by the apparatus identifier (i.e. the object apparatus). An example of the signal identifier will be detailed later. The management unit 202 transmits the signal identifier to the signal detecting unit 105 of the terminal apparatus 100 through the signal information transmitting unit 203. The management unit 202 also transmits the signal identifier to the control unit 301 of the originating apparatus 300 identified by the received apparatus identifier through the signal information transmitting unit 203. Specifically, the management unit 202 transmits the signal identifier to the signal information transmitting unit 203 and the signal information transmitting unit 203 transmits the received signal identifier to the signal detecting unit 105 of the terminal apparatus 100 and the control unit 301 of the originating apparatus 300. The management unit 202 changes the value of the emission status in the apparatus status of the originating apparatus 300 identified by the received apparatus identifier stored in the apparatus information storage unit 205 to a value representing that a signal is being emitted. As described above, when an originating apparatus 300 is emitting a signal, the value of the emission status of the originating apparatus 300 may be the signal identifier represented by the signal emitted by the originating apparatus 300. In that case, the management unit 202 may change the value of the emission status in the apparatus status of the originating apparatus 300 identified by the received apparatus identifier stored in the apparatus information storage unit 205 to the generated signal identifier.

For example, the management unit 202 may generate a signal identifier, for example, using any of the following exemplary methods.

(1) Unique User ID

The management nit 202 may use a user ID of the user who uses the terminal apparatus 100 as the signal identifier. The user ID may be a unique ID uniquely assigned to the user in the world, for example. In that case, while a globally common system that uniquely assigns user IDs so as not to overlap with each other is necessary, at most a number of users that is equivalent to the world's population need to be identifiable by the IDs. The number of population is smaller than the number of IoT devices. An originating apparatus 300 may emit a signal (for example blinking light emitted by an LED) using the bit pattern of a user ID as a blinking pattern. An originating apparatus 300 may emit a signal by using as a blinking pattern a bit pattern obtained by performing a given types of conversion of a user ID.

(2) Random Number Having an Arbitrary Length

The management unit 202 may use, as the signal identifier, a random number having an arbitrary length that can be obtained by using a user ID as the seed of random numbers, for example. The seed of random numbers may be another type of value. In that case, the management unit 202 transmits a random number obtained using a user ID as the seed, for example, to an originating apparatus 300 and the terminal apparatus 100 through the signal information transmitting unit 203. The originating apparatus 300 then uses the bit pattern of the received random number as a blinking pattern to emit a signal.

(3) Random Number Generation Algorithm and a Random Number Having an Arbitrary Length that is Given as the Initial Value for the Random Number Generation Algorithm The management unit 202 may use as a signal identifier a combination of a random number generation algorithm and a random number having an arbitrary length that is given as the initial value (seed) for the random number generation algorithm. In that case, the management unit 202 may transmit, for example, an identifier of the random number generation algorithm and the random number given as the initial value for generating a random number to an originating apparatus 300 and the terminal apparatus 100 through the signal information transmitting unit 203. The originating apparatus 300 (the control unit 301, for example, which will be described later) and the terminal apparatus 100 (the signal detecting unit 105, for example) may be designed to generate a random number using a received random number as the initial value for random number generation in accordance with the random number generation algorithm indicated by a received identifier.

(4) Random Number Sent Out at Regular Intervals.

The management unit 203 may periodically generate a random number at predetermined time intervals and may transmit the generated random number to an originating apparatus 300 and the terminal apparatus 100 through the signal information transmitting unit 203.

The signal information transmitting unit 203 receives a signal identifier from the management unit 202. The signal information transmitting unit 203 transmits the received signal identifier to the control unit 301 of the signal originating apparatus 300 and the signal detecting unit 105 of the terminal apparatus 100. In the descriptions of embodiments of the present invention, a signal identifier generated for a originating apparatus 300 selected through an operation by the user of the terminal apparatus 100 and identified by the an apparatus identifier sent to the management unit 202 (the originating apparatus 300 that is an object apparatus as noted above) will be also referred to as an "object identifier".

The control unit 301 receives a signal identifier which is an identifier emitted as a signal from the signal information transmitting unit 203 of the management apparatus 200, for example. The control unit 301 generates a signal pattern (for example a bit pattern) representing a signal identifier in accordance with a predetermined rule. The signal may be blinking light as noted above. In that case, the pattern of blinking light which is the signal (i.e. blinking pattern) may be represented by the bit pattern of the signal.

The control unit 301 causes the signal emitting unit 302 to emit a signal according to the pattern of the signal representing the signal identifier. If the signal is blinking light, the control unit 301 causes the signal emitting unit 302, which is an LED, for example, to blink in accordance with the blinking pattern that represents the signal identifier. The blinking pattern is a bit pattern, for example, as described above. For example, the control unit 301 may repeat an operation to cause the signal emitting unit 302 to light for a predetermined duration of time when a bit in the bit pattern is 1 and cause the signal emitting unit 302 not to light for a predetermined duration of time when a bit in the bit pattern is 0 in the order of bits in the bit pattern, starting from the first bit of the bit pattern. When the control unit 301 completes the operation to cause the signal emitting unit 302 to blink on or off in accordance with the values of all bits in the bit pattern, the control unit 301 may repeat the same operation in the order of the bits in the bit pattern, starting from the first bit.

The signal emitting unit 302 emits a signal in accordance with a signal pattern representing a signal identifier under the control of the control unit 301. If the signal is blinking light, the signal emitting unit 302 is implemented by an LED, for example, as noted above. If the signal emitting unit 302 is an LED, the signal emitting unit 302 emits light that blinks in accordance with the blinking pattern representing the signal identifier. In the following description, the state in which the signal emitting unit 302 is emitting light is referred to as the "lit state" (or the ON state); the state in which the signal emitting unit 302 is not emitting light is referred to as the "unlit state" (or the OFF state).

The signal emitting unit 302 may emit light that blinks at a predetermined fixed frequency. The signal emitting unit 302 may emit light that blinks at a frequency that is dependent on the sensor 103 (i.e. a camera) of the terminal apparatus 100 and that makes blinking recognizable in a video captured by the sensor 103. In that case, the terminal apparatus 100 may transmit a value of frequency that makes blinking recognizable in a video captured by the sensor 103 to the control unit 301 of the originating apparatus 300 through the instructions receiving unit 201, the management unit 202 and the signal information transmitting unit 203 of the management apparatus 200, for example. The control unit 301 may control the signal emitting unit 302 so that light being emitted blinks at the frequency represented by the received frequency value. The originating apparatus 300 may be designed to be able to emit light that blinks at a frequency represented by the received frequency value.

When the signal emitting unit 302 continuously emits light because of a plurality of successive ON sates in the blinking pattern, for example, it is difficult to accurately recognize how many ON states the duration of light emission from the signal emitting unit 302 is equivalent to on the basis of a video captured. Similarly, when the signal originating unit 302 stays unlit because of a plurality of successive OFF states, it is difficult to accurately recognize how many OFF states the duration of light emission from the signal emitting unit 302 is equivalent to on the basis of a video captured. Therefore a blinking pattern may be set such that the ON state or the OFF state does not continue for a long duration of time. For example, the control unit 301 may generate a blinking pattern by encoding a signal identifier so that the ON state and the OFF state appropriately alternate. By way of example, the control unit 301 may generate a blinking pattern by Manchester encoding of a signal identifier. In that case, when the control unit 301 causes the signal emitting unit 302 to repeat light emission in accordance with a blinking pattern representing the signal identifier, the control unit 301 may cause the signal emitting unit 302 to stay in the OFF state for a predetermined duration of time as a separator between blinking according to the blinking pattern and the next blinking. The signal detecting unit 105 may detect the signal that represents the signal identifier by determining whether blinking after the OFF state has continued for the predetermined duration of time represents the signal identifier.

In the following description, a signal identifier assigned to an object apparatus will be referred to as an "object identifier". A signal representing an object identifier will be referred to as an "object signal.

If the sensor 103 of the terminal apparatus 100 is capable of capturing a 60-fps (frames per second) video, a bit pattern of up to 30 bits per second can be read from a video of an originating apparatus 300 captured by the sensor 103. In this case, the maximum size of data before being encoded by Manchester encoding that can be represented by 30 bits of data encoded using Manchester encoding is 15 bits. In other words, the signal emitting unit 302 can emits a signal representing a 15-bit signal identifier per second. If the length of a signal identifier is 15 bits, there can be 32,767 signal identifiers. Fast image sensors with a sampling rate of 80 kHz have been developed. Such a fast image sensor is used as the sensor 103, an identifier longer than 15 bits can be used in a time shorter than one second. In other words, the signal emitting unit 302 can emit a signal representing a signal identifier longer than 15 bits in a time shorter than one second. If a fast image sensor is used as the sensor 103, the sensor 103 can be blinked at such a high rate that humans cannot recognize a blinking pattern. In that case, light emission of an LED lighting apparatus or an LED indicator can be caused to operate as the signal emitting unit 302 while maintaining the function of the illumination apparatus or indicator.

In the case of a fast sensor with a sampling rate of 80 kHz, for example, the difference between images of an originating apparatus 300 in successive frames is small. However, when an originating apparatus 300 is captured by an ordinary camera such as a 60-fps camera, the difference between images of the originating apparatus 300 in successive frames will be so large that the images cannot be regarded as the same. In that case, the identifying unit 106 may detect feature points in a video and may perform alignment between frames on the basis of the detected feature points so that the positions of the feature points associated between the frames appear in fixed positions. The identifying unit 106 may then detect whether there is a blinking pattern in the aligned successive frames.

In other words, the identifying unit 106 may generate a difference image between aligned successive frames in which each pixel represents a difference in luminance between pixels in the same position in the frames as the pixel, for example. The identifying unit 106 may then extracts pixels that have larger absolute values of difference than a predetermined threshold, for example, as pixels of a possible image of the signal emitting unit 302. The identifying unit 106 may detect a region that has been successively extracted as a possible image of the signal emitting unit 302 as an image of the signal emitting unit 302. Then the signal detecting unit 105 may determine whether a pattern representing changes in the luminance of the region detected as an image of the signal emitting unit 302 matches a blinking pattern representing a signal identifier.

When the pattern representing changes in the luminance of the region extracted as an image of the signal emitting unit 302 matches the blinking pattern representing the signal identifier, the display control unit 107 displays a predetermined mark in the region detected as an image of the signal emitting unit 302 in the video. The display control unit 107 may overlay the mark on the region detected as an image of the signal emitting unit 302. The display control unit 107 may display the mark so that the mark is not overlaid on the region detected as an image of the signal emitting unit 302. Displaying the mark in a video will also be referred to as adding a mark to a video. The display control unit 107 then outputs the video in which the mark is displayed to the display unit 108. The mark may be a predetermined graphical symbol. The mark may be a display that highlights the region detected as an image of the signal emitting unit 302. The display of the mark allows the user of the terminal apparatus 100 to know the position of the originating apparatus 300. Note that the region detected as an image of the signal emitting unit 302 is the "originating region" described above.

The signal emitting unit 302 may be an infrared LED. The signal emitting unit 302 may emit a signal representing a signal identifier by blinking of infrared light instead of visible light. In that case, humans cannot recognize the blinking by the unaided eye even if the frequency of the blinking emitted according to a blinking pattern is low. Accordingly, the user of the terminal apparatus 100 and other people do not feel uncomfortable when many originating apparatuses 300 cause LEDs to blink according to different patterns.

The input unit 101 accepts an end instruction which is a user operation instructing to end the display of the mark. When the end instruction is accepted, the instructions transmitting unit 102 transmits the end instruction to instruct to end emission of the object signal to the instructions receiving unit 201. The end instruction may include the identifier of the originating apparatus 300 that is instructed to end emission of the object signal. When the instructions receiving unit 201 receives the end instruction, the management unit 202 changes the emission status, stored in the apparatus information storage unit 205, of the originating apparatus 300 that is instructed to end the display of the mark to a value indicating that the emission is not being performed. The signal information transmitting unit 203 then transmits the end instruction to the control unit 301 of the originating apparatus 300. Upon reception of the end instruction, the control unit 301 of the originating apparatus 300 causes the signal emitting unit 302 to end the emission of the signal.

An example of an operation of the object display system 1 according to the present exemplary embodiment will be described next in detail with reference to drawings. An example of an operation of the object display system 1 will be described below in which the object display system 1 includes one terminal apparatus 1 and is used by one user. In the following description of the operation of the object display system 1 of the present exemplary embodiment, signals are blinking light and the sensor 103 is a camera.

Figure 3:
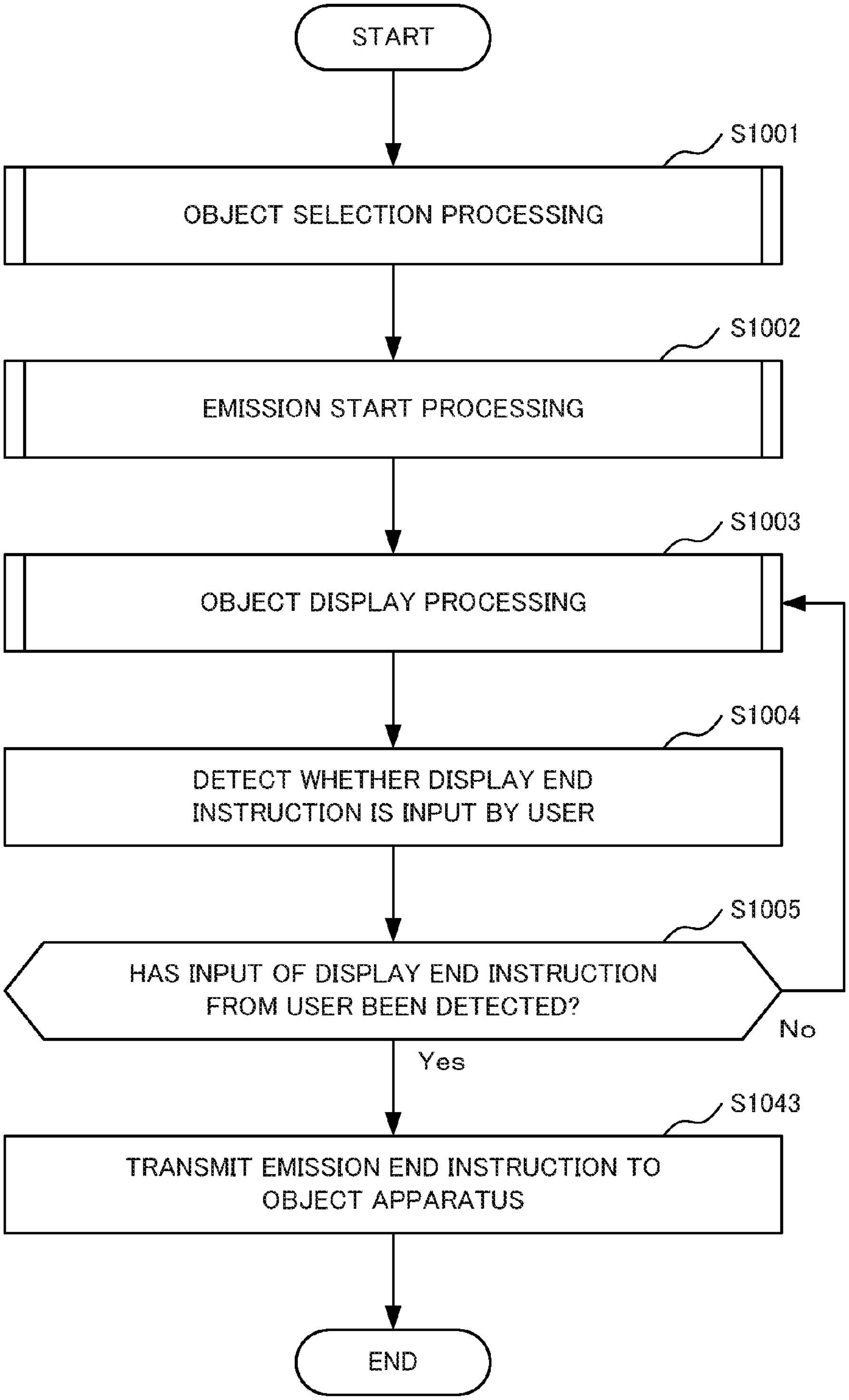
FIG. 3 is a flowchart illustrating an example of an operation in the object display system according to the first exemplary embodiment of the present invention.

FIG. 3 is a flowchart illustrating an example of an operation of the object display system 1 of the present exemplary embodiment.

First, the object display system 1 performs object selection processing for selecting one originating apparatus 300 as an object apparatus from a list of originating apparatuses 300, for example (step S1001).

Figure 4:
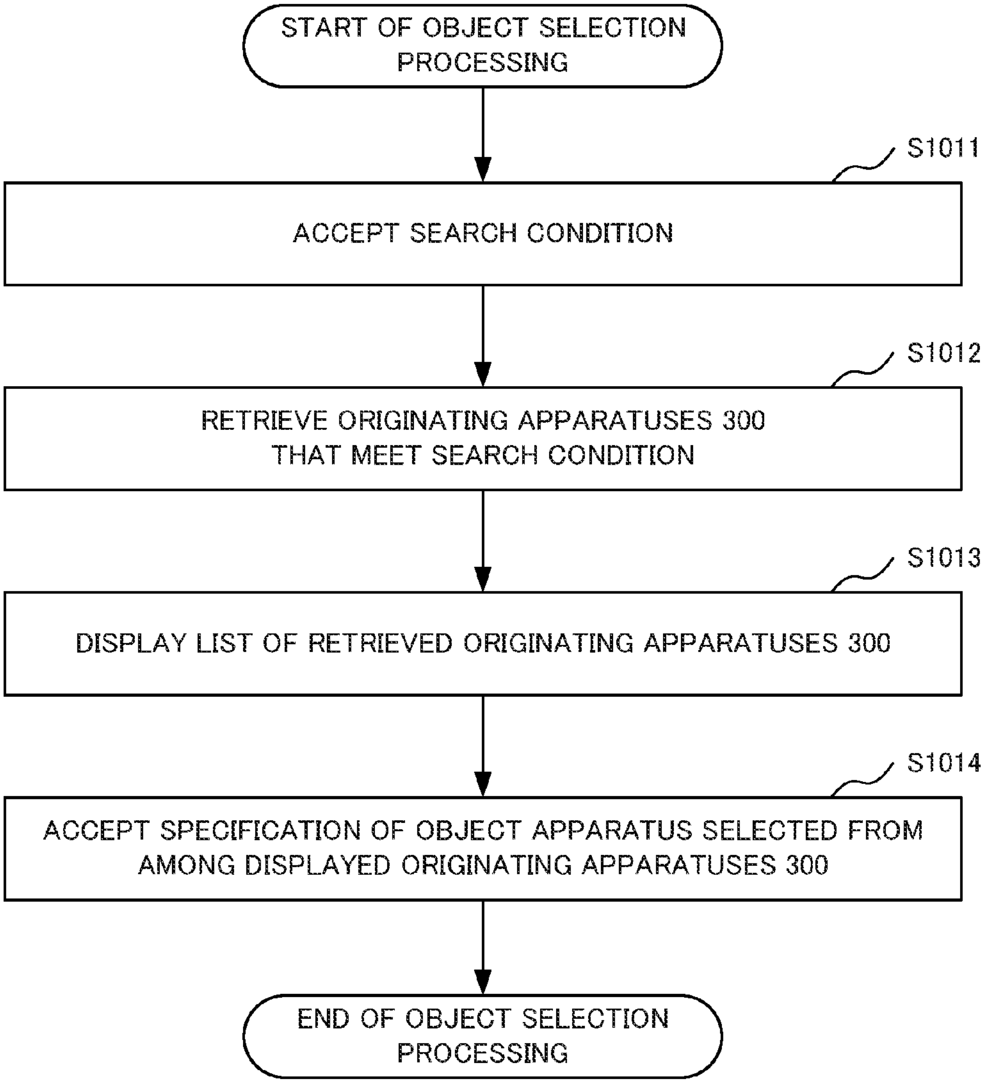
FIG. 4 is a flowchart illustrating an example of object selection processing in the first exemplary embodiment of the present invention.

FIG. 4 is a flowchart illustrating an example of an operation of the object selection processing according to the present exemplary embodiment.

Referring to FIG. 4, the user uses the input unit 101 to input a search condition about an originating apparatus 300. The instructions transmitting unit 102 accepts the search condition input through the input unit 101 (step S1011). The search condition may be a condition about any of apparatus statuses of the originating apparatus 300. If the search condition is about the distance from the terminal apparatus 100 (for example the distance is less than or equal to a predetermined value), the position measuring unit 109 measures the position of the terminal apparatus 100. The search condition may be a condition for finding all available originating apparatuses 300.

Then the object display system 1 retrieves an originating apparatus 300 that meets the search condition (step S1012). In this regard, the instructions transmitting unit 102 transmits the search condition to the apparatus retrieving unit 204 through the instructions receiving unit 201.

The apparatus retrieving unit 204 retrieves apparatus statuses that meet the search condition from among the apparatus statuses of originating apparatuses 300 that are stored in the apparatus information storage unit 205. If the search condition is to find all available originating apparatuses 300, the apparatus retrieving unit 204 retrieves all of the originating apparatuses 300 whose apparatus information are stored in the apparatus storage unit 205. The apparatus retrieving unit 204 transmits a list of the retrieved originating apparatuses 300 (for example a list of the identifiers or names of the originating apparatuses 300) back to the instructions transmitting unit 102 through the instructions receiving unit 201 as a reply.

Then the display unit 108, for example, displays the list of the retrieved originating apparatuses 300 (step S1013).

The user uses the input unit 101 to perform an operation to select any of the retrieved originating apparatuses 300 from the list of the retrieved originating apparatuses 300.

The instructions transmitting unit 102 accepts the specification of the object apparatus, which is the originating apparatus 300 selected by the user from the displayed list of the originating apparatuses 300, through the input unit 101 (step S1014).

The instructions transmitting unit 102 may transmit a data value identifying the object apparatus (i.e. the object apparatus identifier which is the identifier of the object apparatus) to the management unit 202 through the instructions receiving unit 201. The management unit 202 may accept the data value identifying the object apparatus. With this, the object selection processing illustrated in FIG. 4 ends.

Then, at step S1002 of FIG. 3, the object display system 1 performs emission start processing for starting emission of the signal representing the object identifier, which is a signal identifier assigned to the object apparatus, to the originating apparatus 300, which is the object apparatus.

Figure 5:
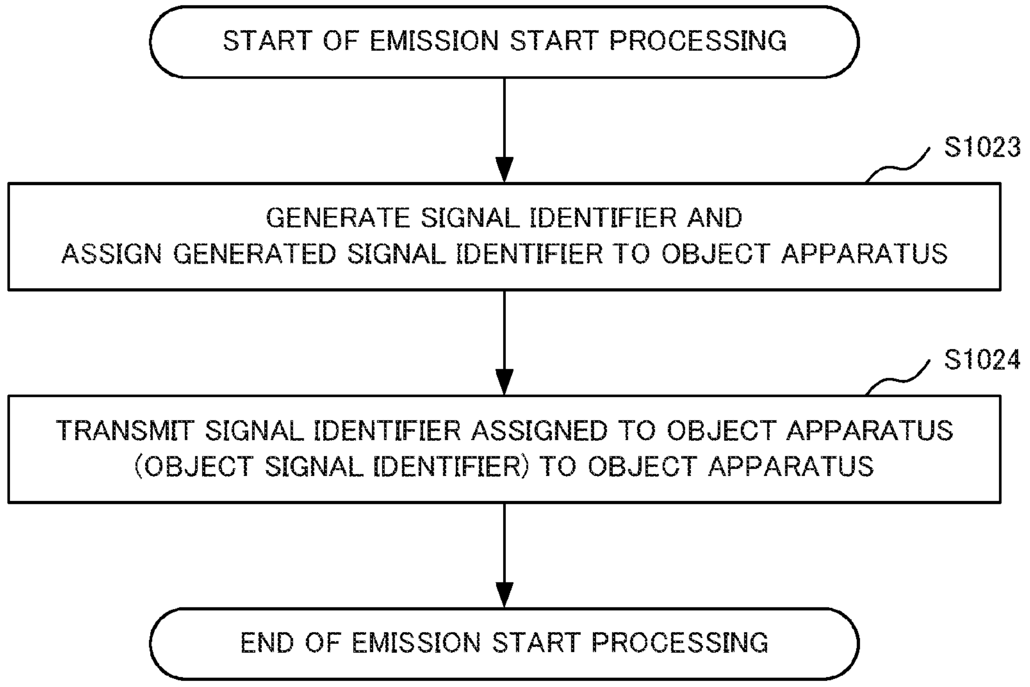
FIG. 5 is a flowchart illustrating an example of emission start processing in the first exemplary embodiment of the present invention.

FIG. 5 is a flowchart illustrating an example of the emission start processing according to the present exemplary embodiment.

Referring to FIG. 5, the management unit 202 generates a signal identifier and assigns the generated signal identifier to the object apparatus (step S1023).

The management unit 202 then transmits the object identifier that is the signal identifier generated and assigned to the object apparatus to the object apparatus through the signal information transmitting unit 203 (step S1024). In addition, the management unit 202 may change the above-described emission status of the object apparatus stored in the apparatus information storage unit 205 to a value indicating that the object signal is being emitted. The signal information transmitting unit 203 receives the object identifier from the management unit 202 and transmits the received object identifier to the object apparatus. With this, the emission start processing according to the present exemplary embodiment illustrated in FIG. 5 ends.

Then, at step S1003 of FIG. 3, the object display system 1 performs object display processing for displaying a mark in an originating region in a captured video that represents a position from which the object signal is emitted and outputting the video in which the mark is displayed.

Figure 6:
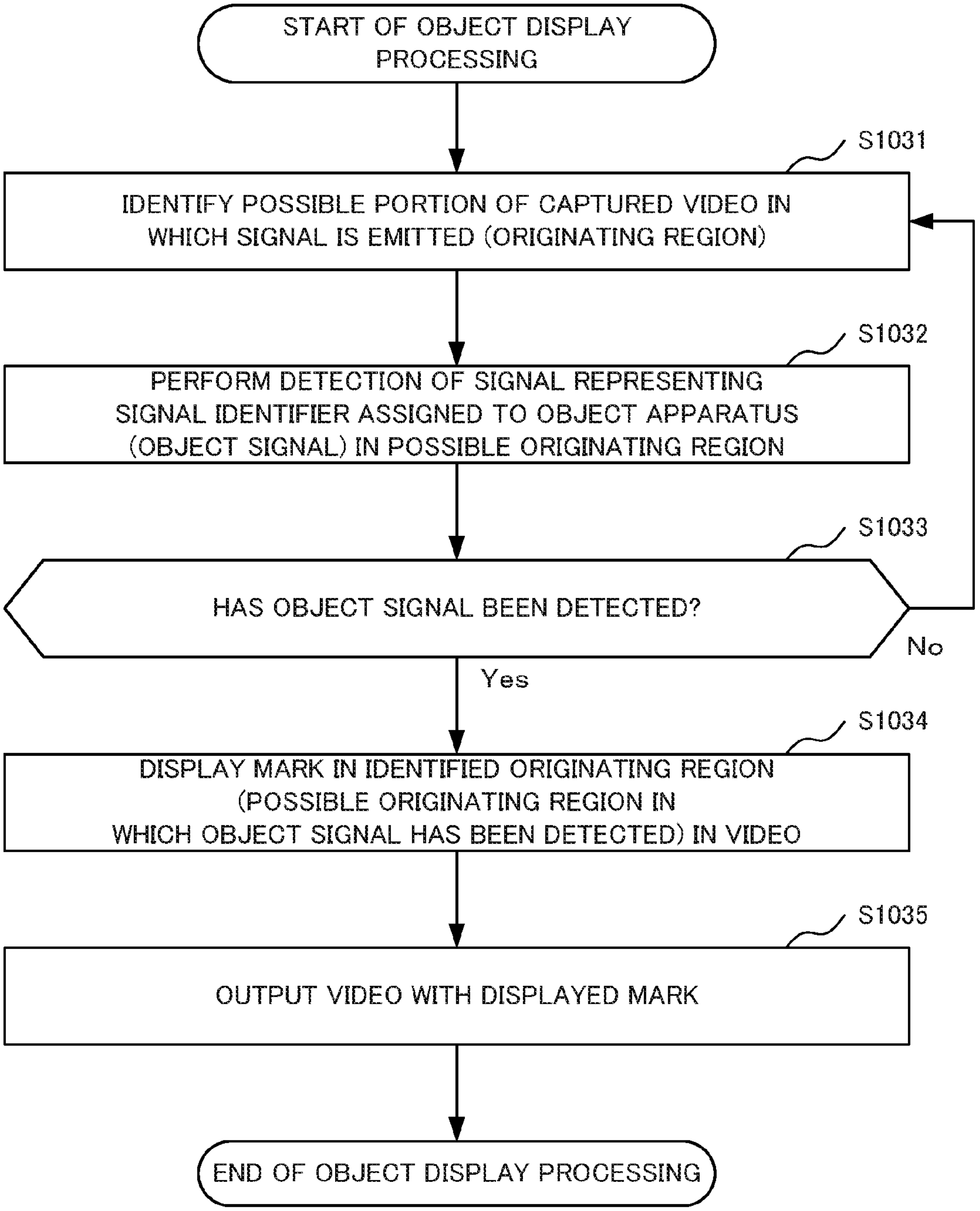
FIG. 6 is a flowchart illustrating an example of object display processing in the first exemplary embodiment of the present invention.

FIG. 6 is a flowchart illustrating an example of the object display processing in the present exemplary embodiment.

Referring to FIG. 6, first the identifying unit 106 identifies a possible portion from which an object signal is being emitted (i.e. an originating region) in a video captured by the sensor 103, which is a camera (step S1031). As described above, the identifying unit 106 may identify a region in which the absolute values of differences in pixel value between frames are continuously large as the possible originating region.

Then the signal detecting unit 105 detects a signal representing the signal identifier assigned to an object apparatus (an object signal) in the possible originating region (step S1032).

If the object signal is not detected in the possible originating region (No at step S1033), the object display system 1 repeats the operation illustrated in FIG. 6 from step S1031.

If the object signal is detected in the possible originating region (Yes at step S1033), the identifying unit 106 identifies the possible originating region in which the object signal is detected as an originating region. Then the display control unit 107 displays a mark on the identified originating region in the video (step S1034). The display control unit 107 outputs the video with the mark displayed in the originating region to the display unit 108 (step S1035). With this, the object display system 1 ends the operation illustrated in FIG. 6.

The user views the video in which the mark is displayed and, for example, looks for the object apparatus. When the user finds the object apparatus, for example, the user inputs an end instruction, which is an instruction to end the display of the mark, in the object display system 1.

Then, at step S1004 of FIG. 3, the object display system 1 attempts to detect an input of the end instruction from the user. The input unit 101 accepts the operation performed by the user and sends a signal representing the accepted user operation to the instructions transmitting unit 102. The instructions transmitting unit 102 determines whether the operation represented by the received signal is an end instruction. If the determination result is that the operation represented by the received signal is the end instruction, the instructions transmitting unit 102 detects the input of the end instruction.

If an input of the end instruction from the user is not detected (No at step S1005), the object display system 1 performs the operation from step S1003. For example, if the user has performed no operation on the input unit 101 or if the operation performed by the user is not the end instruction, an input of the end instruction from the user is not detected.

If an input of the end instruction from the user is detected (Yes at step S1005), the instructions transmitting unit 102 transmits the end instruction to the management unit 202 through the instructions receiving unit 201. The management unit 202 sends an instruction to transmit the end instruction to the object apparatus selected by the user of the terminal apparatus 100 that has transmitted the received end instruction to the signal information transmitting unit 203. The signal information transmitting unit 203 transmits the end instruction to the object apparatus selected by the user of the terminal apparatus 100 that has transmitted the received end instruction (step S1043). When the instructions receiving unit 201 receives the end instruction from the instructions transmitting unit 102, the management unit 202 may change the emission status of the object apparatus stored in the apparatus information storage unit 205 to a value indicating that the object apparatus is not emitting the object signal, as described above. Then the signal information transmitting unit 203 may transmit the end instruction to the control unit 301 of the originating apparatus 300. The control unit 301 which has received the end instruction controls the signal emitting unit 302 to end the emission of the object signal.

An operation of an originating apparatus 300 according to the present exemplary embodiment will be described next in detail with reference to a drawing.

Figure 13:
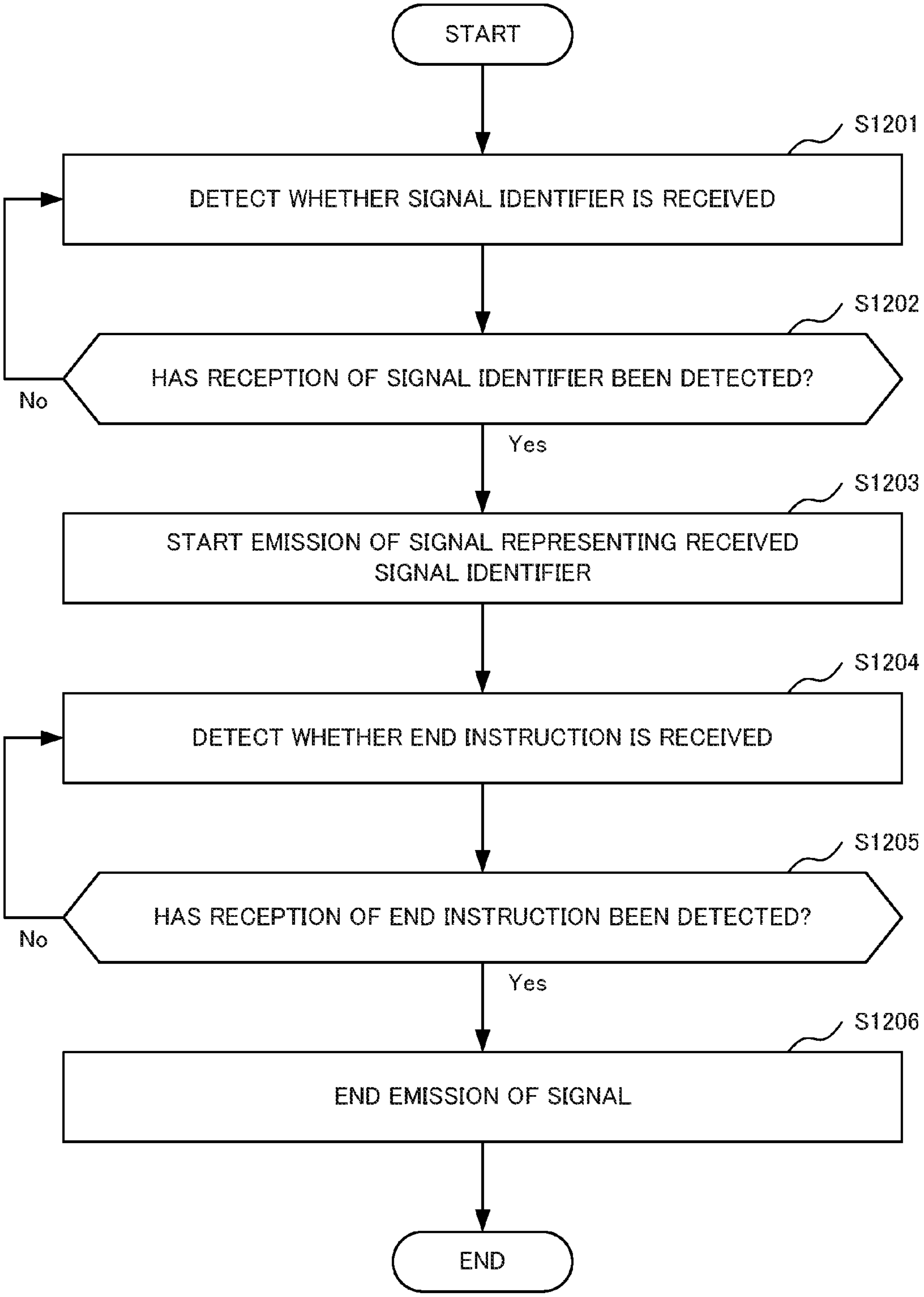
FIG. 13 is a flowchart illustrating an example of an operation of originating apparatus in the first exemplary embodiment of the present invention.

FIG. 13 is a flowchart illustrating an example of an operation of an originating apparatus 300 according to the present exemplary embodiment.

At the start of the operation illustrated in FIG. 13, the signal emitting unit 302 is not emitting a signal.

The control unit 301 of the originating apparatus 300 detects whether a signal identifier is received (step S1201). If reception of a signal identifier is not detected (No at step S1202), the control unit 301 continues detection of reception of a signal identifier at step S1201.

When reception of a signal identifier is detected (Yes at step S1202), the control unit 301 causes the signal emitting unit 302 to start emitting a signal representing the received signal identifier (step S1203). As described above, if the signal emitting unit 302 is an LED and the signal is blinking light, the control unit 301 causes the signal emitting unit 302 to blink in a blinking pattern representing the received signal identifier.

The control unit 302 detects whether an end instruction is detected while causing the signal emitting unit 302 to emit the signal (step S1204). If reception of the end instruction is not detected (No at step S1205), the control unit 302 continues detection of reception of an end instruction at step S1204.

When reception of the end instruction is detected (Yes at step S1205), the control unit 302 ends emission of the signal by the signal emitting unit 302 (step S1206).

The exemplary embodiment described above has the general advantageous effect of reducing increase in the time required for recognizing an object based on a signal emitted from the object even when the number of objects increases.

The reason is that the management unit 202 generates an object identifier represented by an object signal and assigns the generated object identifier to an object apparatus which emits an object signal representing the assigned object identifier. By assigning the identifier which has fewer bits than an existing identifier assigned to the object apparatus such as an IP address assigned to the object apparatus, the amount of information making up the signal representing the identifier identifying the object apparatus is reduced. Accordingly, the time required for the object apparatus to complete emission of the signal representing the identifier is reduced.

This exemplary embodiment also has first to sixth advantageous effects described below.

The first advantageous effect is that devices connected to a network can be readily found in a real space even when the number of searchable devices connected to the network increases. This is because augmented reality technology is used in the terminal apparatus 100 of the present exemplary embodiment. Specifically, in the augmented reality technology used in the present exemplary embodiment, the terminal apparatus 100 worn or held by the user identifies a position in which a device being searched for is emitting a signal is identified and the identified position is indicated in a video captured by the terminal apparatus 100. Since the terminal apparatus 100 of the present exemplary embodiment uses the augmented reality technology to display the position of a device being searched for, the user can readily find the device being searched for in a real space.

The second advantageous effect is that the precision of identification of an object being searched for can be improved. This is because the terminal apparatus 100 of the present exemplary embodiment identifies the position of an object being searched for by a signal emitted from the object being searched for. There is a method of identifying the position of an object in an image by detecting an image of the object in the image on the basis of the shape of the object. However, the precision of the method of detecting an image of an object on the basis of the shape of the object is not so high. Further, when there are a plurality of objects having the same shape, it is difficult to distinguish among the objects. In the present exemplary embodiment, in contrast, the terminal apparatus 100 detects a blinking pattern of light emitted from an LED that is unique to an object being searched for to identify the position of the object being searched for in a captured video. Accordingly, the present exemplary embodiment can improve the precision of detection of an object being searched for as compared with the above-described method based on the shape of an object.

The third advantageous effect is that the scenery is not impaired. This is because the present exemplary embodiment uses LEDs, which are included in many apparatuses or speakers which do not need to be provided on a surface of apparatuses are used to identify the positions of objects being searched for. This eliminates the need for attaching an AR Tag, which is implemented by a seal or the like, to every object apparatus being searched for and therefore the scenery is not impaired. Further, if an LED needs to be added to an apparatus, the attached LED is not noticeable while the LED is not used. If an attached LED is an infrared-emitting LED, the LED is not noticeable even while the LED is emitting a signal.

The fourth advantageous effect is that the time required for identifying an object being searched for can be reduced even when the number of searchable objects connected to the network increases. This is because the management apparatus 200 is capable of choosing a length of an identifier such that there is no overlap between identifiers in a near space. The length of identifiers assigned to searchable objects can therefore be minimized. In other words, the length of a blinking pattern of a signal representing an identifier can be minimized. Accordingly, the time required for an LED to blink in a blinking pattern representing an identifier at a given frequency can be reduced. Further, the time required for an LED to blink in a blinking pattern representing an identifier at a frequency that allows the blinking pattern to be recognized using a camera that captures a video with a typical frame rate can be reduced to a practical amount.

The fifth advantageous effect is that security and privacy risks can be reduced. This is because, if network IDs or identifiers of users are assigned to searchable objects, the networks ID or identifiers of the user can be revealed by observing signals. In the present exemplary embodiment, randomly generated identifiers can be used. Accordingly, network IDs and identifiers of users can be hidden to reduce security and privacy risks.

The sixth advantageous effect is that the present exemplary embodiment does not need to manage identifiers assigned to searchable devices in such a way that there is no overlap between identifiers in the entire network. This is because the management apparatus 200, for example, generates an identifier each time an object to be searched for is selected. This is also because the generated identifier is then shared between the management apparatus 200 and the terminal apparatus 100 of the user who has selected the object to be searched for through the communication network 4. Since an identifier is shared, the management apparatus 200 does not need to generate the same identifier each time an object to be searched for is selected.

<First Variation of First Exemplary Embodiment>

A first variation of the first exemplary embodiment will be described next in detail with reference to drawings.

Figure 8:
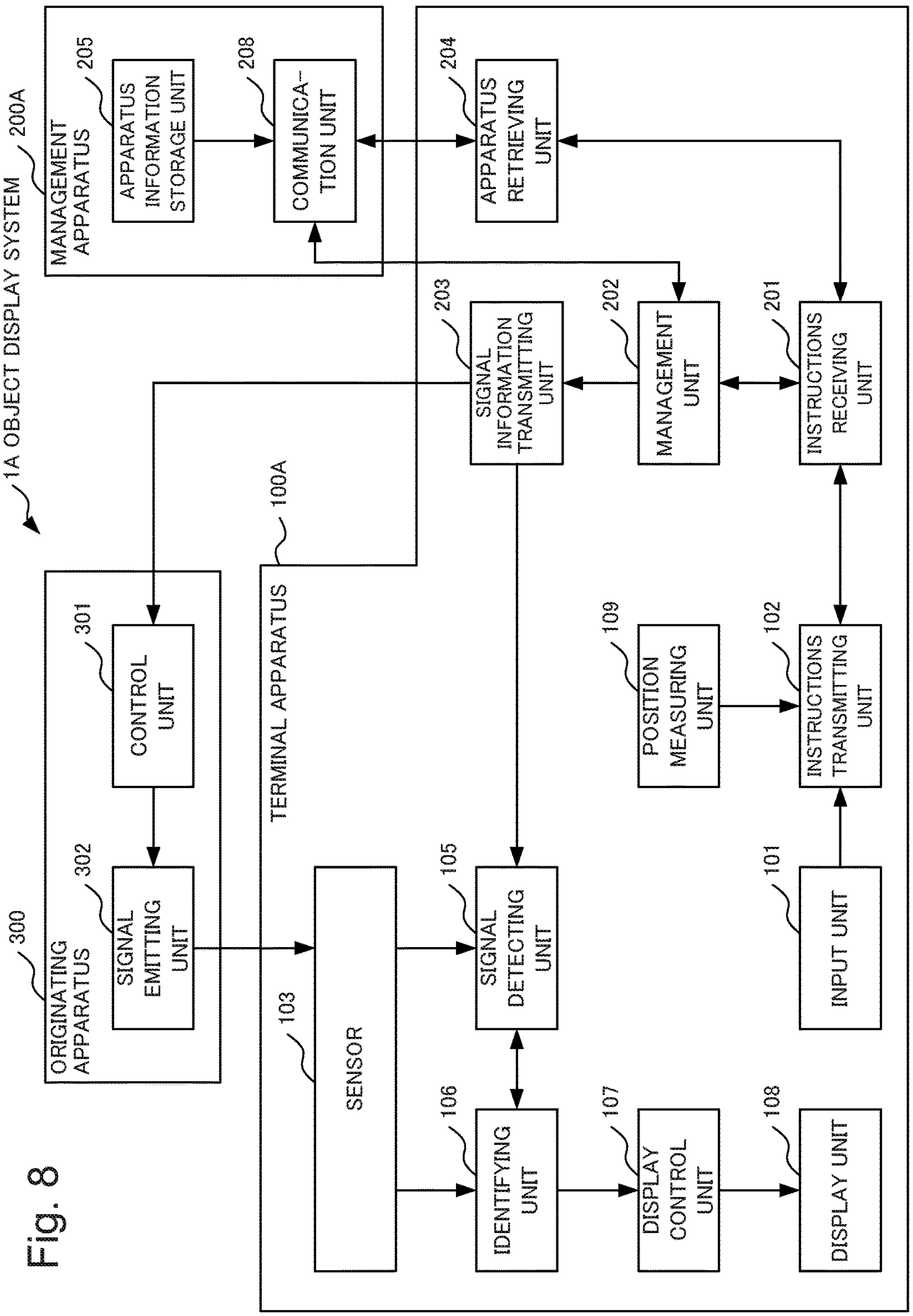
FIG. 8 is a block diagram illustrating a configuration of an object display system according to a first variation of the first exemplary embodiment of the present invention.

FIG. 8 is a block diagram illustrating a configuration of an object display system 1A according to this variation.

Referring to FIG. 8, the object display system 1A according to the present exemplary embodiment includes a terminal apparatus 100A, a management apparatus 200A and an originating apparatus 300. When the configuration of the object display system 1A illustrated in FIG. 8 is compared with the configuration of the object display system 1 illustrated in FIG. 1A, it can be seen that the object display system 1A includes the terminal apparatus 100A in place of the terminal apparatus 100 and includes the management apparatus 200A in place of the management apparatus 200. The terminal apparatus 100A, the management apparatus 200A and the originating apparatus 300 are communicatively interconnected through a communication network 4, for example.

The terminal apparatus 100A of this variation includes an instructions receiving unit 201, a management unit 202, a signal information transmitting unit 203 and an apparatus retrieving unit 204 in addition to the components of the terminal apparatus 100 of the first exemplary embodiment. The management apparatus 200A of this variation includes an apparatus information storage unit 205 and a communication unit 208. The originating unit 300 of this variation is the same as the originating apparatus 300 of the first exemplary embodiment.

The configuration of the object display system 1A of this variation is the same as or similar to the configuration of the object display system of the first exemplary embodiment except the following differences. In this variation, the terminal apparatus 100A instead of the management apparatus 200A includes the instructions receiving unit 201, the management unit 202, the signal information transmitting unit 203 and the apparatus retrieving unit 204. The management unit 202 and the apparatus retrieving unit 204 read and write emission statuses of originating apparatuses 300 and other information about the originating apparatuses stored in the apparatus information storage unit 205 through the communication unit 208. When the communication unit 208 receives a request to retrieve an emission status or other information about an originating apparatus 300 stored in the apparatus information storage unit 205, the communication unit 208 retrieves the requested information from the apparatus information storage unit 205. The communication unit 208 transmits the retrieved information back to the terminal apparatus 100. When the communication unit 208 receives a request to write an emission status or other information about an originating apparatus 300 in the apparatus information storage unit 205, the communication unit 208 stores the information requested to write into the apparatus information storage unit 205. In that case, the communication unit 208 may transmit a reply indicating that the write has been performed back to the terminal apparatus 100. In this variation, the terminal apparatus 100A (the management unit 202 included in the terminal apparatus 100A) generates a signal identifier and transmits the generated signal identifier to the originating apparatus 300.

An operation of the object display system 1A of this variation will be described next with reference to drawings.

The operation of the object display system 1A of this variation is the same as the operation of the object display system 1 of the first exemplary embodiment illustrated in FIGS. 3 to 6.

<Second Variation of First Exemplary Embodiment>

A second variation of the first exemplary embodiment will be described in detail with reference to drawings.

Figure 9:
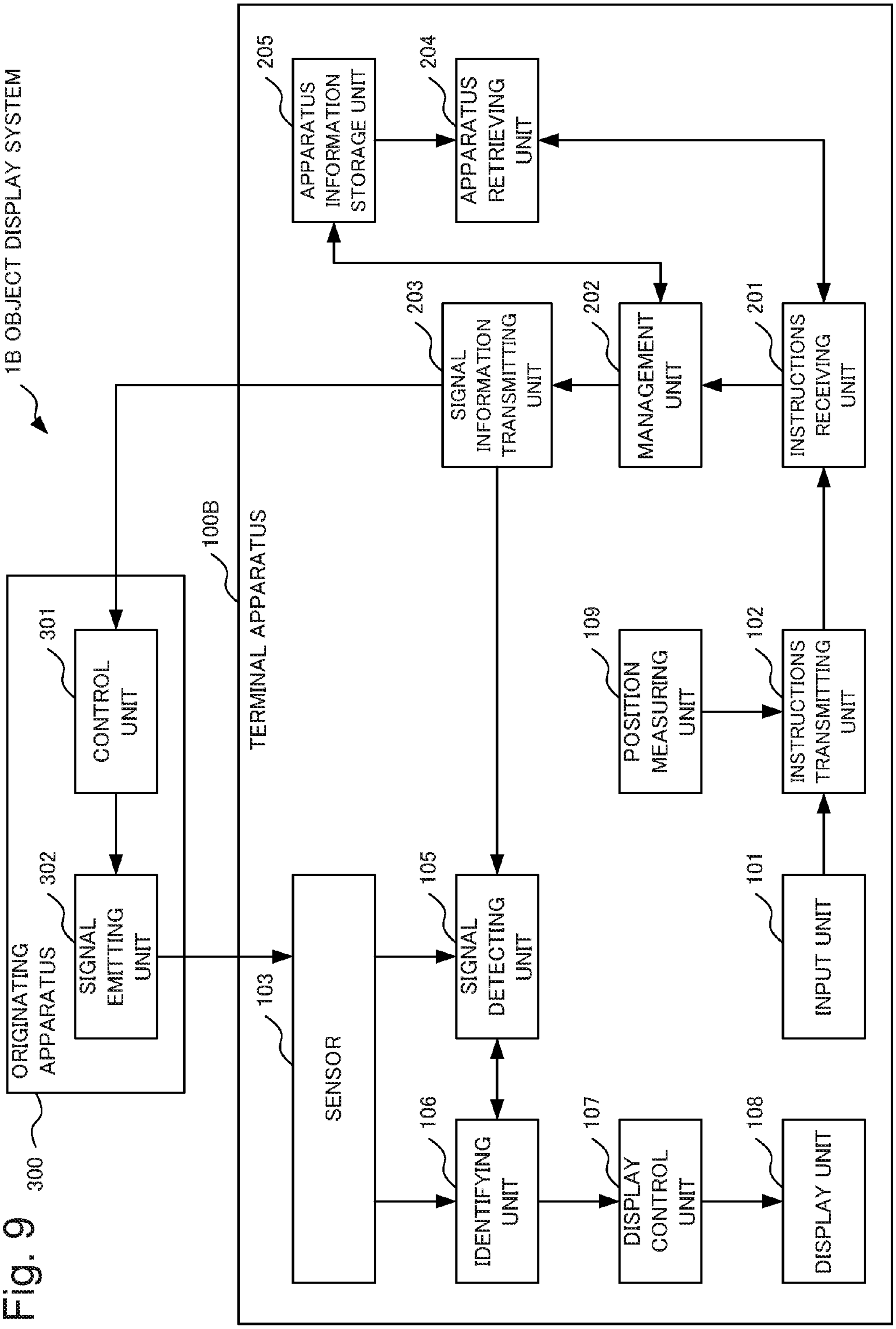
FIG. 9 is a block diagram illustrating a configuration of an object display system according to a second variation of the first exemplary embodiment of the present invention.

FIG. 9 is a block diagram illustrating a configuration of an object display system 1B according to the second variation.

Referring to FIG. 9, the object display system 1B of this variation includes a terminal apparatus 100B and an originating apparatus 300. When the configuration of the object display system 1B illustrated in FIG. 9 is compared with the configuration of the object display system 1 illustrated in FIG. 1, it can be seen that the object display system 1B includes a terminal apparatus 100B in place of the terminal apparatus 100 and the management apparatus 200.

Figure 10:
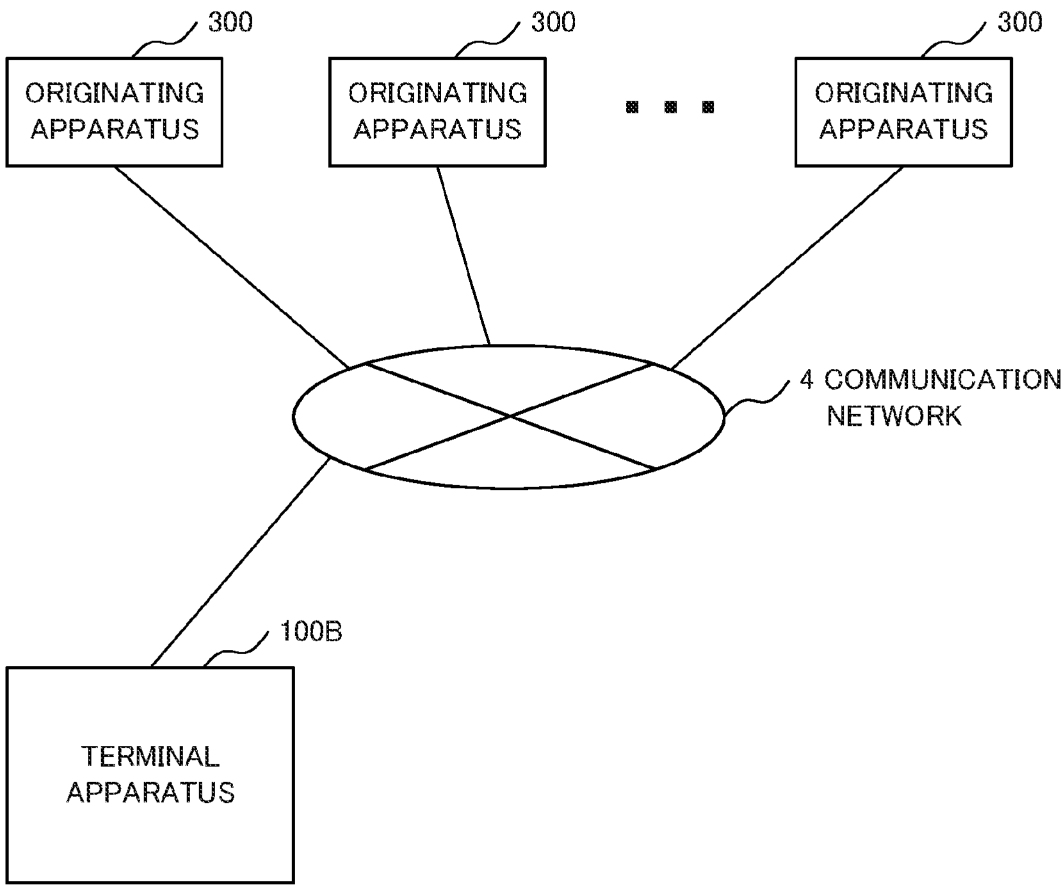
FIG. 10 is a drawing illustrating schematically illustrating an overall picture of a configuration of an object display system according to a second variation of the first exemplary embodiment of the present invention.

FIG. 10 is a diagram schematically illustrating the overall configuration of the object display system 1B of this variation. As illustrated in FIG. 10, the terminal apparatus 100B is communicatively connected to the originating apparatus 300 through a communication network 4, for example.

The terminal apparatus 100B of this variation includes an instructions receiving unit 201, a management unit 202, a signal information transmitting unit 203, an apparatus retrieving unit 204 and an apparatus information storage unit 205, in addition to the components of the terminal apparatus 100 of the first exemplary embodiment. The terminal apparatus 100B of this variation also acts as the management apparatus 200 of the first exemplary embodiment. The originating apparatus 300 of this variation is the same as the originating apparatus 300 of the first exemplary embodiment.

An operation of the object display system 1B of this variation will be described with reference to drawings.

The operation of the object display system 1B of this variation is the same as the operation of the object display system 1 of the first exemplary embodiment illustrated in FIGS. 3 to 6.

<Third Variation of First Exemplary Embodiment>

A third variation of the first exemplary embodiment will be described next in detail with reference to drawings.

Figure 11:
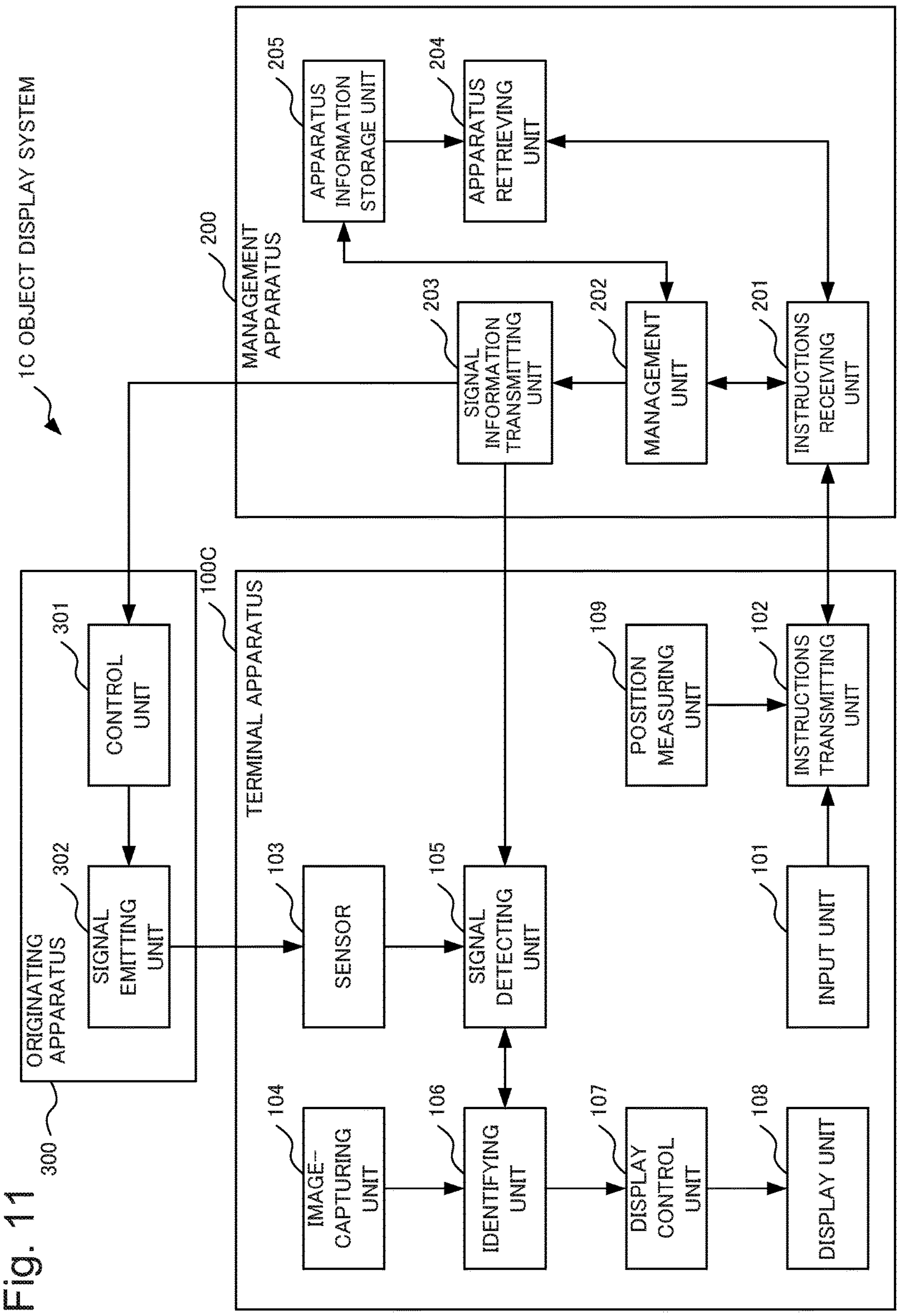
FIG. 11 is a block diagram illustrating a configuration of an object display system according to a third variation of the first exemplary embodiment of the present invention.

FIG. 11 is a block diagram illustrating a configuration of an object display system 1C according to this variation.

Referring to FIG. 11, the object display system 1C of this variation includes a terminal apparatus 100C, a management apparatus 200 and an originating apparatus 300. When the configuration of the object display system 1C illustrated in FIG. 11 is compared with the configuration of the object display system 1 illustrated in FIG. 1, it can be seen that the object display system 1C includes a terminal apparatus 100C in place of the terminal apparatus 100. When the configuration of the terminal apparatus 100C illustrated in FIG. 11 is compared with the configuration of the terminal apparatus 100 illustrated in FIG. 1, it can be seen that the terminal apparatus 100C further includes an image-capturing unit 104. The image-capturing unit 104 may be a camera, for example. A sensor 103 is connected to a signal detecting unit 105. The image-capturing unit 104 is connected to an identifying unit 106.

In this variation, a signal emitting unit 302 of the originating apparatus 300 emits a soundwave instead of light as a signal. The signal emitting unit 302 may be a speaker, for example. The signal emitted by the signal emitting unit 302 may be an ultrasonic wave, which has a higher frequency than audible frequencies. The signal emitted by the signal emitting unit 302 may be an infrasonic sound, which has a lower frequency than audible frequencies. In the following description, a soundwave with an audible frequency, an ultrasonic wave, and an infrasonic sound will be referred to as a "soundwave" or simply "sound". The sensor 103 is a microphone array that outputs a sound signal by which the direction of a soundwave source can be identified. Any of various existing types of microphone arrays may be used as the sensor 103.

The signal detecting unit 105 identifies the direction of the source of a signal which is a soundwave. Further, the signal detecting unit 105 determines whether the signal represents an object identifier assigned to an object apparatus.

The identifying unit 106 estimates a portion of a video captured by the image-capturing unit 104 that corresponds to the direction of a signal source identified by the signal detecting unit 105. The identifying unit 106 identifies the portion estimated to be the portion corresponding to the direction of the signal source as an originating region.

The signal detecting unit 105 may first detect whether the sensor 103, which is a microphone array, has sensed a soundwave. When a soundwave is detected, the signal detecting unit 105 may identify the direction in which the soundwave is being emitted with respect to the direction of the microphone array. Further, the signal detecting unit 105 may determine whether the soundwave is according to a signal pattern representing an object identifier. The identifying unit 106 may estimate the position of the signal source in a video on the basis of the direction detected as the direction in which the soundwave according to the signal pattern representing the object identifier is being emitted and the relationship between the position of the camera capturing the video and the position of the microphone array, which is the sensor 103. In that case, the relationship between the position of the camera capturing the video and the position of the microphone array (for example the relationship between the direction in which the microphone array is directed and the direction in which the camera capturing the video is attached) may be experimentally measured in advance.

The configuration of the object display system 1C of this variation is the same as or similar to the configuration of the object display system 1 of the first exemplary embodiment except the differences described above.

An operation of the object display system 1C of this variation will be described next with reference to drawings.

FIG. 3 is a flowchart illustrating an operation of the object display system 1C of this variation. The operation of the object display system 1C of this variation is the same as or similar to the operation of the object display system 1 of the first exemplary embodiment illustrated in FIGS. 3 to 5 with the only difference being the operation of the object display processing at step S1003.

Figure 12:
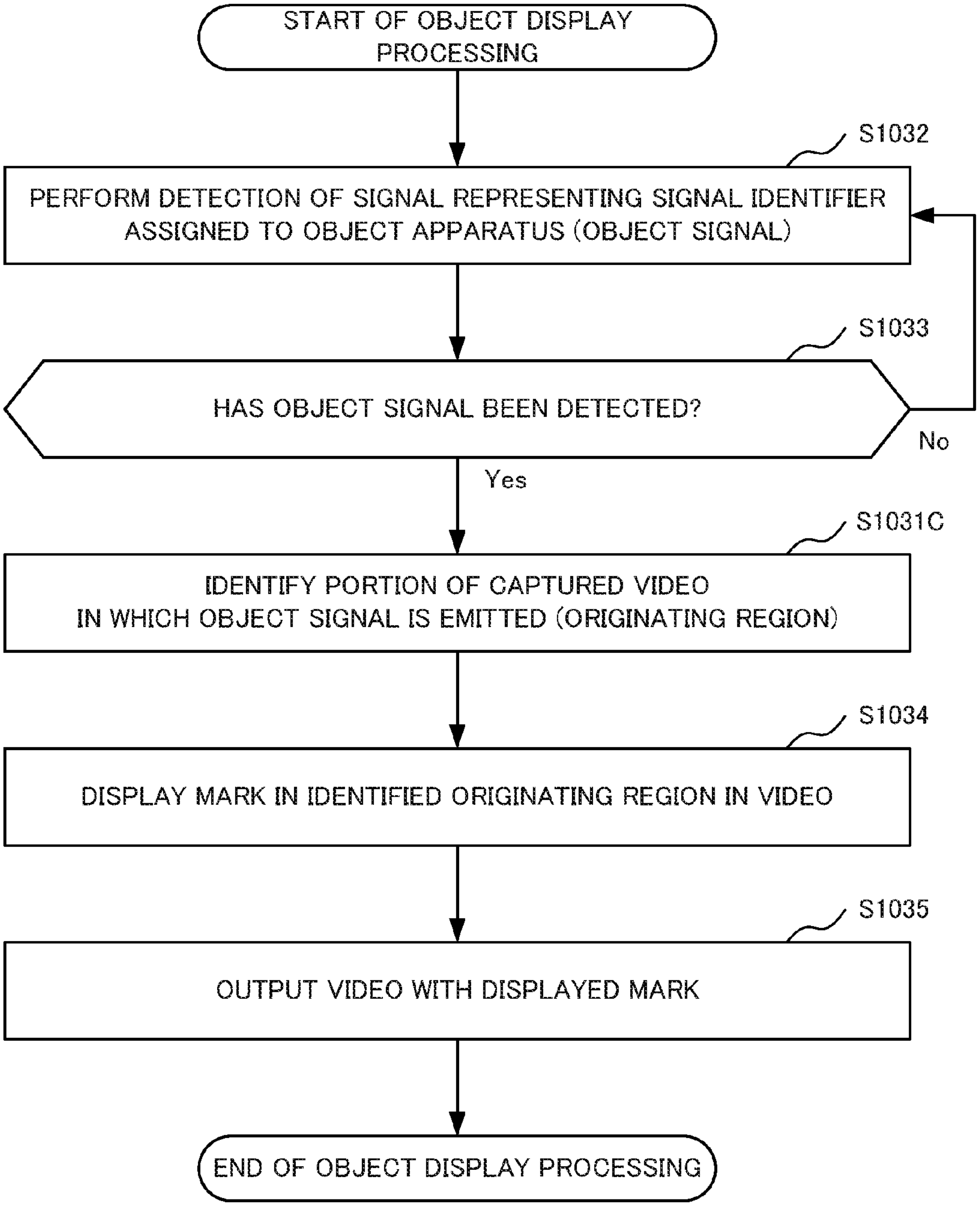
FIG. 12 is a flowchart illustrating an operation of object display processing in the object display system according to the third variation of the first exemplary embodiment of the present invention.

FIG. 12 is a flowchart illustrating the operation of the object display processing of the object display system 1C of this variation.

Referring to FIG. 12, first the signal detecting unit 105 detects whether a signal (i.e. an object signal) represented by a signal identifier assigned to an object apparatus (i.e. an object identifier) is received on the basis of a signal output from the sensor 103 that represents a soundwave sensed by the sensor 103 (step S1032).

If the object signal is not detected (No at step S1033), the signal detecting unit 105 continues detection of the object signal (step S1032).

If the object signal is detected (Yes at step S1033), the signal detecting unit 105 identifies the direction in which the object signal is emitted, on the basis of the signal output from the sensor 103. Then the identifying unit 106 identifies a portion in a video captured by the image-capturing unit 104 in which the object signal is being emitted (an originating region) (step S1031C). The identifying unit 106 may identify the originating region on the basis of information such as the direction in which the object signal is being emitted, the relationship between the position of the sensor 103, which is a microphone array, and the position of the image-capturing unit 104, which is a camera, or camera parameters of the image-image capturing unit 104.

The operations of the object display system 1C of this variation at steps S1034 and S1035 illustrated in FIG. 12 are the same as the operations of the object display system 1 of the first exemplary embodiment at steps S1034 and S1035, respectively, illustrated in FIG. 6.

Second Exemplary Embodiment

A second exemplary embodiment of the present invention will be described next in detail with reference to drawings.

FIG. 1 is a block diagram illustrating an exemplary configuration of an object display system 1 of the present exemplary embodiment. As illustrated in FIG. 1, the configuration of the object display system 1 of the present exemplary embodiment may be the same as the configuration of the object display system 1 of the first exemplary embodiment. The object display system 1 of this embodiment may include two or more terminal apparatuses 100. Two or more users may use different terminal apparatuses 100 to separately select object apparatuses. Two or more different users may select the same originating apparatus 300 as an object apparatus. In the following description, an originating apparatus 300 emits blinking light as a signal.

An apparatus storage unit 205 of the present exemplary embodiment stores apparatus information about an originating apparatus to which a signal identifier is assigned which further includes the signal identifier assigned to the originating apparatus 300 and an identifier of the a terminal apparatus 100 to which the signal identifier has been transmitted. The terminal apparatus 100 to which the signal identifier assigned to the originating apparatus 300 has been transmitted is a terminal apparatus 100 that has selected the originating apparatus 300 as an object apparatus, for example, as will be described later. When the signal identifier assigned to an originating apparatus 300 is transmitted to two or more terminal apparatuses 100, the signal identifier of the originating apparatus 300 includes the identifiers of the two or more terminal apparatuses 100. Apparatus information about an originating apparatus 300 to which a signal identifier is assigned does not include a signal identifier nor the identifier of a terminal apparatus 100.

If the signal identifier associated with the apparatus identifier of an originating apparatus 300 selected as an object apparatus is not stored in the apparatus information storage unit 205, a management unit 202 of the present exemplary embodiment assigns a signal identifier to the originating apparatus 300. The management unit 202 then stores the assigned signal identifier and the identifier of the terminal apparatus 100 that has selected the originating apparatus 300 as the object apparatus into the apparatus information storage unit 205 as part of the apparatus status of the originating apparatus 300. The management unit 202 then transmits the assigned signal identifier to the control unit 301 of the originating apparatus 300 to which the signal identifier is assigned and to the signal detection unit 105 of the terminal apparatus 100 that has selected the originating apparatus 300 as the object apparatus through a signal information transmitting unit 203. The signal information transmitting unit 203 receives the assigned signal identifier from the management unit 202. The signal information transmitting unit 203 transmits the assigned signal identifier to the control unit 301 of the originating apparatus 300 to which the signal identifier is assigned and the signal detecting unit 105 of the terminal apparatus 100 that has selected the originating apparatus 300 as the object apparatus.

If a signal identifier is assigned to an originating apparatus 300 selected as an object apparatus, i.e. if the apparatus status of the originating apparatus 300 stored in the apparatus information storage unit 205 includes a signal identifier, the management unit 202 of the present exemplary embodiment does not assign a new signal identifier to the originating apparatus 300. In that case, the management unit 202 does not transmit a signal identifier to the originating apparatus 300. The management unit 202 retrieves the signal identifier assigned to the originating apparatus 300 from the apparatus information storage unit 205 and transmits the retrieved signal identifier to the terminal apparatus 100 that has selected the originating apparatus 300 as the object apparatus. In addition, the management unit 202 stores the identifier of the terminal apparatus 100 that has selected the originating apparatus 300 as the object apparatus into the apparatus information storage unit 205 as part of the apparatus status of the originating apparatus 300. If the apparatus status is as illustrated in FIG. 7, then the management unit 202 adds the identifier of the terminal apparatus 100 that has selected the originating apparatus 300 as a value of the "Requesting terminal" column in the apparatus status of the originating apparatus 300 selected as the object apparatus.

Like the management unit 202 of the first exemplary embodiment, the management unit 202 receives an end instruction from the terminal apparatus 100 through the instructions receiving unit 201. When the management unit 202 receives the end instruction from the terminal apparatus 100, the management unit 202 determines whether an identifier of another terminal apparatus 100 is associated with the apparatus identifier of the originating apparatus 300 associated with the identifier of the terminal apparatus 100. In the following description, an originating apparatus 300 associated with an identifier of a terminal apparatus 100 that has transmitted an end instruction will be referred to as a "display-end originating apparatus".

If the identifier of another terminal apparatus 100 is associated with the apparatus identifier of the display-end originating apparatus, the management unit 202 deletes the identifier of the terminal apparatus 100 that has transmitted the end instruction, which is associated with the apparatus identifier of the display-end originating apparatus, from the apparatus information storage unit 205. If the apparatus status illustrated in FIG. 7 is stored in the apparatus information storage unit 205, the management unit 202 deletes the identifier of the terminal apparatus 100 that has transmitted the end instruction from the "Requesting terminal" column in the apparatus status of the display-end originating apparatus. In this case, the management unit 202 does not transmit the end instruction to the display-end originating apparatus.

If the identifier of another terminal apparatus 100 is not associated with the apparatus identifier of the display-end originating apparatus, the management unit 202 deletes the signal identifier associated with the apparatus identifier of the display-end originating apparatus from the apparatus information storage unit 205. The management unit 202 also deletes the identifier of the terminal apparatus 100 that has sent the end instruction, which is associated with the apparatus identifier of the display-end originating apparatus, from the apparatus information storage unit 205. If the apparatus information illustrated in FIG. 7 is stored in the apparatus information storage unit 205, the management unit 202 deletes the identifier of the terminal apparatus 100 that has transmitted the end instruction from the "Requesting terminal" column in the apparatus status of the display-end originating apparatus. Further, the management unit 202 changes the value of the emission status in the apparatus status of the display-end originating apparatus from the signal identifier to a value representing "No emission". The management unit 202 then transmits the end instruction to the display-end originating apparatus.

An operation of the object display system 1 of the present exemplary embodiment will be described next in detail with reference to a drawing. In the following, the description of the operation of the object display system 1 is divided and an operation of a terminal apparatus 100 and an operation of the management apparatus 200 are described separately.

Figure 14:
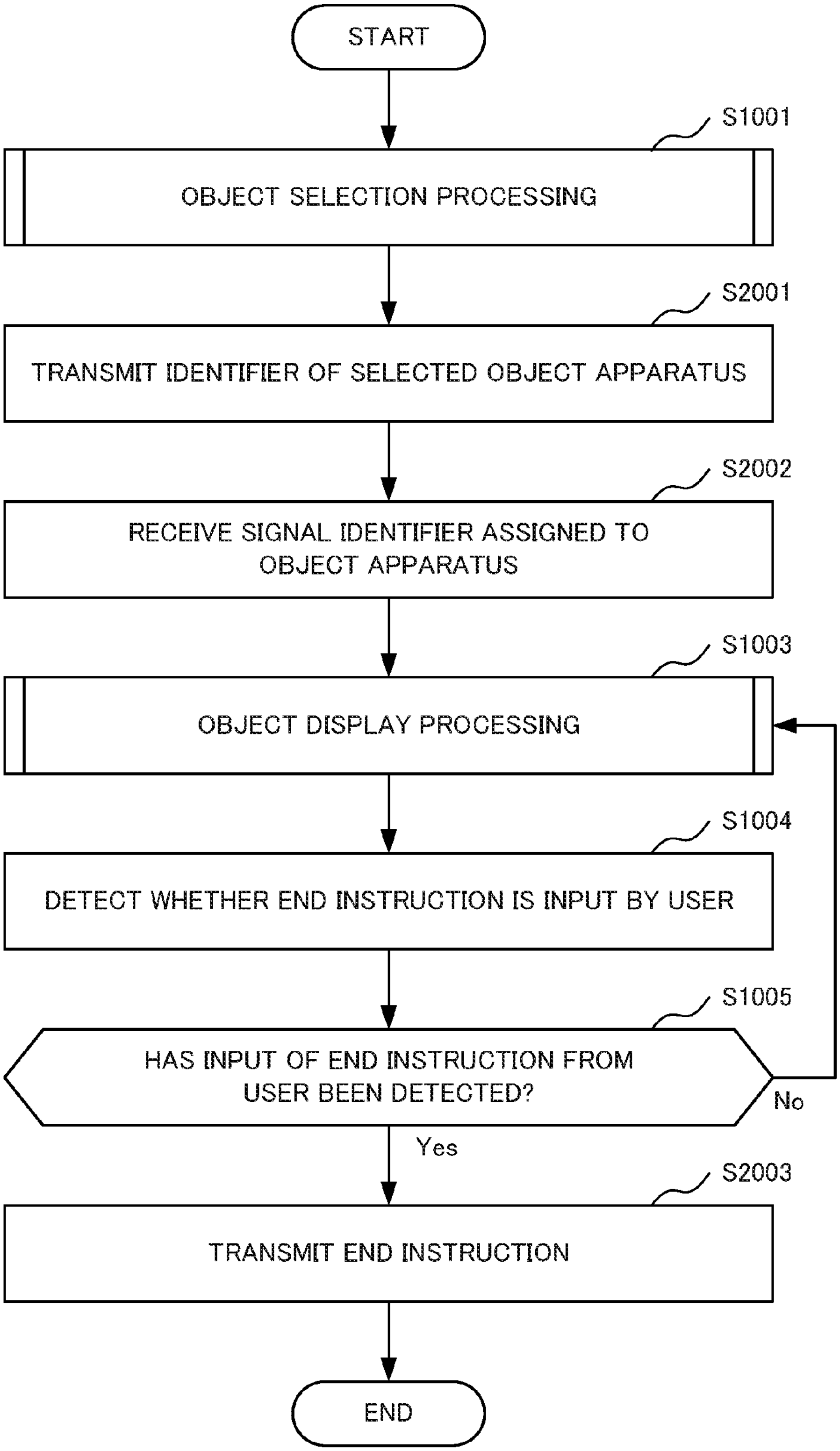
FIG. 14 is a flowchart illustrating an example of an operation of terminal apparatus according to a second exemplary embodiment of the present invention.

FIG. 14 is a flowchart illustrating an example of an operation of a terminal apparatus 100 of the present exemplary embodiment.

Referring to FIG. 14, the terminal apparatus 100 of the present exemplary embodiment first performs object selection processing (step S1001). The object selection processing at step S1001 is the same as the object selection processing in the first exemplary embodiment illustrated in FIG. 4.

Then the instructions transmitting unit 102 transmits the apparatus identifier of an originating apparatus 300 selected by the user (i.e. an object apparatus) to the instructions receiving unit 202 of the management apparatus (step S2001).

When the management apparatus 200 receives the apparatus identifier of the object apparatus, the management apparatus 200 retrieves a signal identifier assigned to the object apparatus from the apparatus information storage unit 205 if one is already assigned to the object apparatus. The management apparatus 200 transmits the retrieved signal identifier to the signal detecting unit 105 of the terminal apparatus 100 that has transmitted the apparatus identifier of the object apparatus.

When the management unit receives the apparatus identifier of the object apparatus, the management apparatus 200 assigns a signal identifier to the object apparatus if one is not assigned to the object apparatus. The management apparatus 200 stores the signal identifier assigned to the object apparatus into the apparatus information storage unit 205. The management apparatus 200 then transmits the signal identifier assigned to the object apparatus to the originating apparatus 300 and to the signal detecting unit 105 of the terminal apparatus 100.

The operation of the management apparatus 200 described above will be detailed later.

The signal detecting unit 105 receives the signal identifier assigned to the object apparatus (the object identifier) from the management apparatus 200 (step S2002).

Then the terminal apparatus 100 performs object display processing (step S1003). The object display processing according to the present exemplary embodiment is the same as the object display processing according to the first exemplary embodiment illustrated in FIG. 6.

While viewing a video in which a mark is displayed in an originating region, which is a region of a signal source, the user of the terminal apparatus 100 may locate the originating apparatus that the user has selected as the object apparatus. When the user finds the originating apparatus 300 that the user has selected as the object apparatus, the user uses the input unit 101 to input an end instruction in the terminal apparatus 100.

The instructions transmitting unit 102 detects whether a predetermined user operation representing an instruction to end the output of a video in which a mark is displayed is input as an input of an end instruction (step S1004). If an input of the end instruction is not detected (No at step S1005), the terminal apparatus 100 repeats the operation at step S1003 and the subsequent steps to continue the object display processing. If an input of the end instruction is detected (Yes at step S1005), the instructions transmitting unit 102 transmits the end instruction to the management apparatus 200. An operation of the management apparatus 200 when receiving the end instruction will be described later in detail. The terminal apparatus 100 then ends the output of the video in which the mark is displayed to the display unit 108. In this case, the terminal apparatus 100 may end the display of the mark in the video or may end the output of the video itself.

The operation of the management apparatus 200 of the present exemplary embodiment will be described in detail with reference to drawings.

Figure 15:
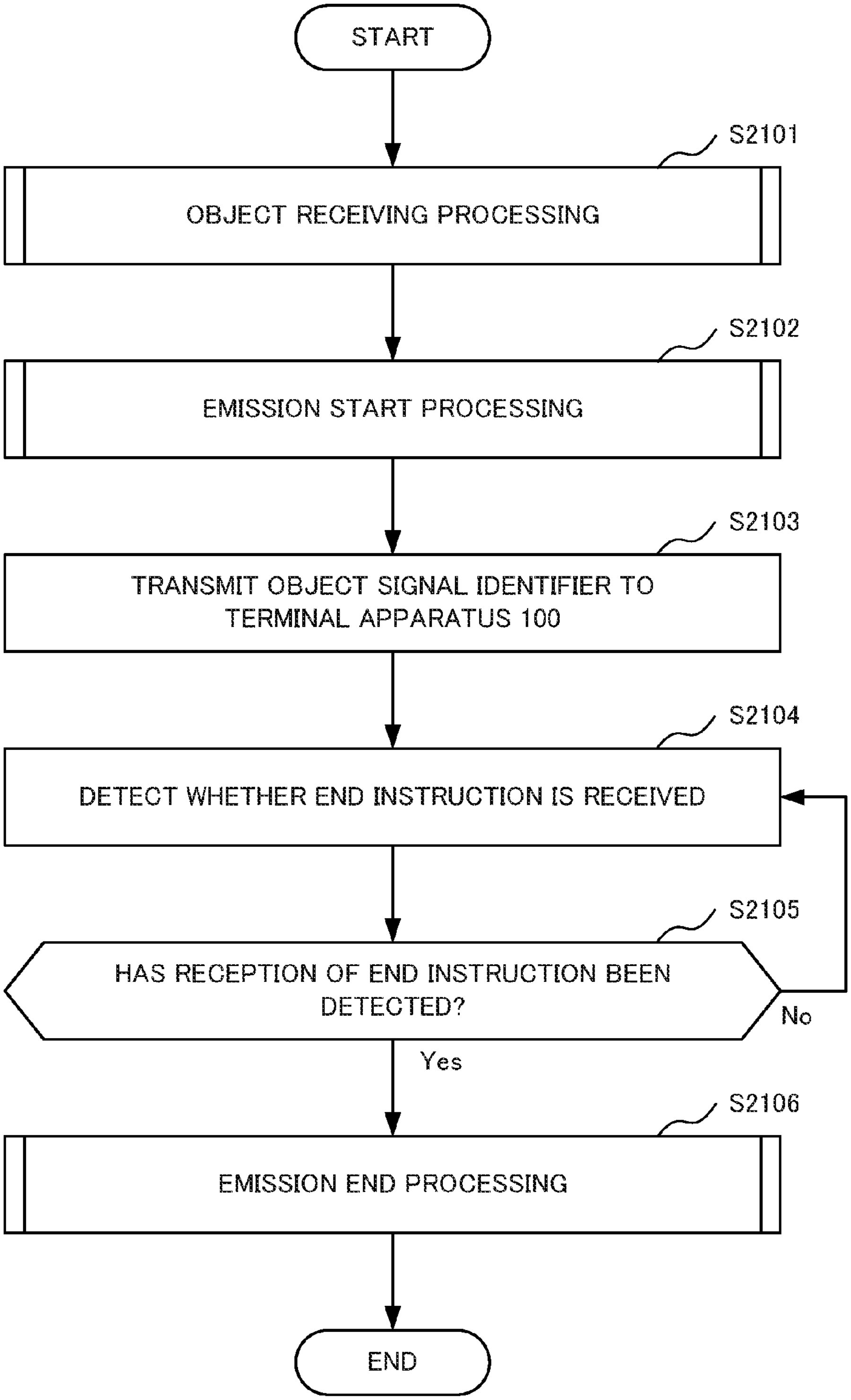
FIG. 15 is a flowchart illustrating an example of an operation of a management apparatus according to the second exemplary embodiment of the present invention.

FIG. 15 is a flowchart illustrating an example of the operation of the management apparatus 200 of the present exemplary embodiment.

Referring to FIG. 15, the management apparatus 20 performs object receiving processing for receiving the apparatus identifier identifying an object apparatus (step S2101).

Figure 16:
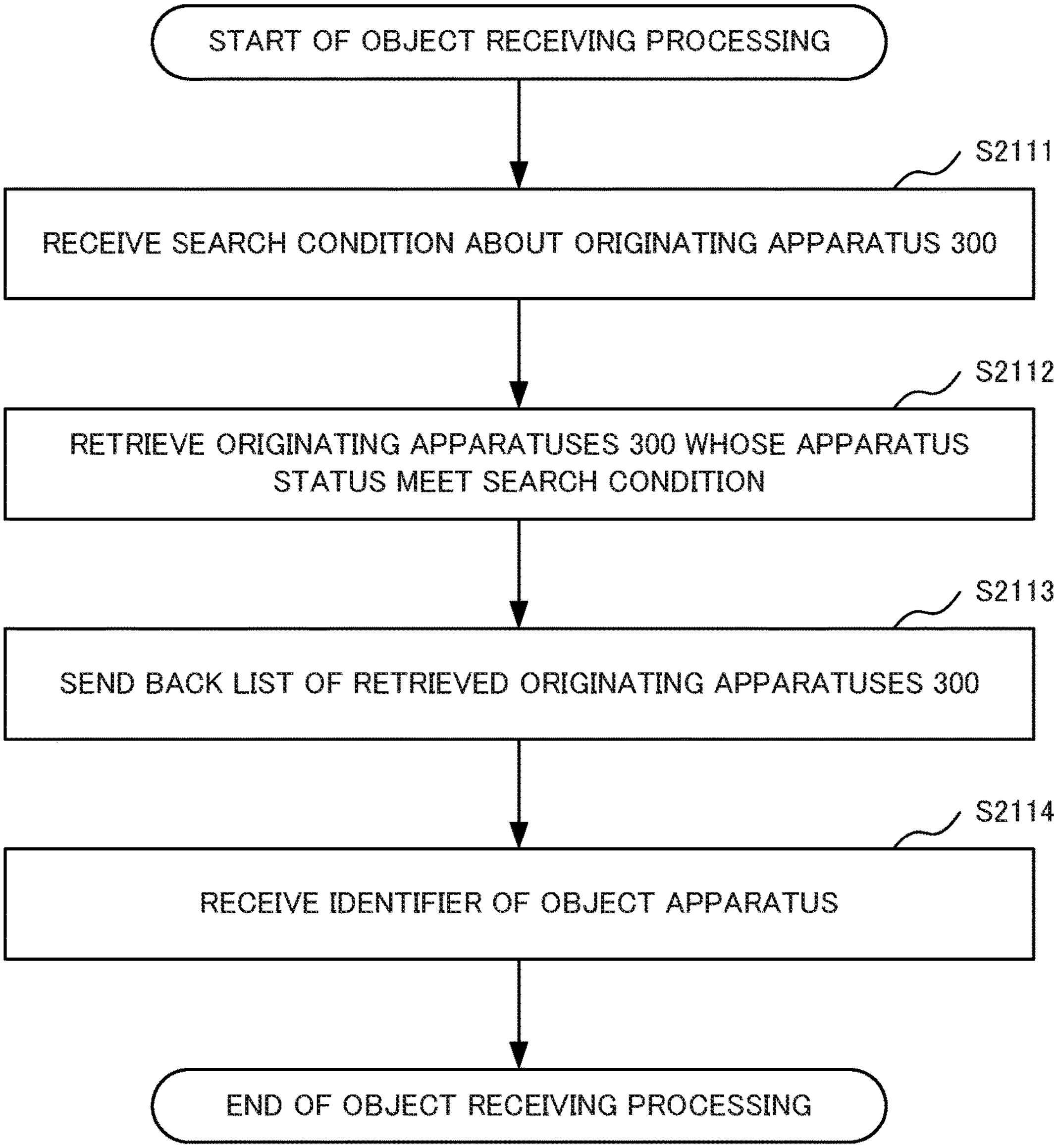
FIG. 16 is a flowchart illustrating object receiving processing in the second exemplary embodiment of the present invention.

FIG. 16 is a flowchart illustrating the object receiving processing of the present exemplary embodiment.

Referring to FIG. 16, first the instructions receiving unit 201 receives a search condition about an originating apparatus 300 from the instructions transmitting unit 102 of a terminal apparatus 100 (step S2111). Then the apparatus retrieving unit 204 retrieves originating apparatuses 300 that have an apparatus status stored in the apparatus information storage unit 205 that meet the received search condition (step S2112). The apparatus retrieving unit 204 transmits a list of the retrieved originating apparatuses 300 back to the instructions transmitting unit 102 of the terminal apparatus 100 through the instructions receiving unit 201 (step S2113).

The terminal apparatus 100 displays the received list of originating apparatuses 300. The user of the terminal apparatus 100 selects an originating apparatus 300 from the list of originating apparatuses 300. The instructions transmitting unit 102 of the terminal apparatus 100 transmits the apparatus identifier of the object apparatus, which is the originating apparatus 300 selected by the user, to the instructions receiving unit 201.

The instructions receiving unit 201 receives the apparatus identifier of the object apparatus from the instructions transmitting unit 102 of the terminal apparatus 100 (step S2114). With this, the object receiving process illustrated in FIG. 16 ends.

Then, at step S2101 of FIG. 15, the management apparatus 200 performs emission start processing.

Figure 17:
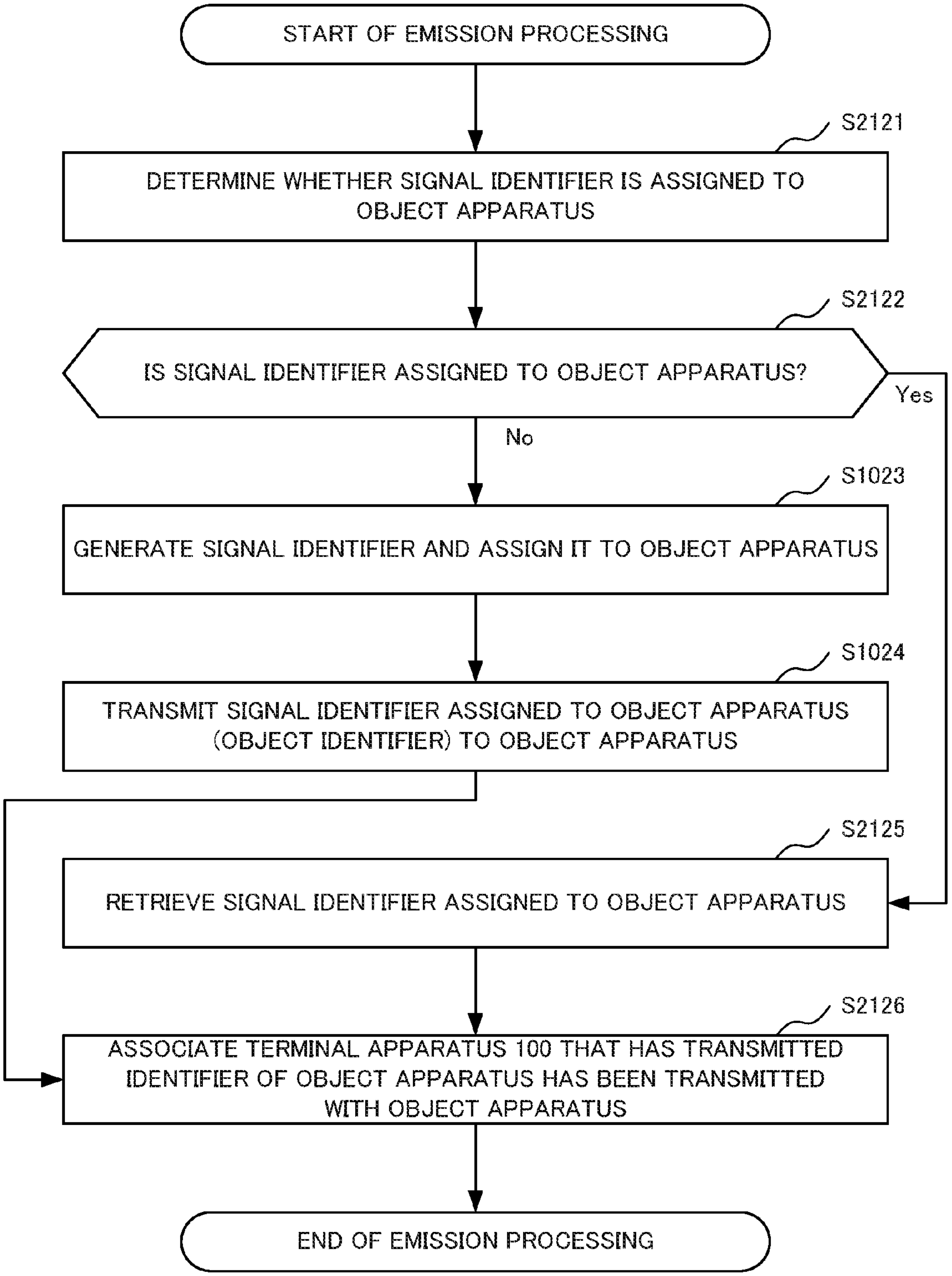
FIG. 17 is a flowchart illustrating an example of emission start processing in the second exemplary embodiment of the present invention.

FIG. 17 is a flowchart illustrating an example of the emission start processing of the present exemplary embodiment.

Referring to FIG. 17, the management unit 202 determines whether a signal identifier is assigned to the object apparatus identified by the apparatus identifier received at step S2114 (step S2121). If a signal identifier associated with the apparatus identifier of the object apparatus is stored in the apparatus information storage unit 205, the signal identifier is assigned to the object apparatus. If a signal identifier associated with the apparatus identifier of the object apparatus is not stored in the apparatus information storage unit 205, no signal identifier is assigned to the object apparatus. The management unit 202 therefore needs only to determine whether a signal identifier associated with the apparatus identifier of the object apparatus is stored in the apparatus information storage unit 205.

If no signal identifier is assigned to the object apparatus (No at step S2122), the management unit 202 generates a signal identifier and assigns the generated signal identifier to the object apparatus (S1023). Then the signal information transmitting unit 203 transmits the signal identifier assigned to the object apparatus to the object apparatus (step S1024). The object apparatus receives the signal identifier and starts emitting a signal representing the received signal identifier.

The management unit 202 associates the terminal apparatus 100 that has transmitted the apparatus identifier of the object apparatus with the object apparatus (step S2126). Specifically, the management unit 202 stores the identifier of the terminal apparatus 100 in the apparatus information storage unit 205 in association with the apparatus identifier of the object apparatus. In other words, the management unit 202 adds the identifier of the terminal apparatus 100 to the apparatus status of the object apparatus which is stored in the apparatus information storage unit 205.

If a signal identifier is assigned to the object apparatus (Yes at step S2122), the management unit 202 retrieves the signal identifier assigned to the object apparatus from the apparatus information storage unit 205 (step S2125). If a signal identifier is assigned to the object apparatus, it means that the object apparatus is emitting a signal representing the assigned signal identifier. The management unit 202 associates the terminal apparatus 100 that has transmitted the apparatus identifier of the object apparatus with the object apparatus (step S2126).

With this, the operation of the emission start processing illustrated in FIG. 17 ends.

Then, at step S2103 of FIG. 15, the signal information transmitting unit 203 transmits the signal identifier assigned to the object apparatus (i.e. the object identifier) to the signal detecting unit 105 of the terminal apparatus 100.

The signal detecting unit 105 of the terminal apparatus 100 receives the object identifier and performs the object display processing at step S1003 of FIG. 14 (i.e. the processing illustrated in FIG. 6), for example. For example, when the user finds the object apparatus, the user performs on the terminal apparatus 100 an operation representing the end instruction to end the output of the video in which the mark is displayed. When the user performs an operation representing the end instruction on the terminal apparatus 100, the terminal apparatus 100 transmits the end instruction to the management apparatus 200. The end instruction that the terminal apparatus 100 transmits to the management apparatus 200 may be a predetermined data value representing the instruction that instructs the originating apparatus 300 to end the emission of the signal.

Then the instructions receiving unit 201 performs detection of the end instruction (step S2104). If reception of the end instruction is not detected (No at step S2105), the instructions receiving unit 201 continues detection of reception of the end instruction (step S2104).

If reception of the end instruction is detected (Yes at step S2105), the management apparatus 200 performs emission end processing (step S2106).

Figure 18:
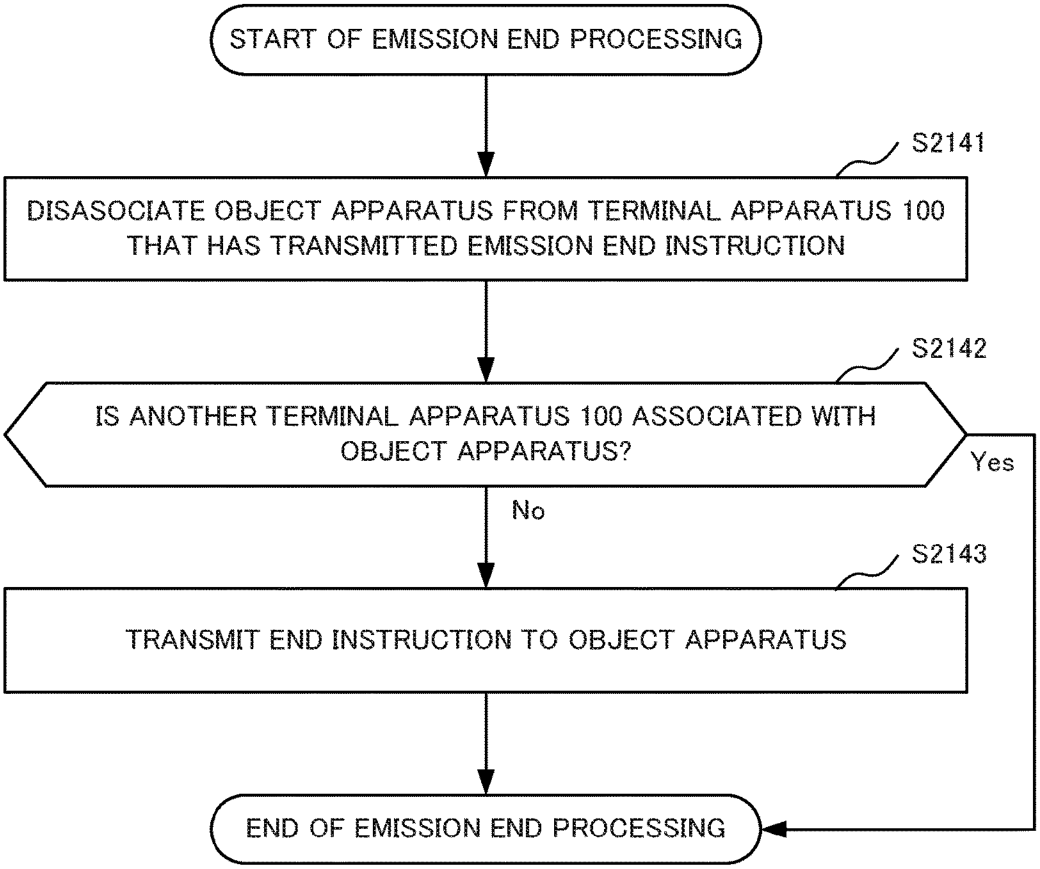
FIG. 18 is a flowchart illustrating an example of emission end processing in the second exemplary embodiment of the present invention.

FIG. 18 is a flowchart illustrating an example of the emission end processing according to the present exemplary embodiment.

Referring to FIG. 18, first the management unit 202 dissociates the object apparatus from the terminal apparatus 100 that has transmitted the end instruction (step S2141). Specifically, the management unit 202 deletes the identifier of the terminal apparatus 100 that has transmitted the end instruction from the apparatus status of the object apparatus stored in the apparatus information storage unit 205. In other words, the management unit 202 returns the apparatus status of the terminal apparatus 100 that has transmitted the end instruction to the previous apparatus status in which the signal identifier assigned to the object apparatus has not been transmitted to the terminal apparatus 100.

If another terminal apparatus 100 is also associated with the object apparatus (Yes at step S2142), i.e. if the apparatus status of the object apparatus includes the identifier of another terminal apparatus 100, the management unit 202 does not transmit the end instruction to the object apparatus. In that case, the user of the other terminal apparatus 100 associated with the object apparatus is displaying a video with the mark displayed in the position of the object apparatus on his/her terminal apparatus 100. The object terminal continues emitting the signal representing the signal identifier because the management unit 202 does not transmit the end instruction to the object apparatus. The management apparatus 200 then ends the emission end processing illustrated in FIG. 18.

If there is not another terminal apparatus 100 to which the signal identifier assigned to the object apparatus has been transmitted, the apparatus status of the object terminal stored in the apparatus information storage unit 205 does not include the identifier of another terminal apparatus 100. In other words, there is not another terminal apparatus 100 associated with the object apparatus. When there is not another terminal apparatus 100 associated with the object apparatus (No at step S2142), signal information transmitting unit 203 transmits the end instruction to the object apparatus (step S2143). In this case, the object apparatus ends emission of the signal representing the signal identifier. Then the management unit 202 may delete the signal identifier assigned to the object apparatus from the apparatus status of the object apparatus stored in the apparatus information storage unit 205. In other words, the management unit 202 changes the apparatus status of the object apparatus to the status in which the signal identifier is not assigned to the object apparatus. The management apparatus 200 then ends the emission end processing illustrated in FIG. 18.

With this, the operation of the management apparatus 200 of the present exemplary embodiment illustrated in FIG. 15 ends.

The operation of an originating apparatus 300 of the present exemplary embodiment is the same as the operation of the originating apparatus 300 of the first exemplary embodiment. Therefore the description of the operation will be omitted.

The second exemplary embodiment described above has the same advantageous effect as the first exemplary embodiment. The reasons are the same as the reasons for the advantageous effects of the first exemplary embodiment.

The second exemplary embodiment also has a seventh advantageous effect described below.

The seventh advantageous effect is that a plurality of users can use different terminal apparatuses 100 to search for the same object without assigning a unique identifier to the object to be searched for. This is because when a user selects an object that has been already selected by another user as an object to be searched for, an identifier generated when the other user has selected the object as the object to be searched for is transmitted to the terminal used by the user. In this case, the user of the terminal cannot determine whether the identifier transmitted to the terminal is a newly generated identifier or an identifier that has been previously generated. This prevents private information leakage between users.

The seventh advantageous effect can be restated as follows, for example.

This exemplary embodiment advantageously allows two or more users to display a video in which a mark indicating the position of the same object is displayed on different terminal apparatuses 100.

The reason is as follows. If a signal identifier is associated with an originating apparatus 300, the management unit 202 does not assign another signal identifier to the originating apparatus 300. If a signal identifier is assigned to an originating apparatus 300, the management unit 202 transmits the signal identifier to a terminal apparatus 100 that has newly selected the originating apparatus 300 as an object apparatus. When the user of the terminal apparatus 100 ends the display of a mark representing the object apparatus on the terminal apparatus, the management unit 202 does not cause the object apparatus to end emission of the signal if another terminal apparatus 100 is associated with the object apparatus. If another terminal apparatus 100 is associated with the object apparatus, the other terminal apparatus 100 is displaying the mark representing the object apparatus. Thus, two or more users can display on different terminal apparatuses 100 a video in which the mark indicating the position of the same object apparatus is displayed.

Third Exemplary Embodiment

A third exemplary embodiment of the present invention will be described next in detail with reference to drawings.

According to this embodiment, when an object signal is not detected, an estimated position of an object signal originating region is indicated to the user instead of the measured position of the object signal originating region.

Figure 19:
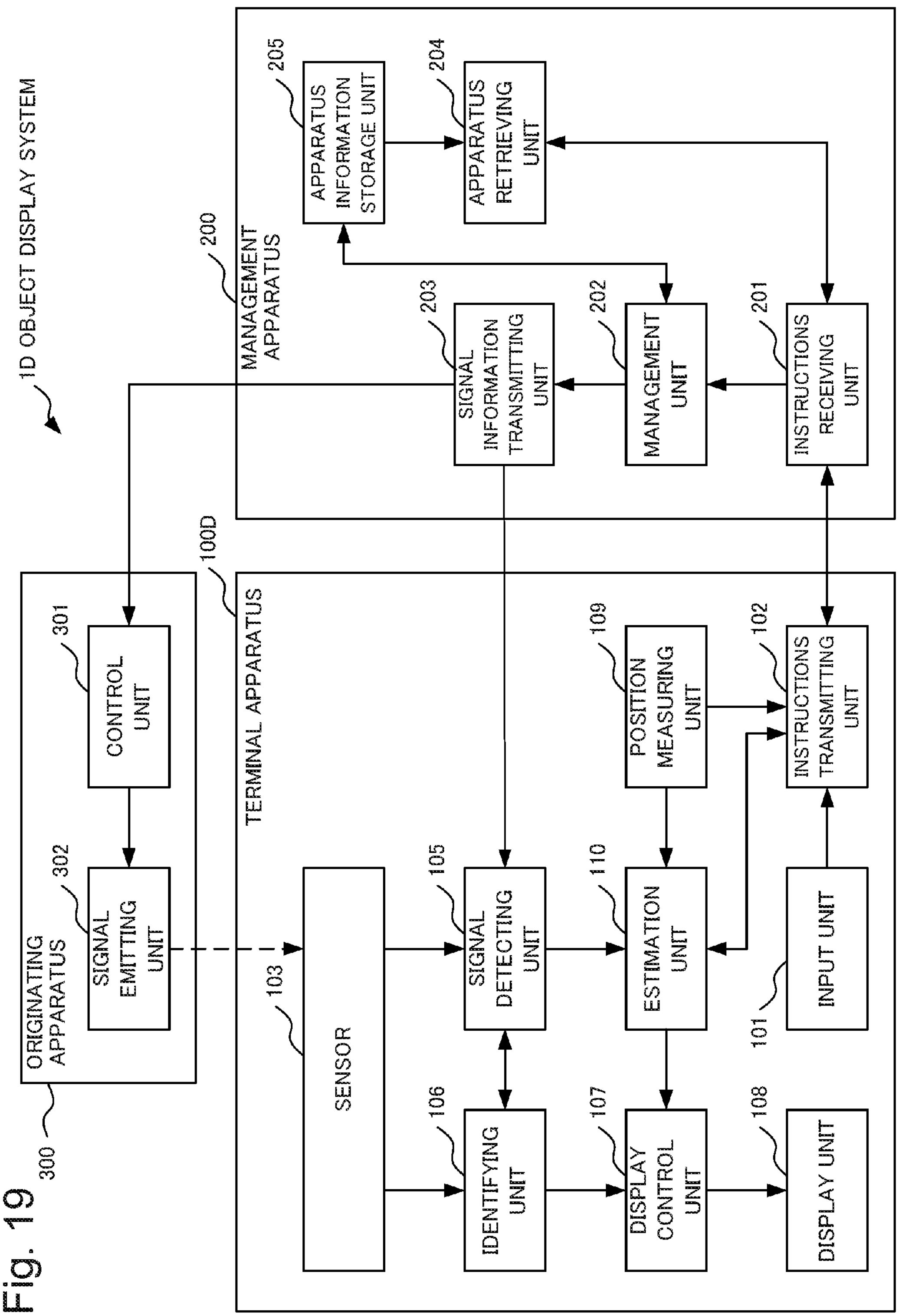
FIG. 19 is a block diagram illustrating an example of a configuration of an object display system according to a third exemplary embodiment of the present invention.

FIG. 19 is a block diagram illustrating an exemplary configuration of an object display system 1D according to the present exemplary embodiment.

When comparison is made between FIG. 19 and FIG. 1, the object display system 1D of the present exemplary embodiment includes a terminal apparatus 100D instead of the terminal apparatus 100. The terminal apparatus 100D includes an estimation unit 110 in addition to the components of the terminal apparatus 100.

A position measuring unit 109 of the present exemplary embodiment detects the direction of a terminal apparatus 100 in addition to the position of the terminal apparatus 100. The position measuring unit 109 may use a GPS-based positioning device to detect the latitude and longitude of a terminal apparatus 100 as the position of the terminal apparatus 100. The position measuring unit 109 may be designed to detect the direction in which the sensor 103 of the terminal apparatus 100 is directed by using a triaxial electronic compass and triaxial acceleration sensor. A reference direction used for measurement of a direction by the position measuring unit 109 and the direction in which the sensor 103 is directed may be in a known relationship.

When a signal representing an object identifier is not detected by the signal detecting unit 105, the estimation unit 110 estimates the position of an image of an object apparatus in a video captured by a sensor 103 on the basis of the position of the terminal apparatus 100D and the position of the object apparatus. In that case, a display control unit 107 displays a mark in the position of the image of the object apparatus in a video captured by the sensor 103 that has been estimated by the estimation unit 110. Then the display control unit 107 outputs the video in which the mark is displayed to a display unit 108.

The object display system 1D of the present exemplary embodiment is the same as or similar to the object display system 1 of the second exemplary embodiment except differences described above.

Figure 20:
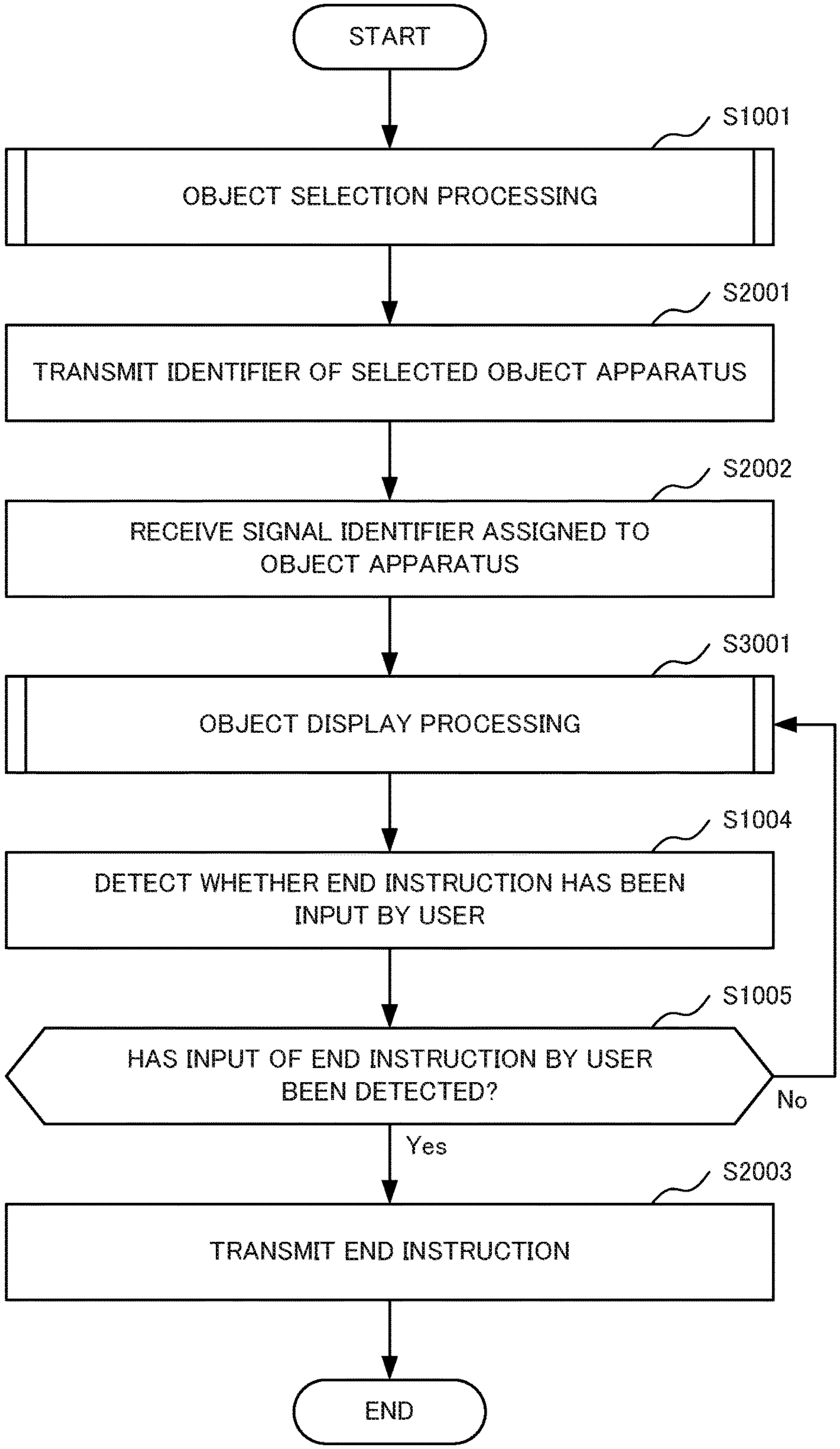
FIG. 20 is a flowchart illustrating an example of an operation of the terminal apparatus according to the third exemplary embodiment of the present invention.

FIG. 20 is a flowchart illustrating an example of an operation of the terminal apparatus 100D of the present exemplary embodiment.

When FIG. 20 is compared with FIG. 14, it can be seen that the operations at the steps of the terminal apparatus 100D illustrated in FIG. 20 other than the object display processing at step S3001 are the same as the operations of the terminal apparatus 100 of the second exemplary embodiment at the steps with the same reference numerals in FIG. 14. Therefore the description of the operations at the steps illustrated in FIG. 20 other than the operation at step S3001 will be omitted.

Figure 21:
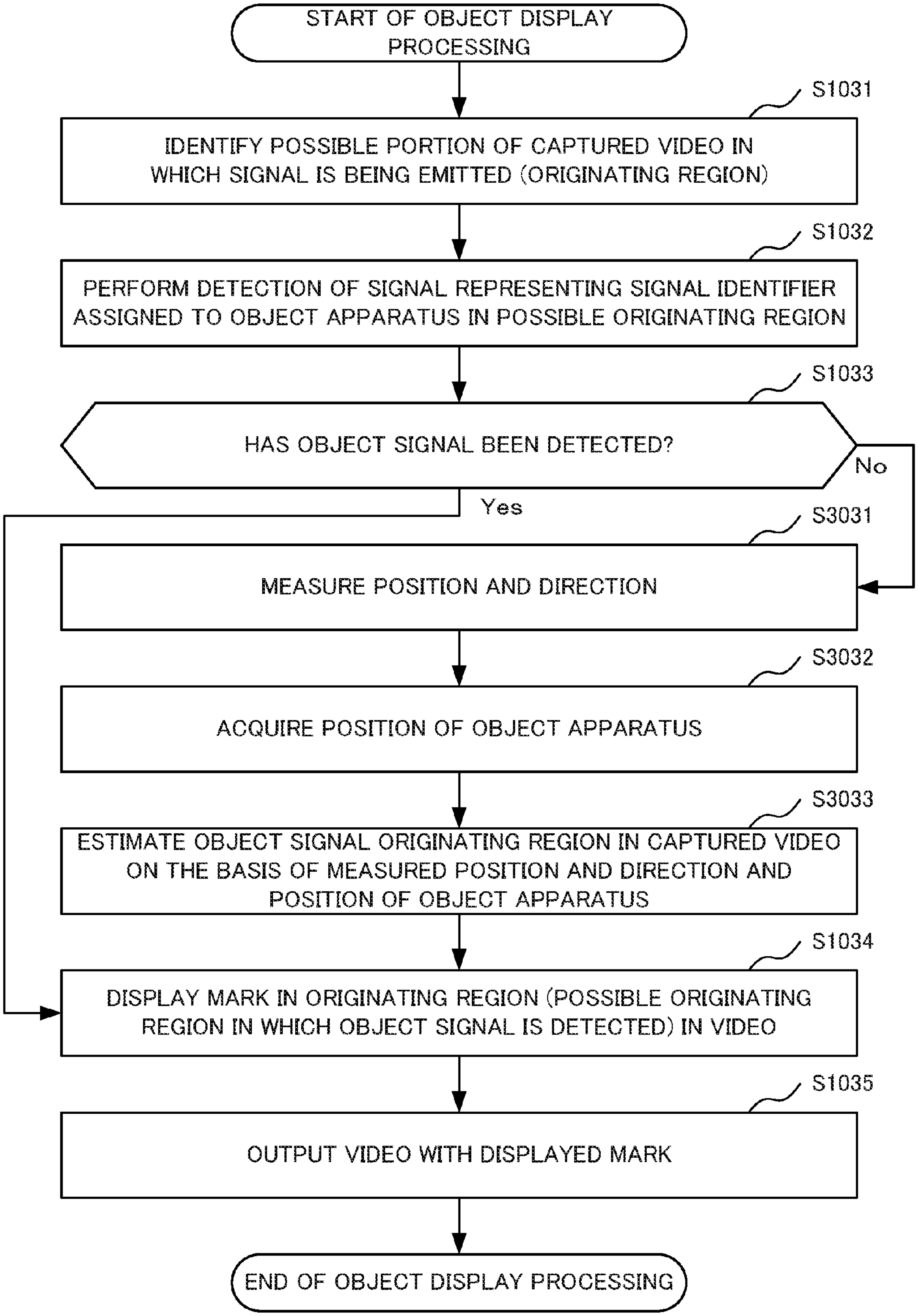
FIG. 21 is a flowchart illustrating an example of object display processing in the third exemplary embodiment of the present invention.

FIG. 21 is a flowchart illustrating an example of the object display processing at step S3001 of the present exemplary embodiment.

When FIG. 21 is compared with FIG. 6, it can be seen that the operation of the terminal apparatus 100D of the present exemplary embodiment at step S1031 is the same as the operation of the terminal apparatus 100 of the second exemplary embodiment at step S1031.

The operation of the terminal apparatus 100D of the present exemplary embodiment when an object signal is detected (Yes at step S1032) is the same as the operation of the terminal apparatus 100 of the second exemplary embodiment when an object signal is detected. Therefore the description of the operation in that case will be omitted.

When an object signal is not detected (No at step S1032), the position measuring unit 109 measures the position and direction of the terminal apparatus 100D (step S3031).

Then the estimation unit 110 requests, through the instructions transmitting unit 102, a management apparatus 200 to transmit the position of the object apparatus to acquire the position of the object apparatus (step S3032). The position of the object apparatus may be for example the latitude and longitude of the location in which the object apparatus is installed. When the instructions receiving unit 201 of the management apparatus 200 receives the request to transmit the position of the object apparatus from the instructions transmitting unit 102 of the terminal apparatus 100D, the instructions receiving unit 201 may send the request to transmit the position of the object apparatus to the apparatus retrieving unit 204. The apparatus retrieving unit 204 may retrieve the position of the object apparatus from the apparatus information storage unit 205 and may transmit the retrieved position of the object apparatus back to the instructions transmitting unit 102 of the terminal apparatus 100D. The instructions transmitting unit 102 may send the transmitted position of the object apparatus to the estimation unit 110.

Then the estimation unit 110 estimates the object signal originating region in a video captured by the sensor 103 on the basis of the estimated position and direction of the object apparatus and camera parameters of the sensor 103, which is a camera, or other information, of the terminal apparatus 100D (step S3033). The estimation unit 110 may calculate the direction of the location in which the object apparatus is installed with respect to the optical axis of the sensor 103, for example. The estimation unit 110 may then estimate, as the originating region of the object signal, a region in the video captured by the sensor 103 in which a captured video image of a predetermined angular extent of a scene that includes the calculated direction appears.

Then the display control unit 107 displays a mark in the originating region in the video (step S1034). The display control unit 107 then output the video in which the mark is displayed to the display unit 108.

The exemplary embodiment described above has the same advantageous effects as the first and second exemplary embodiments. The reasons are the same as the reasons for the advantageous effects of the first and second embodiments.

When a signal (i.e. blinking light) emitted from an object apparatus is blocked by an obstacle or the like, or when an object apparatus cannot emit a signal, for example, as signal from the object apparatus cannot be sensed. This exemplary embodiment has the advantageous effect of making it possible for the user to go in the direction of the location in which the object apparatus is installed when the sensor 103 cannot sense a signal from the object apparatus.

This is because the estimation unit 110 estimates the originating region in a video captured by the sensor 103. The display control unit 107 can therefore display a mark in the estimated originating region in a video captured by the sensor 103 even when an object signal from the object apparatus is not detected by the signal detecting unit 105. Accordingly, the user can go in the direction of the location in which the object apparatus is installed even when the sensor 103 cannot sense a signal from the object apparatus.

Fourth Exemplary Embodiment

Next, a fourth exemplary embodiment of the present invention will be described in detail with reference to drawings. The present exemplary embodiment is an exemplary embodiment informing a user about an approximate position of an object apparatus by displaying a mark on an estimated position of an originating area of an object signal, when the object apparatus has a failure.

Figure 22:
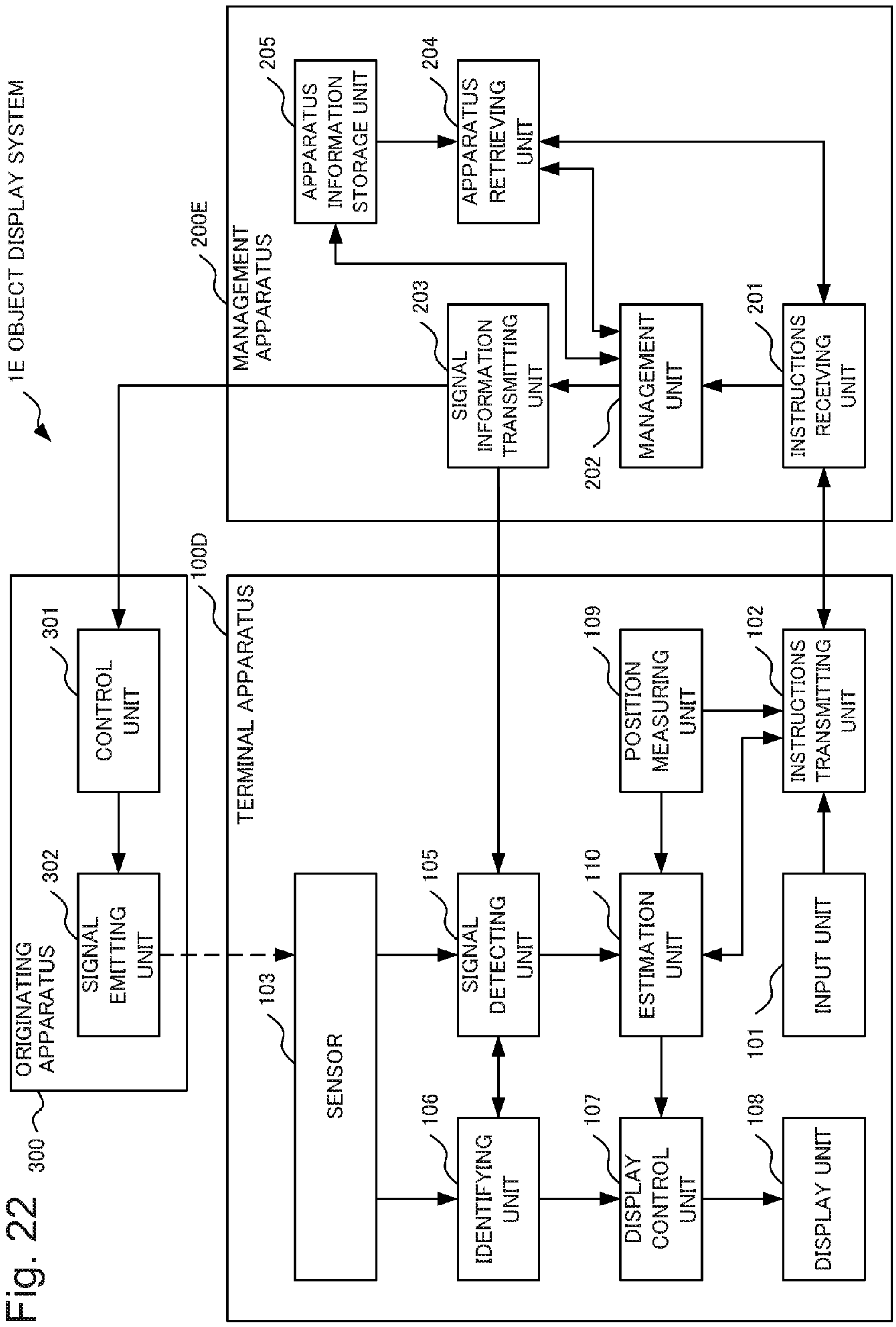
FIG. 22 is a block diagram illustrating an example of a configuration of an object display system according to a fourth exemplary embodiment of the present invention.

FIG. 22 is a block diagram illustrating an example of a configuration of an object display system 1E according to the present exemplary embodiment. Comparing the configuration of the object display system 1E illustrated in FIG. 22 with the configuration of the object display system 1D of the third exemplary embodiment illustrated in and FIG. 19, the object display system 1E includes a management apparatus 200E instead of the management apparatus 200.

A management unit 202 of the present exemplary embodiment detects the presence or absence of a failure in an object apparatus.

The management unit 202 may inquire, for example, to a control unit 301 whether a signal emitting unit 302 can transmit a signal. When a response indicating that the signal emitting unit 302 can transmit a signal is received from the control unit 301, the management unit 202 may detect that the object apparatus has no failure. Otherwise, the management unit 202 may detect that the object apparatus has a failure. In this case, the control unit 301 of an originating apparatus 300 is only necessary to be designed so that the control unit can carry out a self-test, whether the signal emitting unit 302 operates normally.

The management unit 202 may detect the presence or absence of a failure in an object apparatus on the basis of the presence or absence of a response from the object apparatus after transmission of a signal identifier to the object apparatus. In that case, the control unit 301 of the originating apparatus 300 is only necessary to be designed, for example, to return the response to the management unit 202 when the signal emitting unit 302 starts to send a signal representing a received signal identifier. The management unit 202 may detect that the object apparatus has no failure when the response is received from the object apparatus, and otherwise detect that the object apparatus has a failure.

When it is not detected that the object apparatus has a failure, the management unit 202 of the present exemplary embodiment operates as the management unit 202 of the second exemplary embodiment.

When it is detected that the object apparatus has a failure, the management unit 202 extracts the originating apparatus 300 as a support apparatus through an apparatus retrieving unit 204, the originating apparatus 300 being installed in a position where a distance from a position of an object apparatus satisfies a predetermined criteria, but being not an object apparatus. Specifically, the management unit 202 transmits that, for example, the distance from the position of an object apparatus to the installed position is equal to or shorter than a predetermined distance to the apparatus retrieving unit 204, as a search condition. The apparatus retrieving unit 204 extracts the originating apparatuses 300 satisfying the received search condition, and transmits a list of extracted originating apparatuses 300 to the management unit 202. The management unit 202 determines the originating apparatus 300 which is not an object apparatus among the originating apparatuses 300 included in the list received from the apparatus retrieving unit 204 as a support apparatus.

When it is detected that the object apparatus has a failure, the management unit 202 in the present exemplary embodiment then assigns signal identifiers different from each other to respective support apparatuses. In the following description, each signal identifier assigned to a support apparatus is written as a "support signal identifier". The management unit 202 stores the support signal identifiers assigned to the support apparatuses in the apparatus information storage unit 205. The signal information transmitting unit 203 transmits the assigned support signal identifiers to respective support apparatus.

Note that the management unit 202 does not assign the support signal identifier to the support apparatus, when another terminal apparatus 100D is associated with the support apparatus and the signal identifier (the object identifier or the support signal identifier) is already associated with the support apparatus. In that case, the management unit 202 does not newly transmit a support signal identifier to the support apparatus.

When it is detected that the object apparatus has a failure, the management unit 202 in the present exemplary embodiment further transmits a support signal identifier to terminal apparatus 100D through the signal information transmitting unit 203. The management unit 202 may add a data value representing that the signal identifier is a support signal to the signal identifier which is the support signal identifier, and transmits the identifier to the terminal apparatus 100D. The management unit 202 may transmit, to the terminal apparatus 100D, a combination of the support signal identifier and the apparatus identifier of the support apparatus of which the support signal identifier is transmitted. The management unit 202 may transmit, to the terminal apparatus 100D, the support signal identifier and a data value representing the installed place of the support apparatus of which the support signal identifier is transmitted. The management unit 202 associates the identifier of the terminal apparatus 100D with each of the identifiers of the support apparatuses to store the identifier in the apparatus information storage unit 205.

Note that the management unit 202 read the signal identifier from the apparatus information storage unit 205 when another terminal apparatus 100D is associated with the support apparatus and the signal identifier (the object identifier or the support signal identifier) is already associated with the support apparatus. Then, the management unit 202 transmits the read signal identifier to the terminal apparatus 100D as the support signal identifier.

When an end instruction is received from the terminal apparatus 100D which is a destination of the transmission of the support signal identifier, the management unit 202 transmits the end instruction to each support apparatus to which the support signal identifier transmitted to the terminal apparatus 100D is assigned.

Note that, when another terminal apparatus 100D is associated with the support apparatus, the management unit 202 does not transmit the end instruction to the support apparatus even if the end instruction is received from the terminal apparatus 100D which is a destination of the transmission of the support signal identifier.

The management unit 202 cancels association of identifiers between each support apparatus and the terminal apparatus 100D in the apparatus information storage unit 205. In other words, the management unit 202 deletes the identifier of the terminal apparatus 100D which is associated with each support apparatus from the apparatus information storage unit 205.

The terminal apparatus 100D, for example, the signal detecting unit 105, of the present exemplary embodiment determines whether the signal identifier received from the management apparatus 200E is an object identifier a support signal identifier.

The terminal apparatus 100D of the present exemplary embodiment operates as the second exemplary embodiment when the signal identifier received from the management apparatus 200E is an object identifier.

When the signal identifier received from the management apparatus 200E is a support signal identifier, the signal detecting unit 105 detects a support signal which is a signal representing the support signal identifier. In the captured video, the identifying unit 106 identifies an area where the support signal identifier is sent as an origination region of the support signal. The estimation unit 110 calculates a position of an image of the object apparatus in the video on the basis of a position of the object apparatus, a position of the support apparatus to which the detected support signal identifier is assigned, the origination region where the support signal is detected, a position and a direction of the terminal apparatus 100D, a camera parameter of the sensor 103, and/or the like. As a method for calculating the position of the image of the object apparatus in the video by the estimation unit 110, various known methods are applicable. The estimation unit 110 estimates that the calculated position of the image of the object area is an origination region (i.e. an area where the object signal is sent) of the object apparatus.

The estimation unit 110 may require the management apparatus 200E to transmit the position of the object apparatus, for example through the instructions transmitting unit 102. When the identifier of the support apparatus is received from the signal information transmitting unit 203, the estimation unit 110 may require the management apparatus 200E to transmit the position of the support apparatus. The apparatus retrieving unit 204 of the management apparatus 200E may read the position of the object apparatus from the apparatus information storage unit 205 when it is required to transmit the position of the object apparatus from the terminal apparatus 100D. The apparatus retrieving unit 204 may send back read position of the object apparatus to the terminal apparatus 100D through the instructions receiving unit 201. Similarly, the apparatus retrieving unit 204 may read the position of the support apparatus from the apparatus information storage unit 205 when it is required to transmit the position of the support apparatus from the terminal apparatus 100D. Then, the apparatus retrieving unit 204 may send back read position of the support apparatus to the terminal apparatus 100D through the instructions receiving unit 201.

When the origination region of the support apparatus is estimated by the estimation unit 110, the display control unit 107 of the present exemplary embodiment displays a mark on the estimated origination region in the video. The display control unit 107 outputs the video in which the mark is displayed to the display unit 108.

The object display system 1E of the present exemplary embodiment is the same as the object display system 1 in the second exemplary embodiment except for above-described matters.

Next, an operation of the object display system 1E of the present exemplary embodiment will be described in detail with reference to drawings.

First, an operation of the management apparatus 200E will be described.

Figure 23:
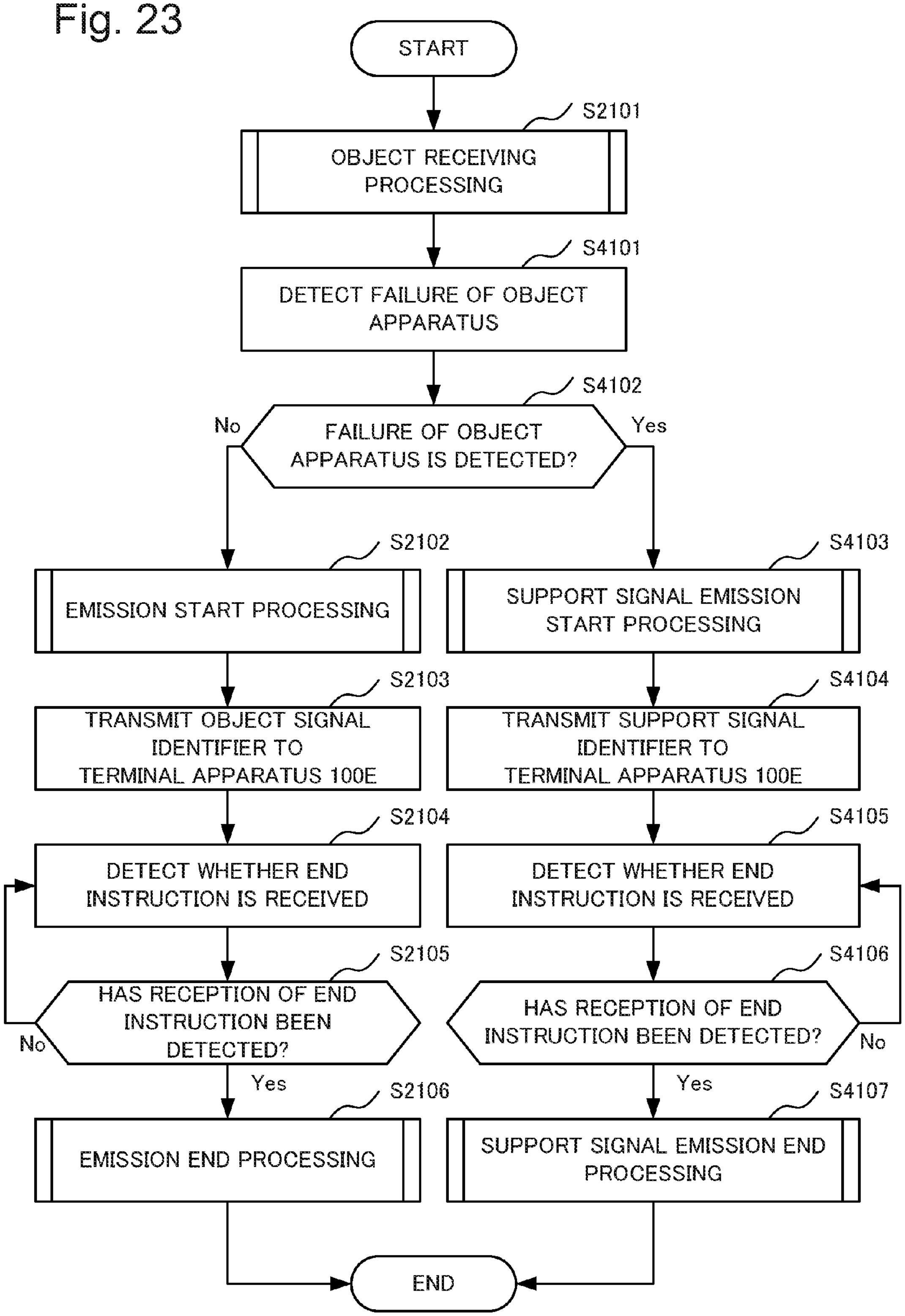
FIG. 23 is a flowchart illustrating an example of an operation of a management apparatus according to the fourth exemplary embodiment of the present invention.

FIG. 23 is a flowchart illustrating an example of an operation of the management apparatus 200E according to the present exemplary embodiment.

First, the management apparatus 200E performs object receiving processing (step S2101). The operation of step S2101 in FIG. 23 is the same as the operation of step S2101 in the management apparatus 200 of the second exemplary embodiment illustrated in FIG. 15.

Next, the management unit 202 detects a failure of the object apparatus (step S4101). In other words, the management unit 202 detects the presence or absence of a failure of the object apparatus. When a failure of the object apparatus is not detected (No in step S4102), the management apparatus 200E performs operations from step S2102 to step S2106. The operations from step S2102 to step S2106 illustrated in FIG. 23 are the same as the operations in the steps to which the same reference signs illustrated in FIG. 15 with respect to the management apparatus 200 in the second exemplary embodiment are assigned. Therefore, description of the operations are omitted.

When a failure of the object apparatus is detected (Yes in step S4102), the management apparatus 200E performs a support signal emission start processing (step S4103).

Figure 24:
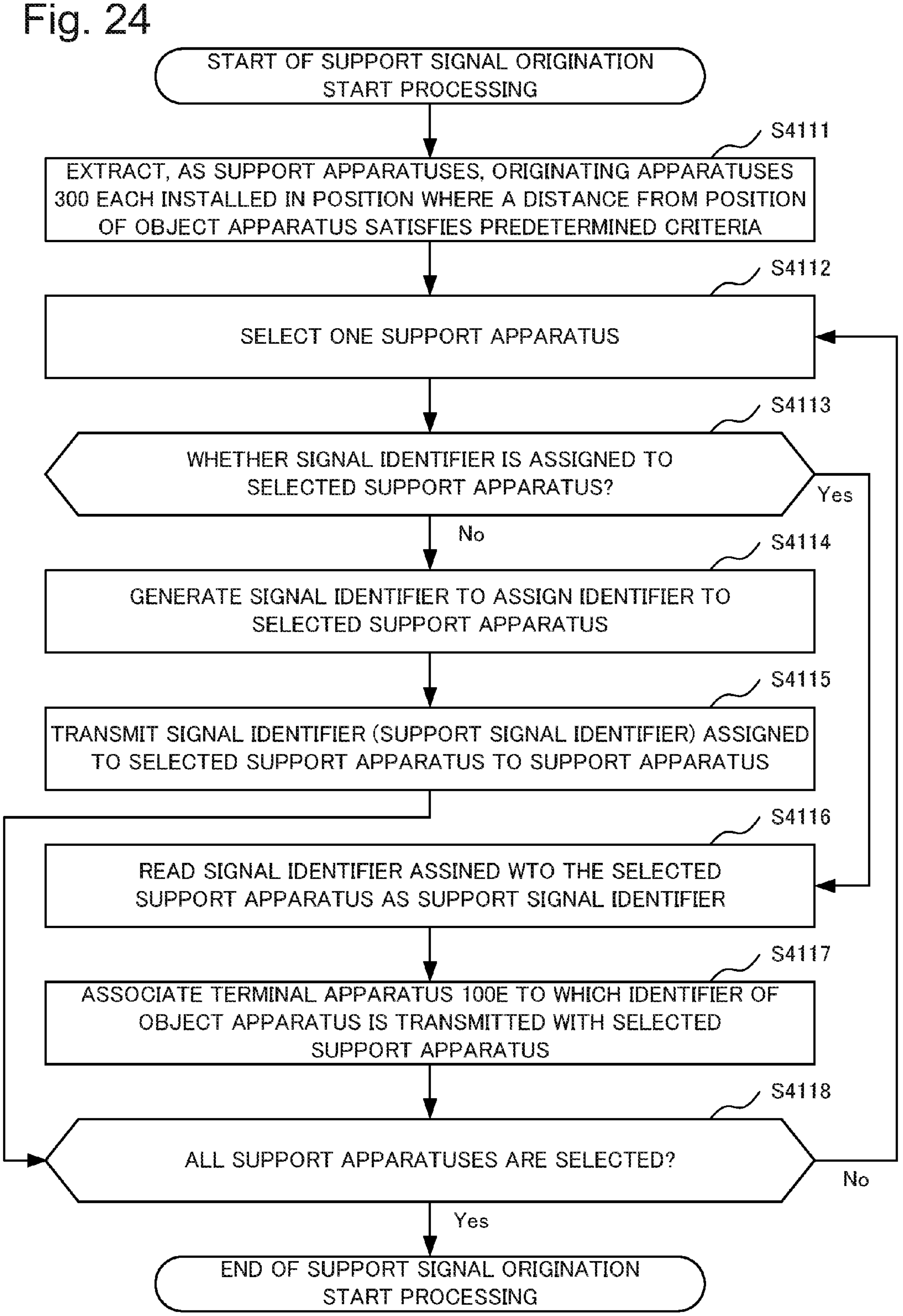
FIG. 24 is a flowchart illustrating an example of support signal emission start processing in the fourth exemplary embodiment of the present invention.

FIG. 24 is a flowchart illustrating an example of the support signal origination start processing in the present exemplary embodiment.

First, the management unit 202 extracts, as the support apparatuses, the originating apparatuses 300 each installed in a position where a distance from a position of the object apparatus satisfies a predetermined criteria but is not the failure-detected object apparatus mentioned above, for example, with the apparatus retrieving unit 204 (step S4111). The management unit 202 may extract, for example, the originating apparatuses 300 installed within a predetermined distance from the position of the object apparatus as the support apparatuses. The management unit 202 may detect the presence or absence of a failure for each extracted support apparatus and exclude the failure-detected support apparatus from a support apparatus.

Figure 25:
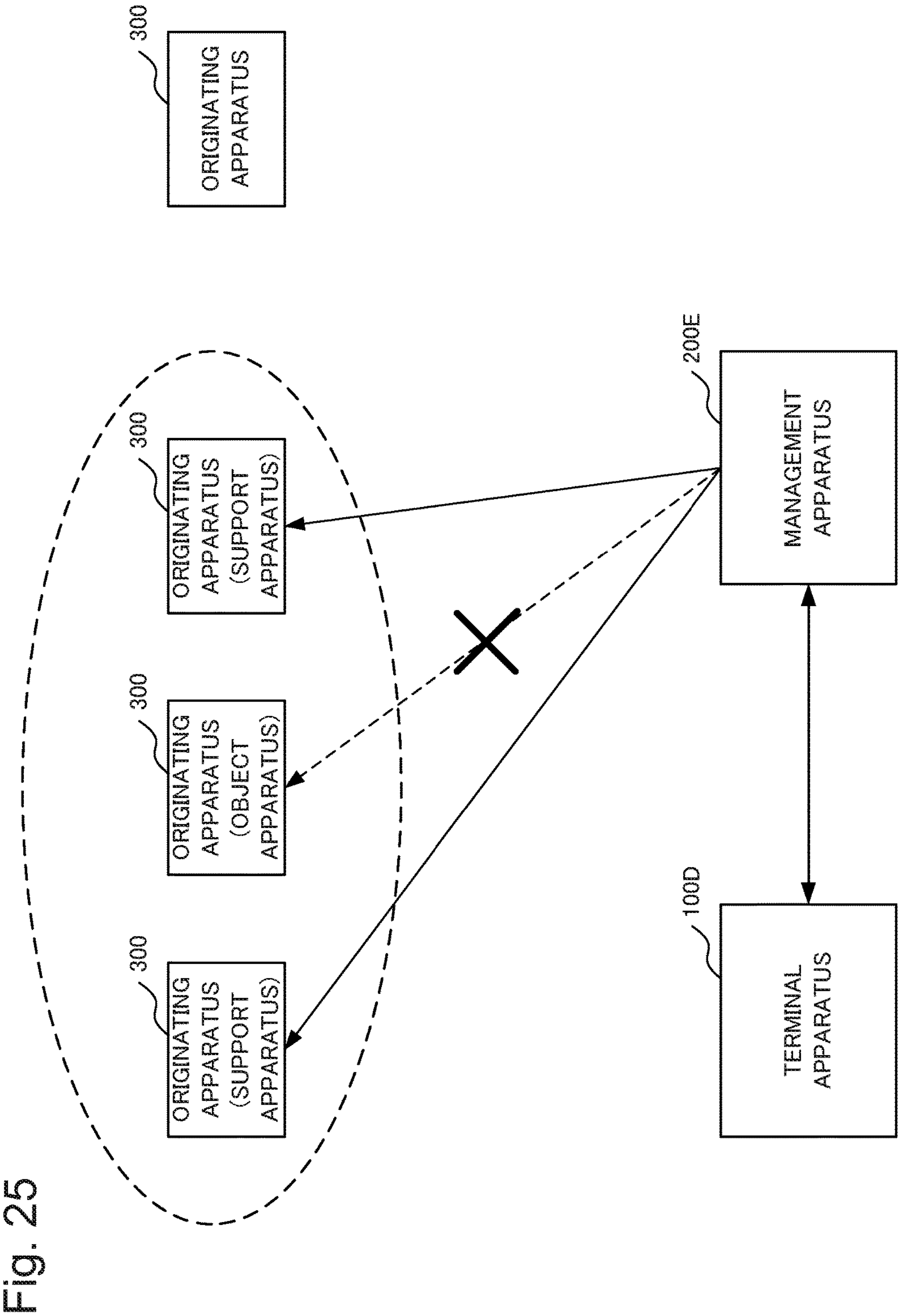
FIG. 25 is a drawing schematically illustrating an extraction of a support apparatus in the fourth exemplary embodiment of the present invention.

FIG. 25 is a drawing schematically illustrating the extraction of a support apparatus. In FIG. 25, the originating apparatuses 300 inside a ellipse drawn by a dashed line represents the originating apparatus 300 which is the object apparatus and the originating apparatuses 300 each extracted as a support apparatus when a failure is detected for the object.

The management unit 202 selects one support apparatus not selected from the support apparatuses extracted in step S4111 (step S4112). The management unit 202 then determines whether the signal identifier is assigned to the selected support apparatus. The management unit 202 may identify whether the signal identifier associated with the selected support apparatus is stored in the apparatus information storage unit 205. When the signal identifier associated with the selected support apparatus is stored in the apparatus information storage unit 205, the management unit 202 determines that the signal identifier is assigned to the selected support apparatus. When the signal identifier associated with the selected support apparatus is not stored in the apparatus information storage unit 205, the management unit 202 determines that the signal identifier is not assigned to the selected support apparatus.

When the signal identifier is not assigned to the selected support apparatus (No in step S4113), the management unit 202 generates a signal identifier to assign the identifier to the selected support apparatus (step S4114). The management unit 202 may associate the generated signal identifier with the selected support apparatus, and store the identifier in the apparatus information storage unit 205.

The management unit 202 transmits the signal identifier assigned to the selected support apparatus to the support apparatus (step S4115). As mentioned above, the signal identifier assigned to the support apparatus is the support signal identifier. The management apparatus 200E performs an operation of step S4117 described below after the operation of step S4115.

When the signal identifier is assigned to the selected support apparatus (Yes in step S4113), the signal identifier associated with the selected support apparatus is stored in the apparatus information storage unit 205. In that case, the management unit 202 reads the signal identifier associated with the selected support apparatus from the apparatus information storage unit 205 as a support signal identifier (step S4116).

In step S4117, the management unit 202 associates the terminal apparatus 100D to which the identifier of the object apparatus is transmitted with the selected support apparatus. In other words, the management unit 202 associates the identifier of the terminal apparatus 100D to which the identifier of the object apparatus is transmitted with the apparatus identifier of the selected support apparatus, and stores the identifiers in the apparatus information storage unit 205.

When there is the support apparatus not selected (No in step S4118), the management apparatus 200E repeats the operations of step S4112 and subsequent thereto. When all the support apparatuses are selected (Yes in step S4118), the management apparatus 200E ends the operation illustrated in FIG. 24.

In the operation illustrated in FIG. 23, the management unit 202 next transmits the support signal identifier of each support apparatus to the terminal apparatus 100D through the signal information transmitting unit 203 (step S4104). As mentioned above, the management unit 202 may transmit a combination of the identifier of the support apparatus and the support signal identifier or the like to the terminal apparatus 100D.

In this case, as mentioned above, the terminal apparatus 100D estimates the origination region of the support signal, displays a mark on the estimated origination region in the video, and outputs the video with the mark displayed to the display unit 108. When a user causes the output of the video with the mark displayed to end, the user operates the input device of the terminal apparatus 100D to perform an operation indicating an end instruction. When the end instruction is input, the terminal apparatus 100D transmits the end instruction to the management apparatus 200E.

The instructions receiving unit 201, for example, of the management apparatus 200E detects reception of the end instruction from the terminal apparatus 100D (step S4105). When the reception of the end instruction is not detected (No in step S4106), the instructions receiving unit 201 continues detecting of the reception of the end instruction (step S4105). When the reception of the end instruction is detected (Yes in step S4106), the management apparatus 200E performs support signal emission end processing (step S4107).

Figure 26:
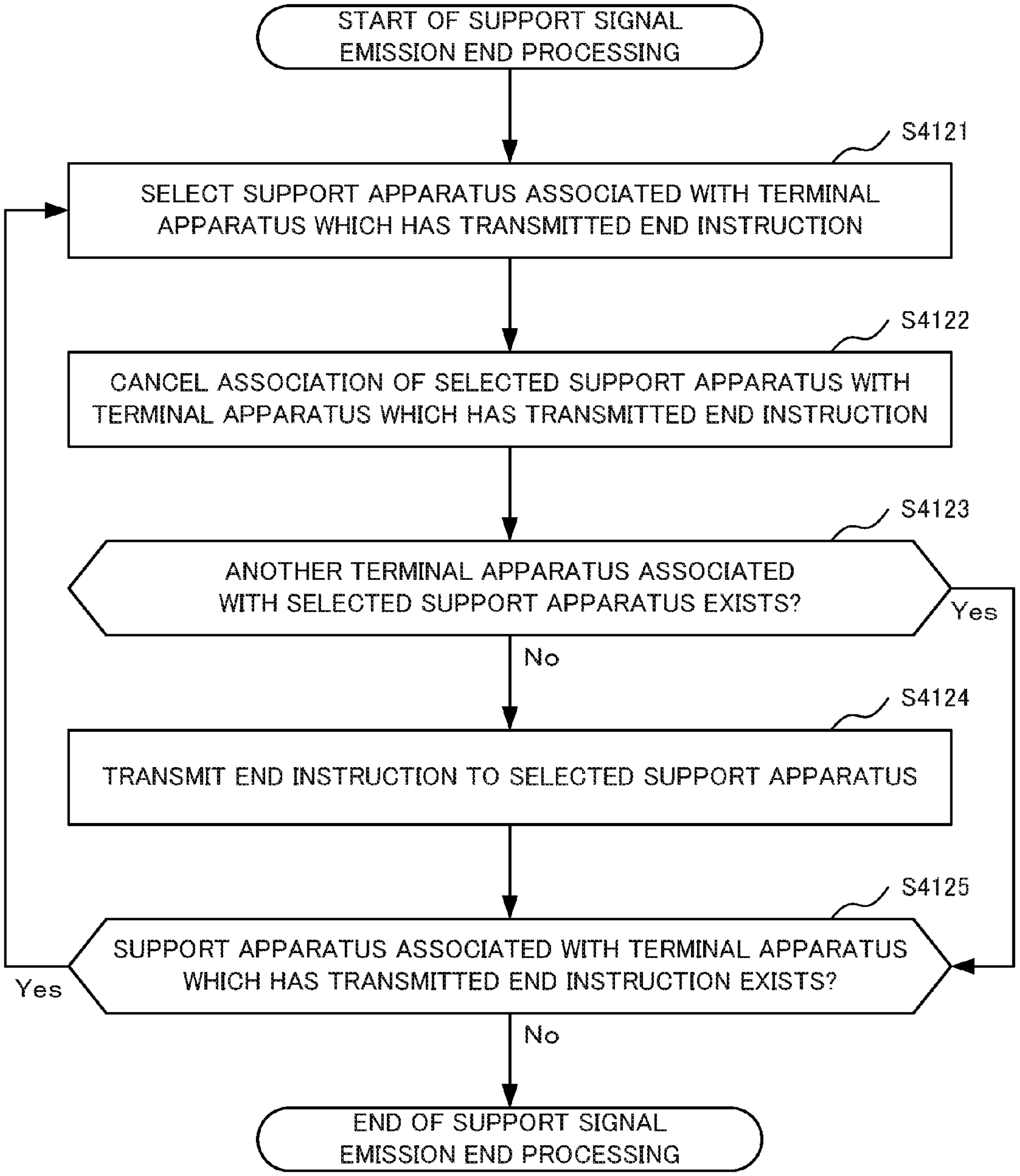
FIG. 26 is a flowchart illustrating an example of support signal emission end processing in the fourth exemplary embodiment of the present invention.

FIG. 26 is a flowchart illustrating an example of support signal emission end processing in the present exemplary embodiment.

Referring to FIG. 26, the management unit 202 first selects the support apparatus associated with the terminal apparatus 100D which has transmitted the end instruction (step S4121). The management unit 202 cancels the association of the selected support apparatus with the terminal apparatus 100D which has transmitted the end instruction (step S4122). The management unit 202 may delete the identifier of the terminal apparatus 100D which has transmitted the end instruction, associated with the identifier of the selected support apparatus from the apparatus information storage unit 205.

When another terminal apparatus 100D associated with the selected support apparatus does not exist (No in step S4123), the management unit 202 transmits the end instruction to the selected support apparatus through the signal information transmitting unit 203 (step S4124). The support apparatus received the end instruction ends the origination. When another terminal apparatus 100D associated with the selected support apparatus exists (Yes in step S4123), the management unit 202 does not transmit the end instruction to the support apparatus.

When the support apparatus associated with the terminal apparatus 100D which has transmitted the end instruction exists (Yes in step S4125), the management apparatus 200E repeats the operations of step S4121 and subsequent thereto. When the support apparatus associated with the terminal apparatus 100D which has transmitted the end instruction does not exist (No in step S4125), the management apparatus 200E ends the operation illustrated in FIG. 26.

Next, an operation of the terminal apparatus 100D of the present exemplary embodiment will be described in detail with reference to drawings.

Figure 27:
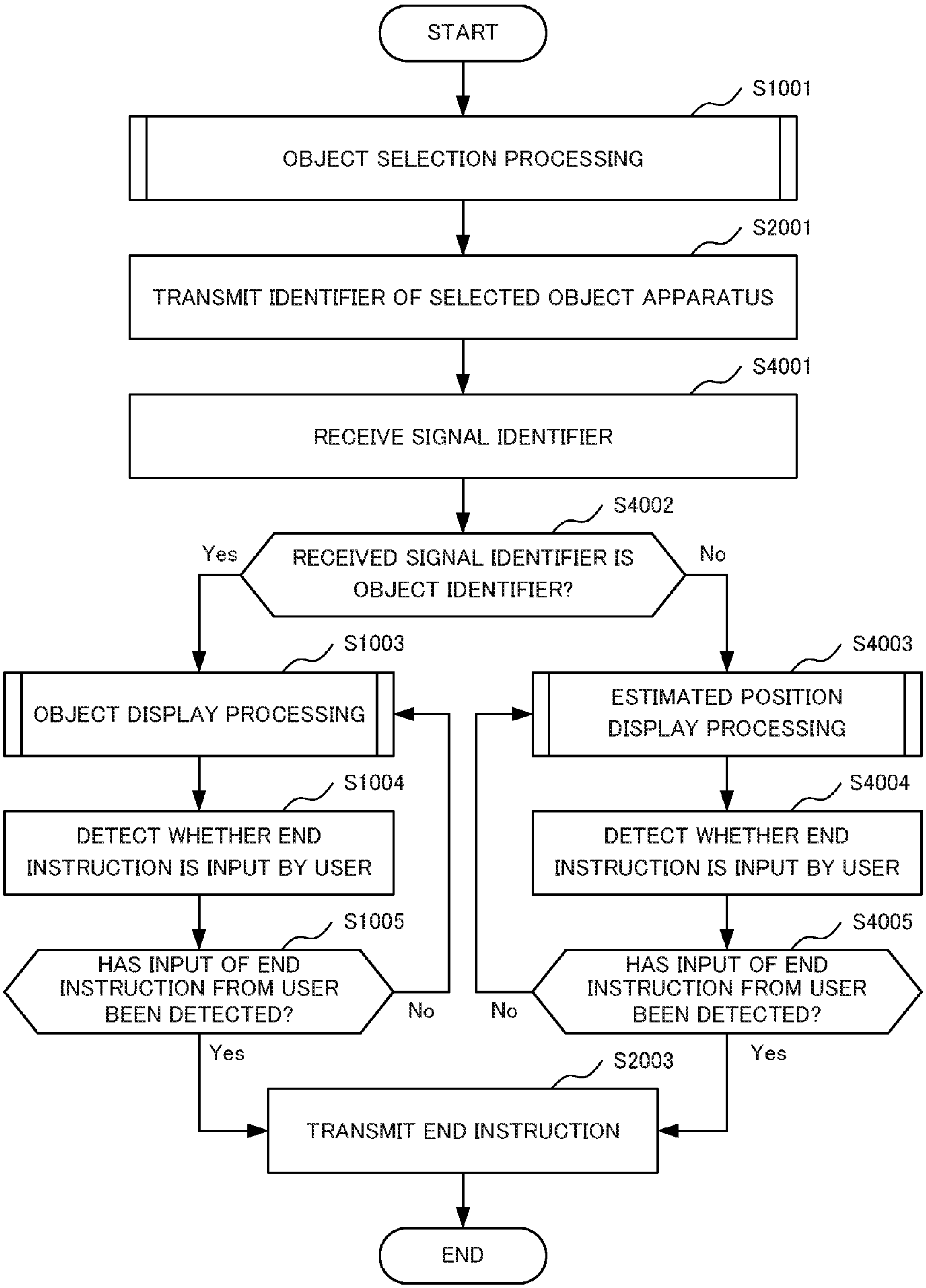
FIG. 27 is a flowchart illustrating an example of an operation of a terminal apparatus according to the fourth exemplary embodiment of the present invention.

FIG. 27 is a flowchart illustrating an example of an operation of the terminal apparatus 100D according to the present exemplary embodiment.

The operations of step S1001 and step S2001 illustrated in FIG. 27 are the same as the operations of the steps, to which the same reference signs are given, of the terminal apparatus 100 in the second exemplary embodiment illustrated in FIG. 14.

In response to the transmission of the identifier of the object apparatus to the management apparatus 200E, a signal identifier is transmitted from the management apparatus 200E. The signal detecting unit 105 receives the signal identifier from the management apparatus 200E (step S4001). The signal identifier in this case is the object identifier which is a signal identifier assigned to the object apparatus, when a failure of the object apparatus is not detected. The signal identifier in this case is a support signal identifier which is a signal identifier assigned to the support apparatus, when a failure of the object apparatus is detected. As mentioned above, a data value representing that the signal identifier is a support signal identifier may be added to the signal identifier being a support signal identifier. The signal detecting unit 105 determines whether the received signal identifier is an object identifier by utilizing the data value, for example.

When the received signal identifier is an object identifier (Yes in step S4002), the terminal apparatus 100D performs operations of step S1003, step S1004, step S1005, and step S2003. These operations are the same as the operations of the steps, to which the same numbers are assigned illustrated in FIG. 15, of the terminal apparatus 100 of the second exemplary embodiment.

When the received signal identifier is not an object identifier (No in step S4002), the terminal apparatus 100D performs estimated position display processing (step S4003).

Figure 28:
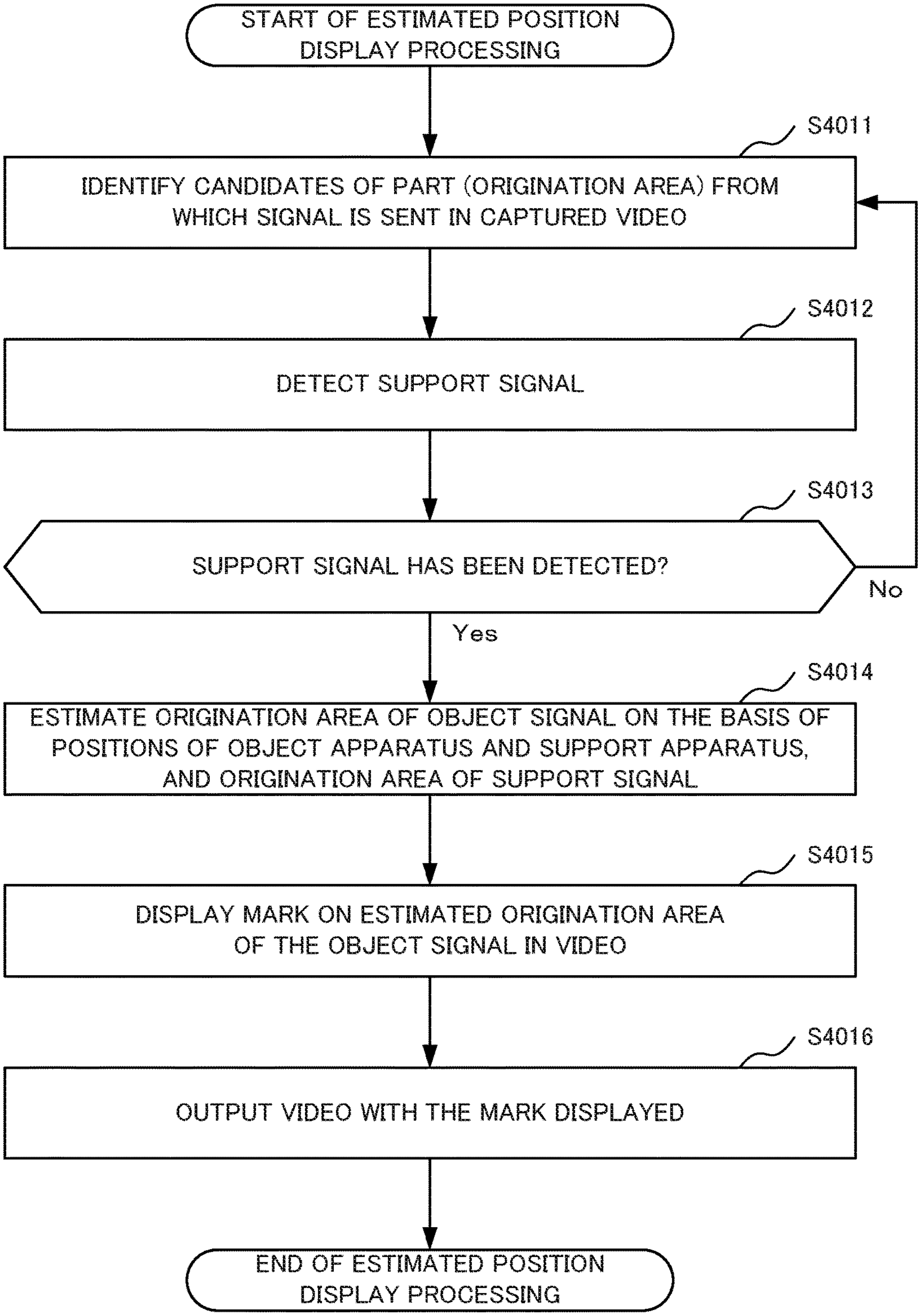
FIG. 28 is a flowchart illustrating an example of estimated position display processing in the fourth exemplary embodiment of the present invention.

FIG. 28 is a flowchart illustrating an example of the estimated position display processing in the present exemplary embodiment.

Referring to FIG. 28, the identifying unit 106 first identifies candidates of a part (origination region) from which a signal is sent in the video captured by the sensor 103 (step S4011). The method of identifying the candidates of the origination regions in step S4011 is the same as or similar to the method of identifying the candidate of origination regions in the operation of step S1031 illustrated in FIG. 6.

Next, the signal detecting unit 105 detects a support signal in the specified candidates of the origination region (step S4012). The support signal is a signal representing the support signal identifier (for example, light which blinks according to a blink pattern representing the support signal identifier), as mentioned above. The method of detecting the support signal in step S4012 is the same as or similar to the method of detecting the object signal in the step S1032 illustrated in FIG. 6.

When a plurality of support signal identifiers are received, the signal detecting unit 105 may detect the support signal representing the support signal identifier for each of the support signal identifiers in the candidates of the origination region. When a plurality of candidates of the origination region are identified in step S4011, the signal detecting unit 105 may detect the support signal representing the support signal identifier for each of the support signal identifiers in respective candidates of the origination region.

When the support signal is not detected (No in step S4013), the terminal apparatus 100D continues detecting of the support signal by repeating the operations of step S4011 and subsequent thereto.

When the support signal is detected (Yes in step S4013), the estimation unit 110 estimates the origination region of the object signal in the video captured by the sensor 103 (step S4014). The estimation unit 110 may use, for example, the position of the object apparatus, the position of support apparatus, the origination region of the support signal, the position of the terminal apparatus 100D, the camera parameter of the sensor 103, and the like to estimate the origination region of the object signal.

The display control unit 107 displays a mark on the estimated origination region of the object signal in the video captured by the sensor 103 (step S4015). The display control unit 107 outputs the video with the mark displayed to the display control unit 107 (step S4016). After that, the terminal apparatus 100D ends the operation illustrated in FIG. 28.

Next, for example, the instructions transmitting unit 102 detects an input of the end instruction from a user (step S4004). When the input of the end instruction from a user is not detected (No in step S4005), the terminal apparatus 100D repeats the estimated position display processing (step S4003) and detecting of the input of the end instruction (step S4004).

When the input of the end instruction from a user is detected (Yes in step S4005), the instructions transmitting unit 102 transmits the end instruction to the management apparatus 200E (step S2003). After that, the terminal apparatus 100D ends the operation illustrated in FIG. 27.

The present exemplary embodiment described above has the same advantageous effect as the first and second exemplary embodiments. The reason is the same as the reason why the advantageous effect occurs in the first and second exemplary embodiments.

Further, present exemplary embodiment has an advantageous effect capable of presenting an approximate position of an object apparatus to a user even when the object apparatus cannot send the object signal.

This is because the management unit 202 extracts the support apparatus which is the originating apparatus 300, a distance from the object apparatus satisfying a predetermined criteria, when a failure is detected in the object apparatus. Then, the management unit 202 assigns the support signal identifier to the support apparatus, causes the support apparatus to send the support signal which is a signal representing the support signal identifier. The estimation unit 110 of the terminal apparatus 100D estimates the origination region of the object signal on the basis of the origination region of the support signal, and the like. Therefore, the object display system 1E of the present exemplary embodiment can present an approximate position of the object apparatus to a user even when the object apparatus cannot send an object signal.

<Variation of Fourth Exemplary Embodiment>

A variation of the fourth exemplary embodiment will be described in detail with reference to drawings. The present variation estimates the origination region of the object signal when the object signal is not detected, regardless of the presence or absence of a failure in the object apparatus.

FIG. 22 is a block diagram illustrating an example of a configuration of an object display system 1E according to the present variation. The configuration of the object display system 1E of the present variation is the same as the configuration of the object display system 1E of the fourth exemplary embodiment. Hereinafter, it will be described focusing on the differences between the present variation and the fourth exemplary embodiment.

A management unit 202 in the present variation does not detect the presence or absence of a failure of an object apparatus. In the present variation, regardless of the presence or absence of a failure of the object, a support apparatus is extracted and a support signal identifier is assigned to the extracted support apparatus. The management unit 202 transmits the support signal identifier to the support apparatus in addition to transmitting of an object identifier to the object apparatus. The management unit 202 transmits the object identifier and the support signal identifier to the terminal apparatus 100D. When the instructions receiving unit 201 receives end instruction, the management apparatus 200E in the present variation performs emission end processing which makes the object apparatus end origination of an object signal, and support signal emission end processing which makes the support apparatus end origination of a support signal.

When the object signal is detected by the signal detecting unit 105, the display control unit 107 of the terminal apparatus 100D in the present variation displays a mark on the origination region of the object signal in the video captured by the sensor 103 as is the case with the display control unit 107 of the second exemplary embodiment. When an object signal is not detected, the signal detecting unit 105 detects the support signal. When a support signal is detected by the signal detecting unit 105, the estimation unit 110 estimates the origination region of the object signal as is the case with the estimation unit 110 of the fourth exemplary embodiment. The display control unit 107 of the present variation displays the mark on the estimated origination region of the object signal in the video captured by the sensor 103 as is the case with the display control unit 107 of the fourth exemplary embodiment.

Next, an operation of the object display system 1E in the present variation will be described in detail with reference to drawings.

First, an operation of the management apparatus 200E in the present variation will be described.

Figure 29:
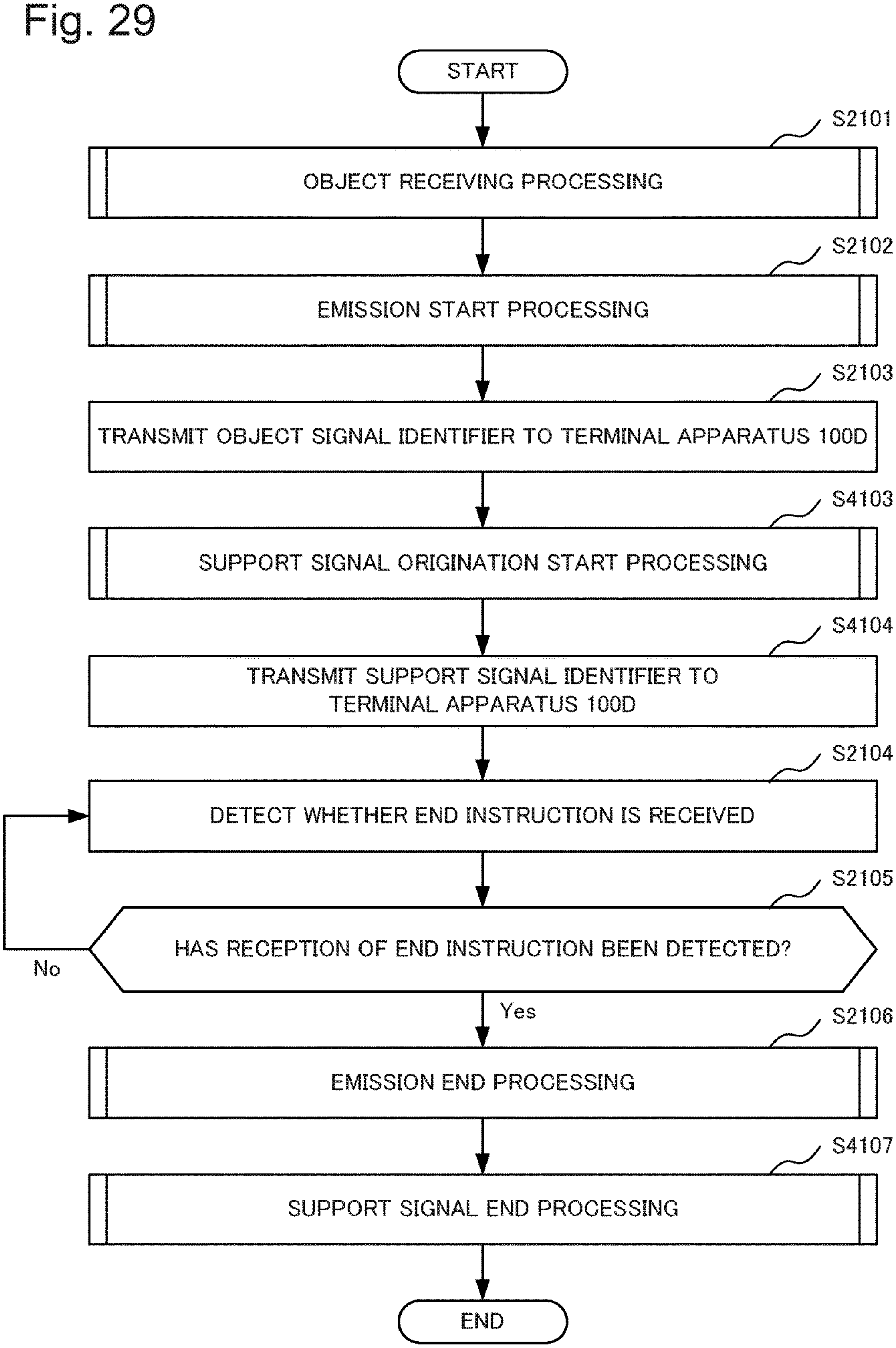
FIG. 29 is a flowchart illustrating an example of an operation of a management apparatus according to a variation of the fourth exemplary embodiment of the present invention.

FIG. 29 is a flowchart illustrating an example of an operation of a management apparatus 200E in the present variation. An operation of each step in FIG. 29 is the same as that of corresponding step, to which the same number is assigned, in the operation of the management apparatus 200E of the fourth exemplary embodiment illustrated in FIG. 23.

Referring to FIG. 29, after the object receiving processing (step S2101) and the origination start processing (step S2102), the management unit 202 transmits the object identifier to the terminal apparatus 100D through the signal information transmitting unit 203. Furthermore, after the support signal origination start processing (step S4103), the management unit 202 transmits the support signal identifier to the terminal apparatus 100D through the signal information transmitting unit 203 (step S4104).

The instructions receiving unit 201 then detects the reception of the end instruction from the terminal apparatus 100D (step S2104), and the instructions receiving unit 201 continues detecting of the reception of the end instruction (step S2104) when the end instruction is not detected (No in step S2105).

When the end instruction is detected (Yes in step S2105), the management apparatus 200E performs the emission end processing (step S2106) and the support signal end processing (step S4107).

Next, an operation of the terminal apparatus 100D of the present variation will be described in detail with reference to drawings.

Figure 30:
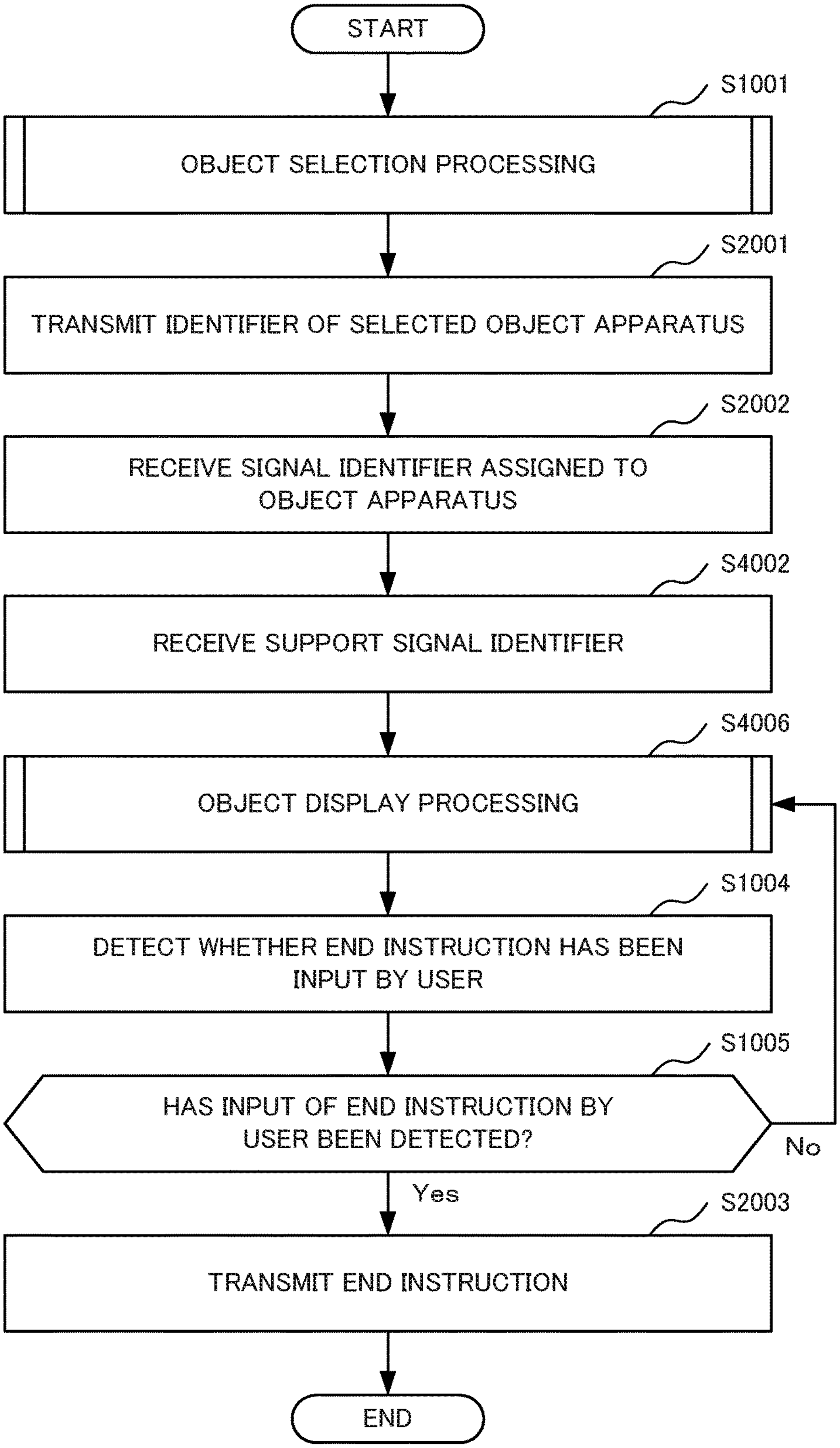
FIG. 30 is a flowchart illustrating an example of an operation of the terminal apparatus according to the variation of the fourth exemplary embodiment of the present invention.

FIG. 30 is a flowchart illustrating an example of the operation of the terminal apparatus 100D according to the present variation. In FIG. 30, the same reference signs are assigned to the steps, the processing details of which are the same as the steps of the operation of the terminal apparatus 100D in the fourth exemplary embodiment illustrated in FIG. 27.

Referring to FIG. 30, after the operations of step S1001 and step S2001, the signal detecting unit 105 receives the object identifier (step S2002). The signal detecting unit 105 further receives the support signal identifier (step S4002). The terminal apparatus 100D of the present variation performs then the object display processing (step S4006).

Figure 31:
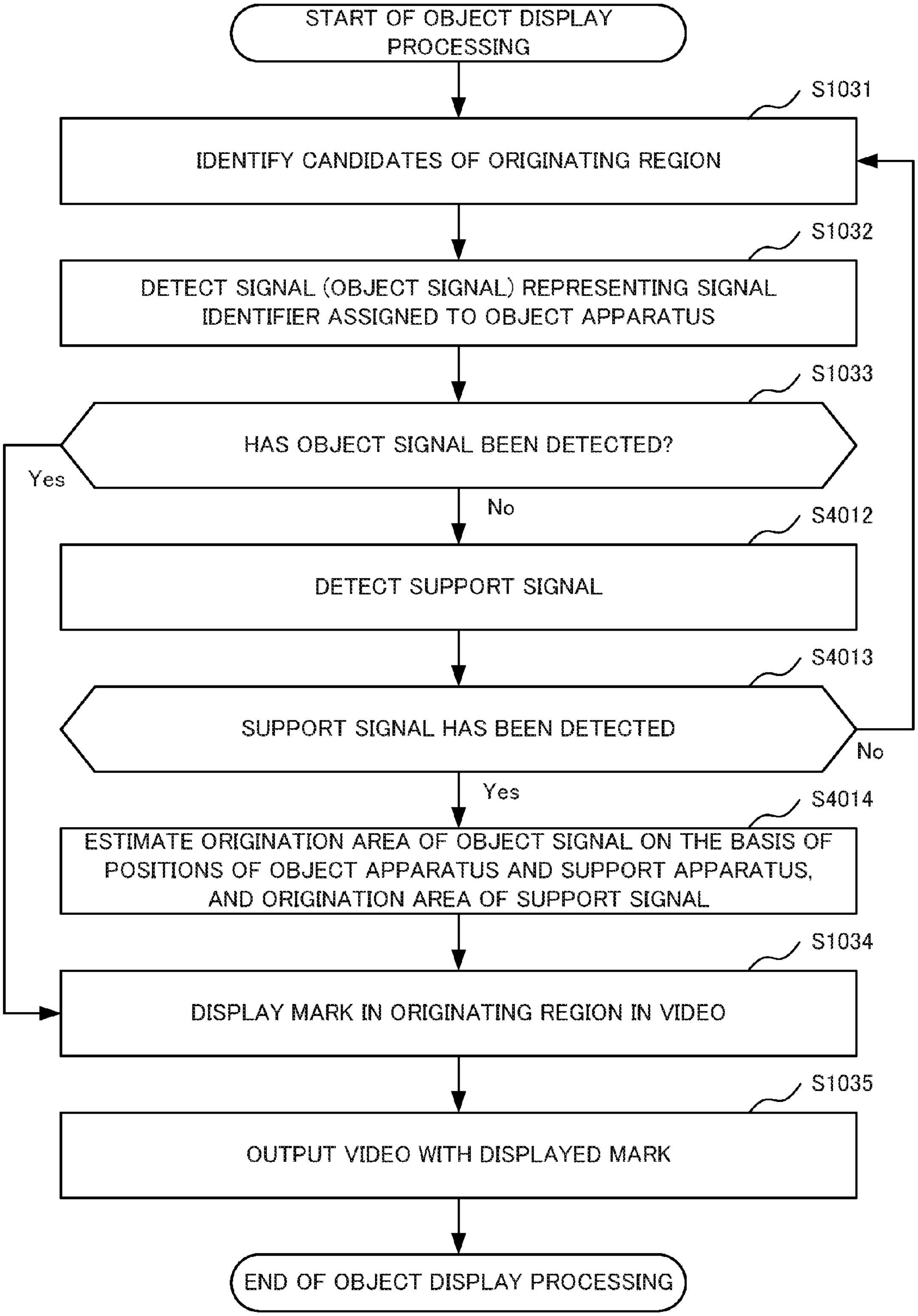
FIG. 31 is a flowchart illustrating an example of object display processing in the variation of the fourth exemplary embodiment of the present invention.

FIG. 31 is a flowchart illustrating an example of the object display processing in the present variation. In FIG. 31, the same reference signs are assigned to the steps, the processing details of which are the same as the steps of the object display processing in the third exemplary embodiment illustrated in FIG. 21. Furthermore, in FIG. 31, the same reference signs are assigned to the steps, the processing details of which are the same as the steps of the estimation object display processing in the fourth exemplary embodiment illustrated in FIG. 28.

Referring to FIG. 31, first, the identifying unit 106 identifies the candidates of the origination region of the object signal (step S1031). Next, the signal detecting unit 105 detects the object signal in the candidates of the origination region of the object signal (step S1032). When the object signal is detected (Yes in step S1033), for example, the identifying unit 106 identifies the candidate of the origination region, in which the object signal is detected, as an origination region. The display control unit 107 displays a mark on the origination region in the video (step S1034), and then outputs the video with the mark displayed to the display unit 108 (step S1035).

When the object signal is not detected (No in step S1033), the signal detecting unit 105 detects the support signal in the identified origination regions (step S4012). When the support signal is detected in neither of the origination regions (No in step S4013), the terminal apparatus 100D repeats the operations illustrated in FIG. 31 from step S1031.

When the support signal is detected (Yes in step S4013), for example, the identifying unit 106 identifies the origination region in which the support signal is detected as the origination region of the support signal. The estimation unit 110 estimates the origination region of the object signal on the basis of a position of the identified origination region of the support signal or the like, as mentioned above (step S4014). The display control unit 107 displays a mark on the estimated origination region of the support signal in the video (step S1034), and then outputs the video with the mark displayed to the display unit 108 (step S1035).

After that, the terminal apparatus 100D ends the operation illustrated in FIG. 31.

Next, in FIG. 30, the instructions transmitting unit 102 detects the input of the end instruction from a user (step S1004). When the input of the end instruction is not detected (No in step S1005), the terminal apparatus 100D repeats the operations illustrated in FIG. 30 from step S4006. When the input of the end instruction is detected (Yes in step S1005), the instructions transmitting unit 102 transmits the end instruction to the management apparatus 200E (step S2003). After that, the terminal apparatus 100D of the present variation ends the operation illustrated in FIG. 30.

The present variation described above has the same advantageous effect as the first and second exemplary embodiments. The reason is the same as the reason why the advantageous effect occurs in the first and second exemplary embodiments.

The present variation further has an advantageous effect that an approximate position of the object apparatus can be displayed even when a failure occurs in the object apparatus or light which is a signal sent by the object apparatus is temporarily shielded.

This is because the management unit 202 of the management apparatus 200E causes the object apparatus to send the object signal and further causes the support apparatus of the object apparatus to send the support signal. In addition, this is because the signal detecting unit 105 of the terminal apparatus 100D detects the support signal when the object signal is not detected. The estimation unit 110 estimates the origination region of the object signal on the basis of a position of the origination region in which the support signal is detected, or the like. The display control unit 107 displays a mark on the estimated origination region of the object signal in the video, and outputs the video with the mark displayed to the display unit 108.

Fifth Exemplary Embodiment

Next, a fifth exemplary embodiment of the present invention will be described in detail with reference to drawings. The present exemplary embodiment is an exemplary embodiment which further shows a user a route to the object apparatus.

Figure 32:
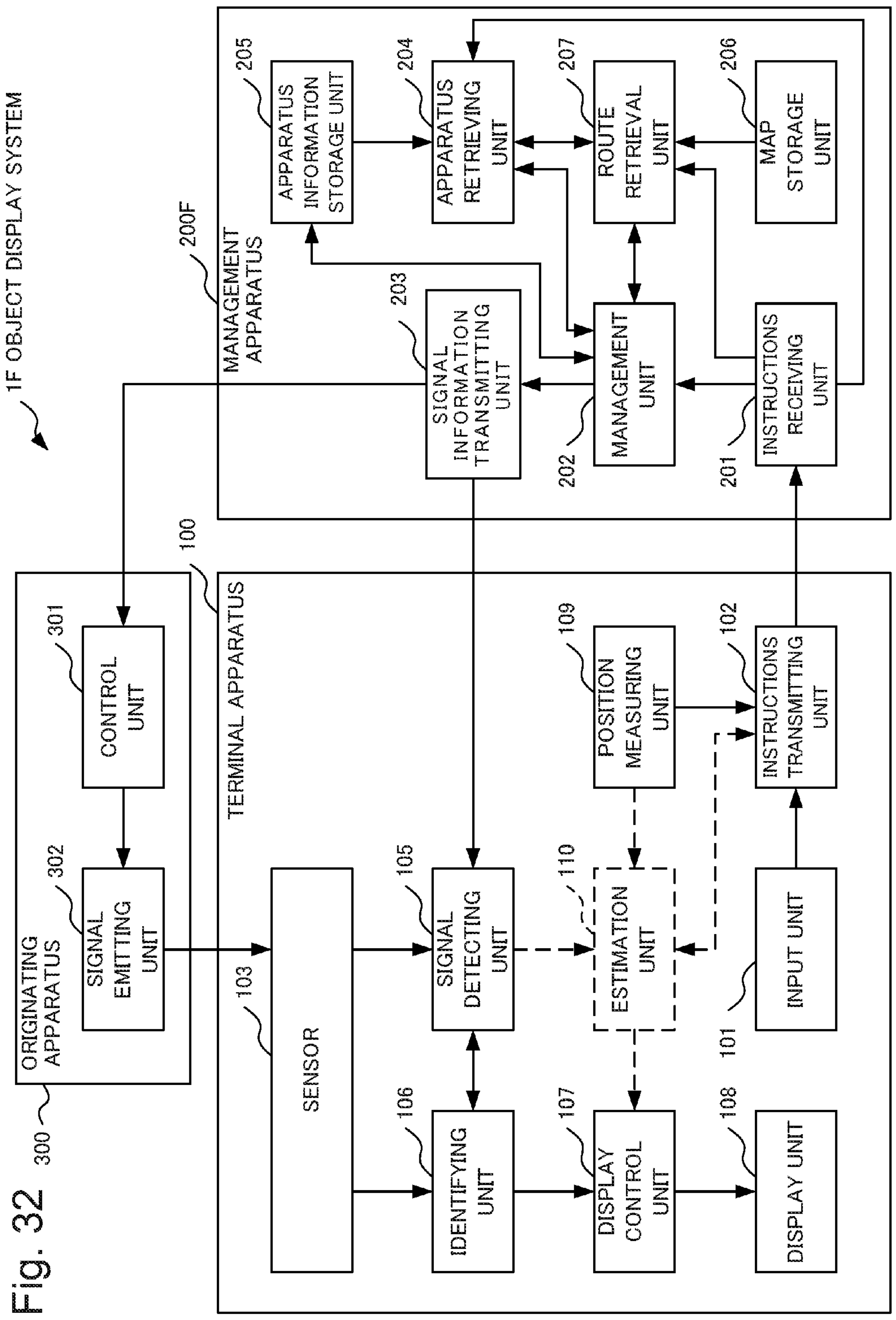
FIG. 32 is a block diagram illustrating an example of a configuration of an object display system according to a fifth exemplary embodiment of the present invention.

FIG. 32 is a block diagram illustrating an example of a configuration of an object display system 1F according to the present exemplary embodiment.

Referring to FIG. 32, the object display system 1F of the present exemplary embodiment includes a terminal apparatus 100, a management apparatus 200F, and an originating apparatus 300. When FIG. 32 is compared with FIG. 1, the object display system 1F of the present exemplary embodiment includes the management apparatus 200F instead of the management apparatus 200. The management apparatus 200F includes a map storage unit 206 and a route retrieval unit 207 in addition to the components of the management apparatus 200. In the following description, the object display system 1F of the present exemplary embodiment includes a configuration in which the management apparatus 200 of the object display system 1 in the second exemplary embodiment is replaced by the management apparatus 200F. The configuration of the object display system 1F in the present exemplary embodiment relates to such a configuration in which the object display system 1 of the second exemplary embodiment further shows a route to an object apparatus as described below. However, the object display system 1F according to the present embodiment may include a configuration in which the object display system according to any of other exemplary embodiments of the present invention shows a route as described below. Note that the following description will describe the object display system 1F of the present exemplary embodiment focusing on the differences from the object display system 1 of the second exemplary embodiment. Description of the object display system 1F will be appropriately omitted on the same configuration as the configuration of the object display system 1 in the second exemplary embodiment, and the same operation as the operation of the object display system 1 in the second exemplary embodiment.

The map storage unit 206 stores map information. The map information is, for example, information including data values representing positions, such as passages through which a user of the terminal apparatus 100 can walk in a building provided with the originating apparatus 300. The map information may include the information of the map utilized in a general navigation system.

The route retrieval unit 207 retrieves a route from the position of the terminal apparatus 100 to the position of the object apparatus on the basis of the map information stored in the map storage unit 206. The route may include the above-described passages through which the user of the terminal apparatus 100 can walk in the building provided with the originating apparatus 300. The route retrieval unit 207 may be implemented by the technique used for a general navigation system.

The instructions transmitting unit 102 of the terminal apparatus 100 in the present exemplary embodiment transmits, in addition to the identifier of the object apparatus, the data value representing the position of the terminal apparatus 100, measured by the position measuring unit 109, to the instructions receiving unit 201 of the management apparatus 200F.

The management unit 202 of the management apparatus 200F in the present exemplary embodiment causes the route retrieval unit 207 to retrieve the route from the position of the terminal apparatus 100, received from the instructions transmitting unit 102 of the terminal apparatus 100, to the position of the object apparatus. The management unit 202 causes the apparatus retrieving unit 204 to extract, as the support apparatus, the originating apparatus 300 of which a distance from the route obtained by the retrieval with the route retrieval unit 207 satisfies the predetermined criteria. The apparatus retrieving unit 204 extracts, as the support apparatus, the originating apparatus 300 of which a distance from the route obtained by the retrieval with the route retrieval unit 207 satisfies the predetermined criteria. The apparatus retrieving unit 204 may extract the originating apparatus 300 installed in the place within the predetermined distance from the route obtained by the retrieval by the route retrieval unit 207 as a support apparatus. The management unit 202 of the present exemplary embodiment assigns support signal identifiers different from each other to respective support apparatuses, as is the case with the management unit 202 of the fourth exemplary embodiment. The management unit 202 transmits the assigned support signal identifier to each support apparatus through the signal information transmitting unit 203. The management unit 202 further transmits the support signal identifiers and an order of the support apparatuses, to which the support signal identifiers are assigned, on the obtained route mentioned above to the terminal apparatus 100. The management unit 202 may transmit the support signal identifiers to the terminal apparatus 100, for example, in order on the obtained route of the support apparatuses mentioned above to which the support signal identifiers are assigned.

When the instructions receiving unit 201 receives end instruction from the terminal apparatus 100, the management unit 202 may first identify, for example, the originating apparatus 300 not associated with other terminal apparatus 100 among the originating apparatuses 300 associated with the terminal apparatus 100 which has transmitted the end instruction. The management unit 202 changes an apparatus state of the identified originating apparatus 300, the state being stored in the apparatus information storage unit 205, into a state indicating a state of not sending a signal. When the apparatus information storage unit 205 stores the apparatus status exemplified in FIG. 7, the management unit 202 changes an origination state of the identified originating apparatus 300, the state being stored in the apparatus information storage unit 205, into "no emission". The management unit 202 cancels association of the terminal apparatus 100 which has transmitted the end instruction with the originating apparatus 300 associated with the terminal apparatus 100. In other words, the management unit 202 deletes the identifier of the terminal apparatus 100 which has transmitted the end instruction from the apparatus status stored in the apparatus information storage unit 205.

The signal information transmitting unit 203 transmits end instruction to each of the object apparatus which is associated with the terminal apparatus 100 which has transmitted the end instruction but is not associated with other terminal apparatus 100, and the support apparatus.

The signal detecting unit 105 of the terminal apparatus 100 in the present exemplary embodiment receives the support signal identifier from the management apparatus 200F, in addition to the object identifier. The signal detecting unit 105 detects, in addition to the object signal, the support signal in the candidates of the origination region detected by the identifying unit 106.

The display control unit 107 of the present exemplary embodiment displays a mark indicating an object apparatus on the origination region in which the object signal is detected. Furthermore, the display control unit 107 displays a mark indicating the order of the support apparatuses on the origination region in which the support signal is detected. The order of the support apparatuses is an order of the positions of the support apparatuses to which the support signal identifiers indicated by the detected support signals are assigned on the above-mentioned route, the order being started from the position of the terminal apparatus 100. The mark representing the order may be a display by which a user can recognize the order. The display control unit 107 may represent the order by an arrow. The display control unit 107 may represent the order by, for example, drawing an arrow which connects the origination regions of the consecutive support signals, and indicates a direction to an origination region of a support signal with later order from an origination region of a support signal with earlier order. The display control unit 107 may display graphics on the origination regions of the support signals as the mark, and represent the order by at least either a color or a shade of the graphics. The display control unit 107 may represent the order by sequentially changing at least either the color or a shade of the marks displayed on the origination regions in which the support signals are detected, for example, according to the order of the support signals. The display control unit 107 may represent the order by, for example, blinking the marks sequentially from a mark with earlier order.

Next, an operation of the object display system 1F of the present exemplary embodiment will be described in detail with reference to drawings.

Figure 33:
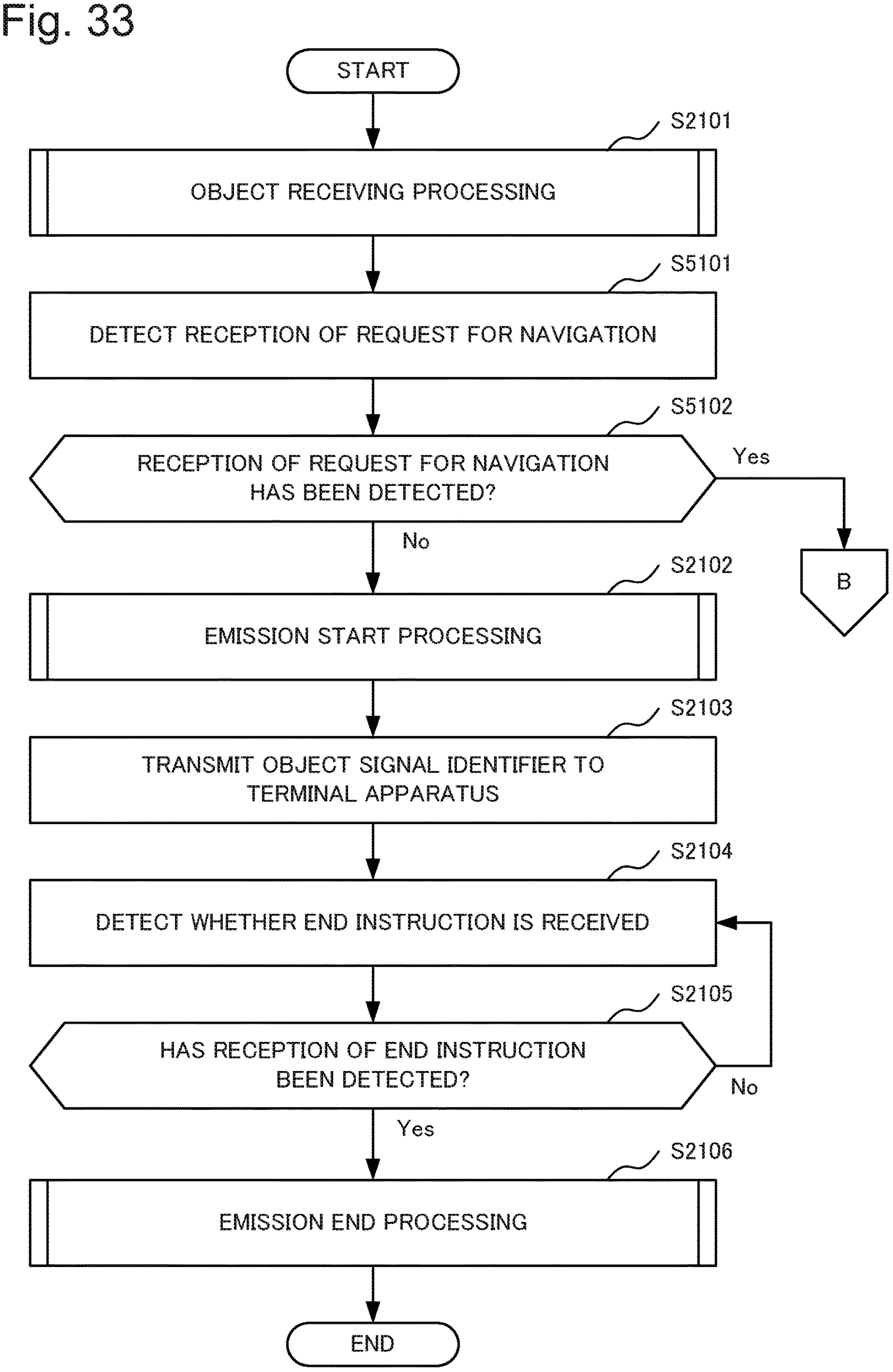
FIG. 33 is a first flowchart illustrating an operation of a management apparatus according to the fifth exemplary embodiment of the present invention.
Figure 34:
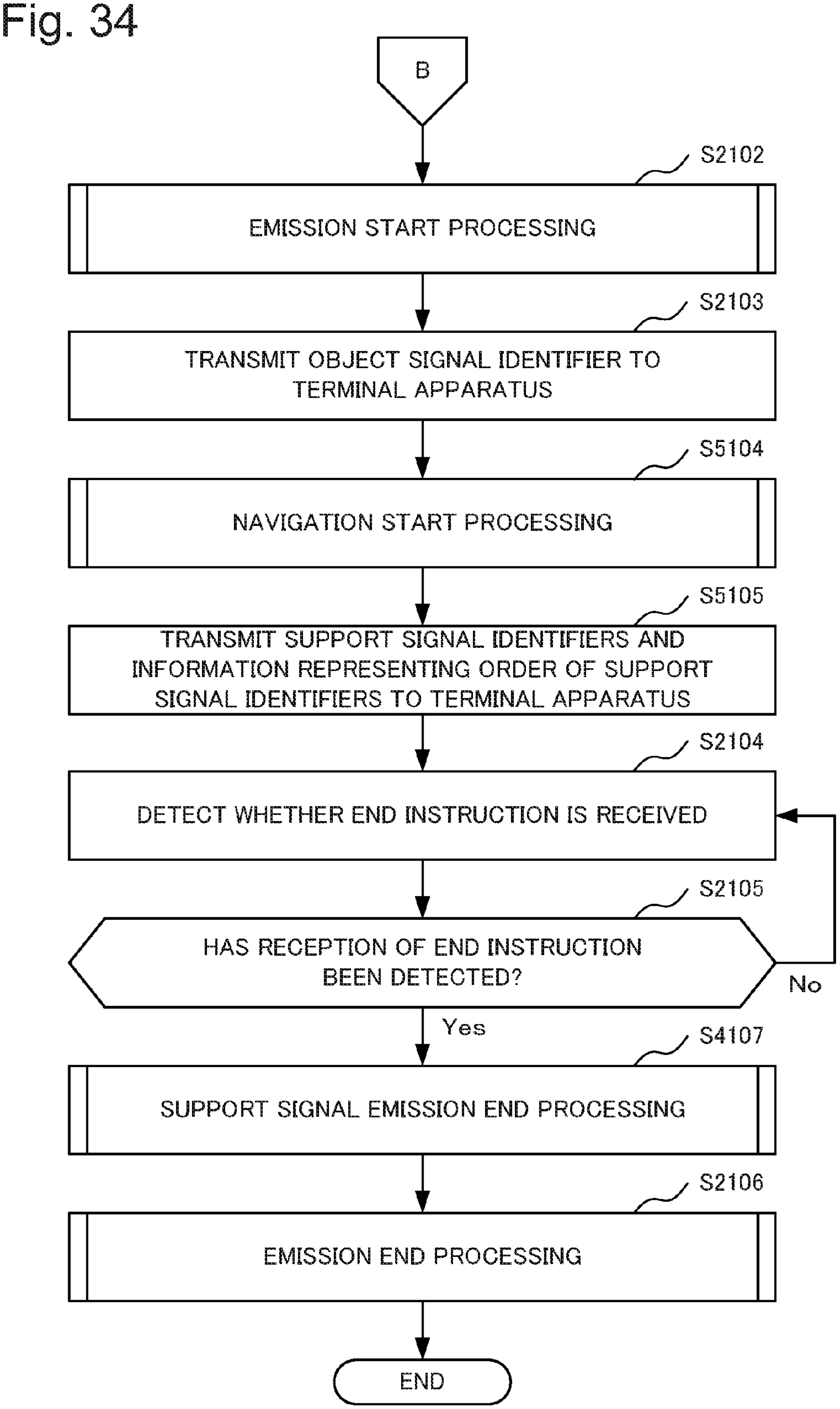
FIG. 34 is a second flowchart illustrating an operation of a management apparatus according to the fifth exemplary embodiment of the present invention.

FIG. 33 and FIG. 34 are flowcharts illustrating an operation of the management apparatus 200F of the present exemplary embodiment. In FIG. 33, the same numbers are assigned to the steps, the processing details of which are the same as the steps in FIG. 15 illustrating the operation of the management apparatus 200 in the second exemplary embodiment.

In the present exemplary embodiment, the instructions receiving unit 201 detects reception of a request for navigation from the terminal apparatus 100 (step S5101), after the object receiving processing (step S2101) which is the same as that in the second exemplary embodiment. When the reception of the request for navigation is not detected (No in step S5102), the management apparatus 200F performs operations from step S2102 to step S2106. The operations from step S2102 to step S2106 performed by the management apparatus 200F are the same as operations from step S2102 to step S2106 illustrated in FIG. 15. Therefore, description for the operations is omitted.

When the reception of the request for navigation is detected (Yes in step S5102), the management apparatus 200F performs operations of step S2102 and step S2103 illustrated in FIG. 34. The operations of step S2102 and step S2103 illustrated in FIG. 34 are the same as the operations of step S2102 and step S2103 illustrated in FIG. 15. Therefore, description for the operations is omitted.

Next, the management apparatus 200F performs navigation start processing (step S5104).

Figure 35:
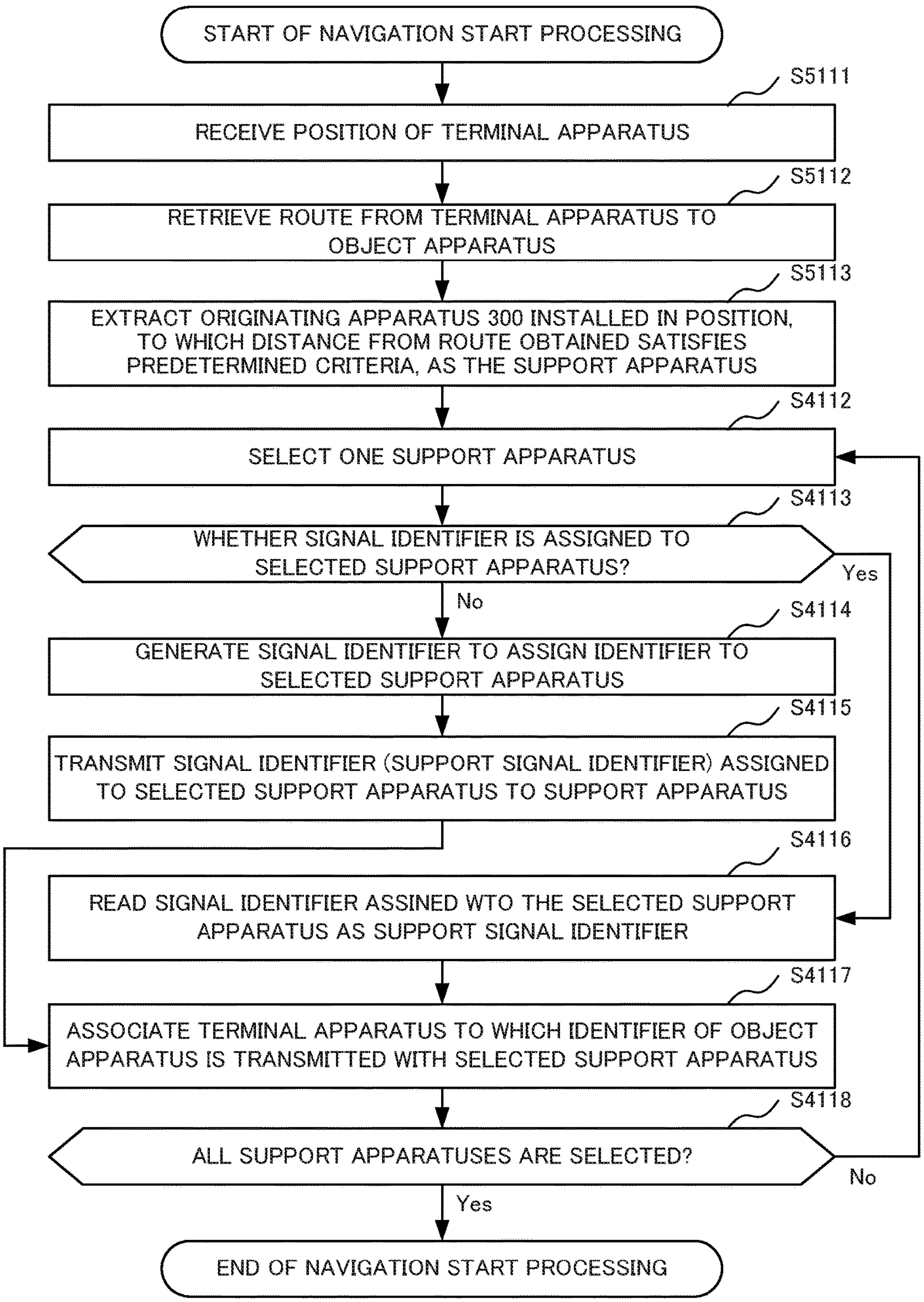
FIG. 35 is a flowchart illustrating an example of navigation start processing in the fifth exemplary embodiment of the present invention.

FIG. 35 is a flowchart illustrating an example of the navigation start processing in the present exemplary embodiment.

Referring to FIG. 35, the route retrieval unit 207 first receives the position of the terminal apparatus 100 from the terminal apparatus 100, for example, through the instructions receiving unit 201 and the management unit 202 (step S5111). The route retrieval unit 207 retrieves the route from the received position of the terminal apparatus 100 to the position of the object apparatus (step S5112).

Next, the apparatus retrieving unit 204 extracts the originating apparatus 300 installed in a position, to which a distance from the route obtained in step S5112 satisfies a predetermined criteria, as the support apparatus (step S5113). In step S5113, the apparatus retrieving unit 204 may extract, for example, the originating apparatus 300, to which the shortest distance from the obtained route being equal to or less than a predetermined value, as the support apparatus.

Operations of each step from step S4112 to step S4118 in FIG. 35 are the same as those of corresponding steps, to which the same numbers are assigned, in the support signal origination start processing of the fourth exemplary embodiment illustrated in FIG. 24. Therefore, description for the operations is omitted. By operations from step S4112 to step S4118, the management apparatus 200F assigns a support signal identifier to each support apparatus. The management apparatus 200F then transmits the assigned support signal identifier to the support apparatus to which the support signal identifier is assigned, thereby causing the support apparatus to start sending a support signal. After that, the management apparatus 200F ends the operation illustrated in FIG. 35.

Referring to FIG. 34, the management unit 202 next transmits support signal identifiers and information representing the order of the support signal identifiers to the terminal apparatus 100 through the signal information transmitting unit 203 (step S5105). The order of the support apparatuses is an order of the installed positions of the support apparatuses to which the support signal identifiers are assigned on the above-mentioned route obtained, the order being an order of distances from the position of the terminal apparatus 100. The management unit 202 may transmits the support signal identifiers in order of the distance from the terminal apparatus 100 to the support apparatuses to which the support signal identifiers are assigned.

When an input of the end instruction from a user is not detected (No in step S2104 and step S2105), the instructions transmitting unit 102 continues detecting of the input of the end instruction. As mentioned above, operations of step S2104 and step S2105 in FIG. 34 are the same as those of the steps, to which the same numbers are assigned, illustrated in FIG. 15. When the input of the end instruction from a user is detected (Yes in step S2104 and step S2105), the management apparatus 200F performs the support signal emission end processing (step SS4107) and the emission end processing (step S2106). The support signal emission end processing is processing causing the support apparatus to end sending of the support signal. The emission end processing is processing causing the object apparatus to end sending of the object signal.

The support signal emission end processing of step SS4107 is the same as the support signal end processing in the fourth exemplary embodiment illustrated in FIG. 26. The emission end processing of step S2106 is the same as the emission end processing in the second exemplary embodiment illustrated in FIG. 18.

After that, the management apparatus 200F of the present exemplary embodiment ends the operation illustrated in FIG. 34.

Next, an operation of the terminal apparatus 100 of the present exemplary embodiment will be described in detail with reference to drawings.

Figure 36:
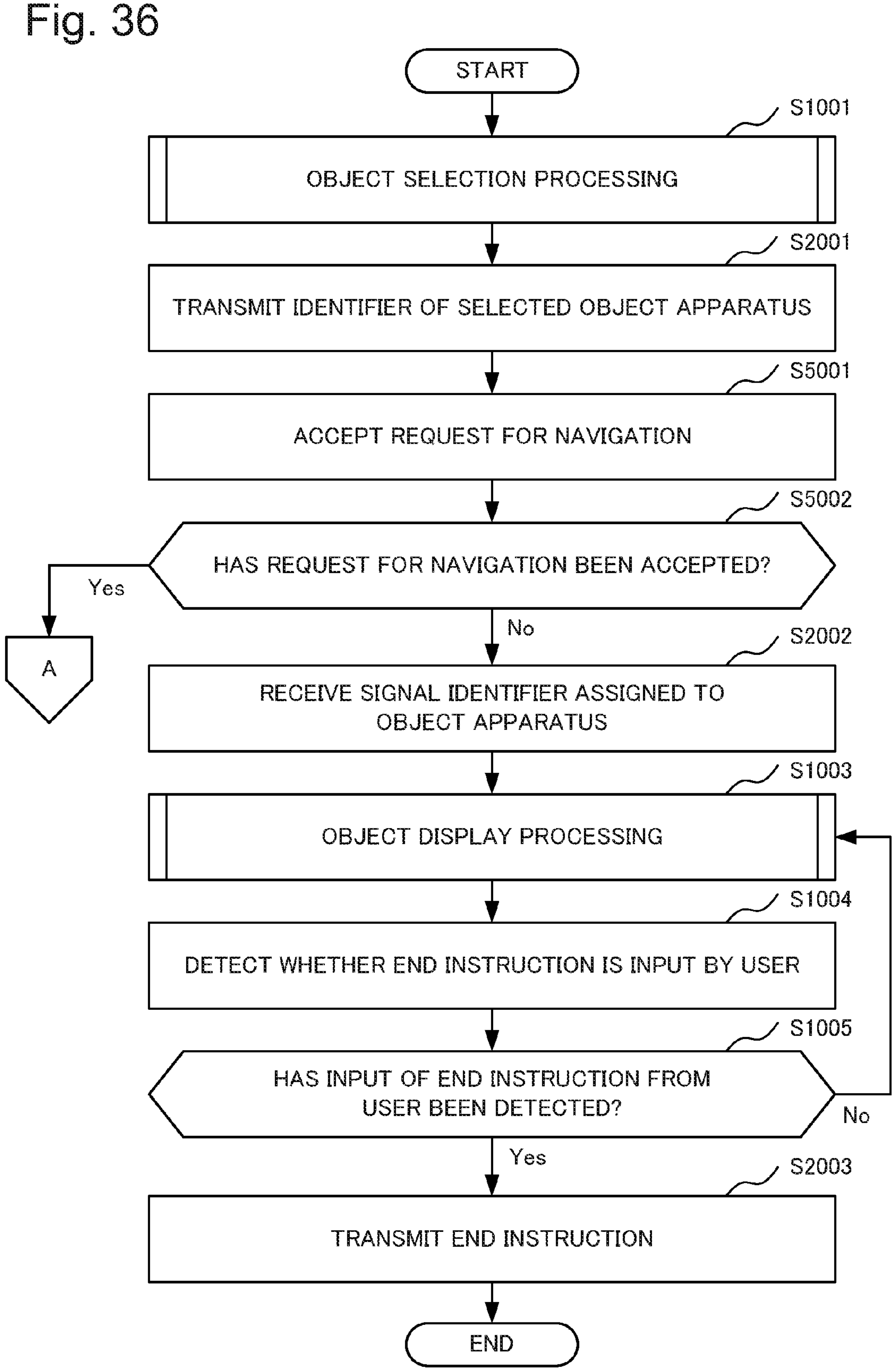
FIG. 36 is a first flowchart illustrating an example of an operation of a terminal apparatus according to the fifth exemplary embodiment of the present invention.
Figure 37:
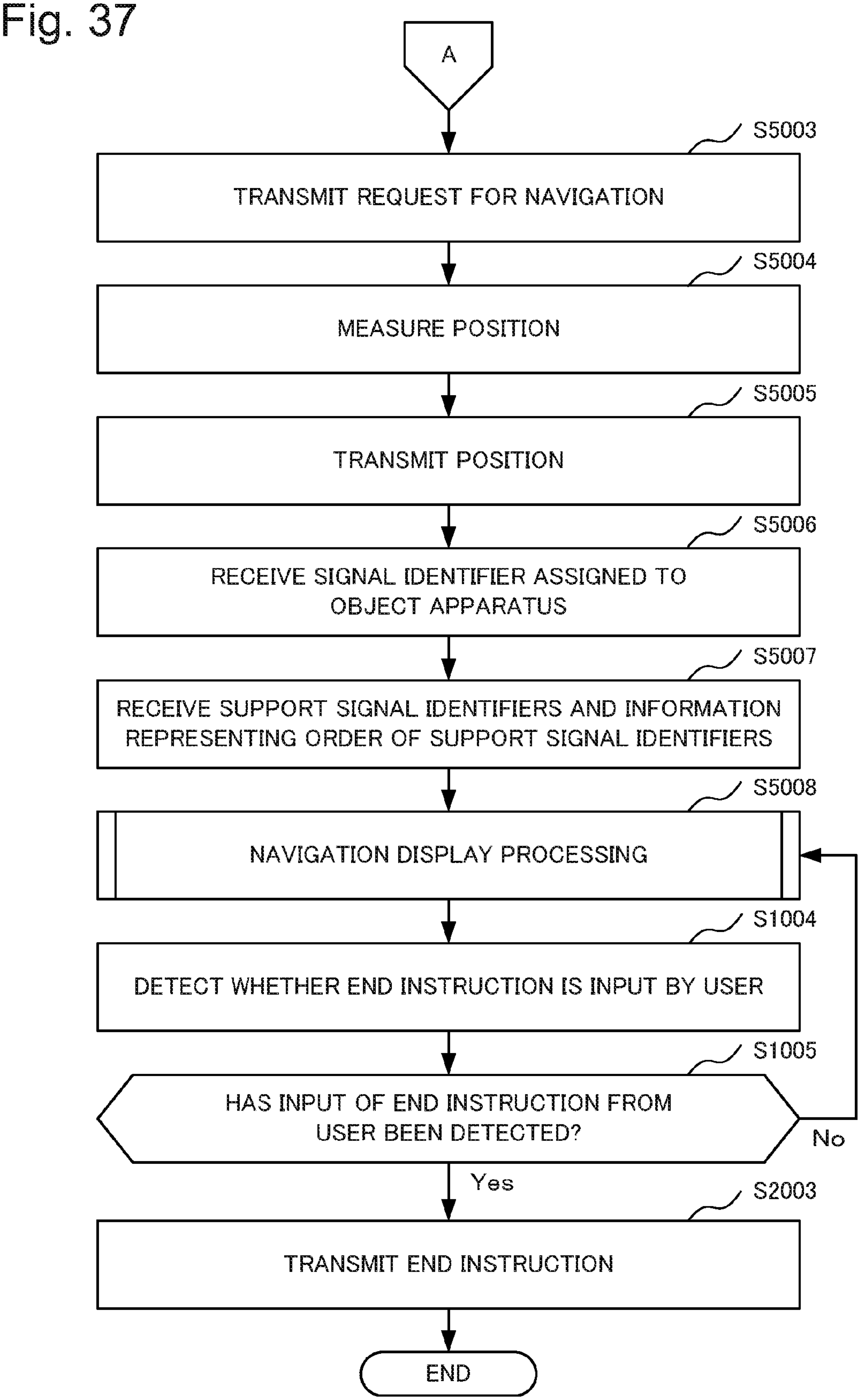
FIG. 37 is a second flowchart illustrating an example of an operation of a terminal apparatus according to the fifth exemplary embodiment of the present invention.

FIG. 36 and FIG. 37 are flowcharts illustrating an example of the operation of the terminal apparatus 100 according to the present exemplary embodiment. In FIG. 36, the same numbers are assigned to the steps, the processing details of which are the same as the steps in FIG. 14 illustrating the operation of the terminal apparatus 100D in the second exemplary embodiment.

Referring to FIG. 36, the terminal apparatus 100 of the present exemplary embodiment performs the object selection processing (step S1001) as is the case with the terminal apparatus 100 in the second exemplary embodiment, and transmits the identifier of the selected object apparatus to the management apparatus 200F (step S2001).

Next, the instructions transmitting unit 102 accepts the request for navigation, input by a user using the input unit 101 (step S5001). When a user does not perform an operation of the request for navigation, the instructions transmitting unit 102 does not accept the request for navigation. When the instructions transmitting unit 102 does not accept the request for navigation (No in step S5002), the management apparatus 200F of the present exemplary embodiment performs the operations from step S2002 to step S2003 illustrated in FIG. 37. An operation of each of step S2002 to step S2003 illustrated in FIG. 37 is the same as corresponding operation of the step, to which the same reference signs is assigned, in the operation of the management apparatus 200 in the second exemplary embodiment illustrated in FIG. 14.

When the instructions transmitting unit 102 accepts the request for navigation (Yes in step S5002), the instructions transmitting unit 102 transmits the request for navigation to the management apparatus 200F, as illustrated in FIG. 37 (step S5003). Furthermore, the position measuring unit 109 measures the position of the terminal apparatus 100 (step S5004). The instructions transmitting unit 102 transmits the position measured by the position measuring unit 109 to the management apparatus 200 (step S5005).

Next, the signal detecting unit 105 receives the object identifier which is a signal identifier assigned to the object apparatus from the management apparatus 200 (step S5006). The signal detecting unit 105 receives support signal identifiers and data representing the order of the support signal identifiers from the management apparatus 200 (step S5007). The terminal apparatus 100 performs navigation display processing (step S5008).

Figure 38:
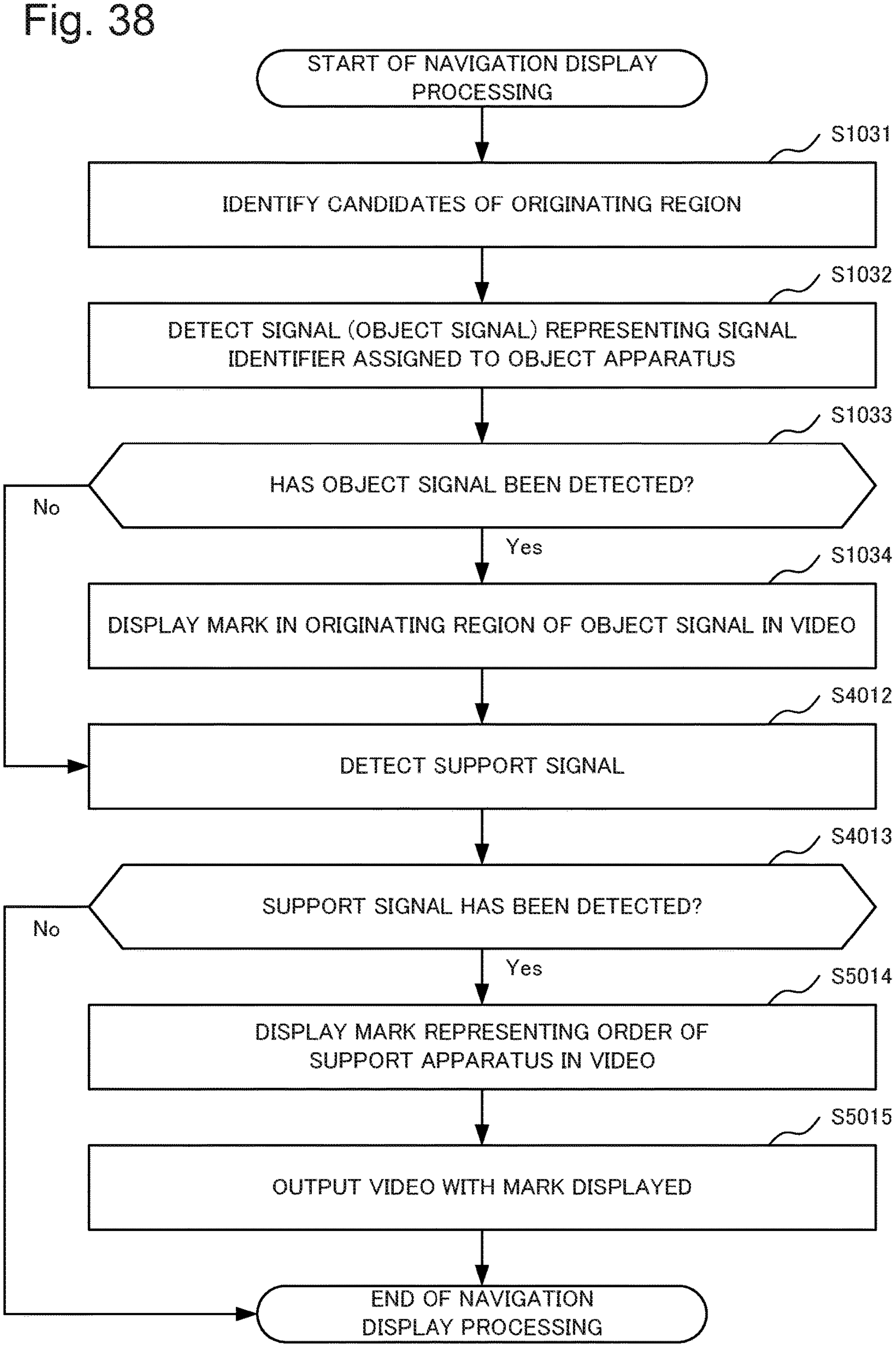
FIG. 38 is a flowchart illustrating an example of navigation display processing in the fifth exemplary embodiment of the present invention.

FIG. 38 is a flowchart illustrating an example of the navigation display processing in the present exemplary embodiment.

Among the operations illustrated in FIG. 38, the operations from step S1031 to step S1034 are the same as the operations from step S1031 to step S1034 in the second exemplary embodiment illustrated in FIG. 6. The operations from step S1031 to step S1034 is operations from identifying of the candidates of the origination region, to displaying of a mark on the origination region of the object signal in the video when the object signal is detected. Among the operations illustrated in FIG. 38, the operations of step S4012 and step S4013 are the same as operations of step S4012 and step S4013 illustrated in FIG. 28.

The identifying unit 106 identifies the candidates of the origination region in the video captured by the sensor 103 (step S1031). The signal detecting unit 105 detects the object signal in the candidates of the identified origination region (step S1032). When the object signal is detected (Yes in step S1033), the display control unit 107 displays a mark representing the object apparatus on the origination region in which the object signal is detected in the video captured by the sensor 103 (step S1034). When the object signal is not detected (No in step S1033), the display control unit 107 does not display the mark in step S1034.

The signal detecting unit 105 further detects the support signal in the identified candidates of the origination region (step S4012). When the support signal is not detected (No in step S4013), the terminal apparatus 100 in the present exemplary embodiment ends the operation illustrated in FIG. 38.

When the support signal is detected (Yes in step S4013), the display control unit 107 displays a mark representing an order of support signals as mentioned above in the video captured by the sensor 103 (step S5014).

The display control unit 107 outputs the video with the mark displayed to the display unit 108 (step S108). When the object signal is detected, the mark representing the object apparatus is displayed in the video. When the support signal is detected, the mark representing an order of the support apparatuses is displayed in the video. After that, the terminal apparatus 100 ends the operation illustrated in FIG. 38.

Next, the terminal apparatus 100 performs operations from step S1004 to step S2003 illustrated in FIG. 37, the end instruction to the management apparatus 200F being transmitted in the operations when the end instruction is input by the user. These operations are the same as the operations from step S1004 to step S2003 in FIG. 14 illustrating the operation of the terminal apparatus 100 in the second exemplary embodiment.

The present exemplary embodiment described above has the same advantageous effect as the first and second exemplary embodiments. The reason is the same as the reason why the advantageous effect occurs in the first and second exemplary embodiments.

The present exemplary embodiment further has an advantageous effect capable of guiding a user to an object apparatus.

This is because the route retrieval unit 207 retrieves a route from the terminal apparatus 100 to an object apparatus and the apparatus retrieving unit 204 extracts the originating apparatus 300 of which a distance from the obtained route satisfies a predetermined criteria as a support apparatus. It is also because the management unit 202 transmits a support signal identifier to the extracted support apparatus through the signal information transmitting unit 203, thereby causing the support apparatus to send a support signal. The display control unit 107 of the terminal apparatus 100 displays a mark indicating an order of the distance from the terminal apparatus 100 to the extracted support apparatus on the origination region in which the signal detecting unit 105 detects the support signal. If a sufficient number of support apparatuses are extracted, a user can arrive at the object apparatus by following the origination regions in which the support signals are detected in order of the distance from the terminal apparatus 100.

Sixth Exemplary Embodiment

Hereinafter, a sixth exemplary embodiment of the present invention will be described in detail with reference to drawings. An originating apparatus according to the present embodiment can provide a service for a user.

Figure 39:
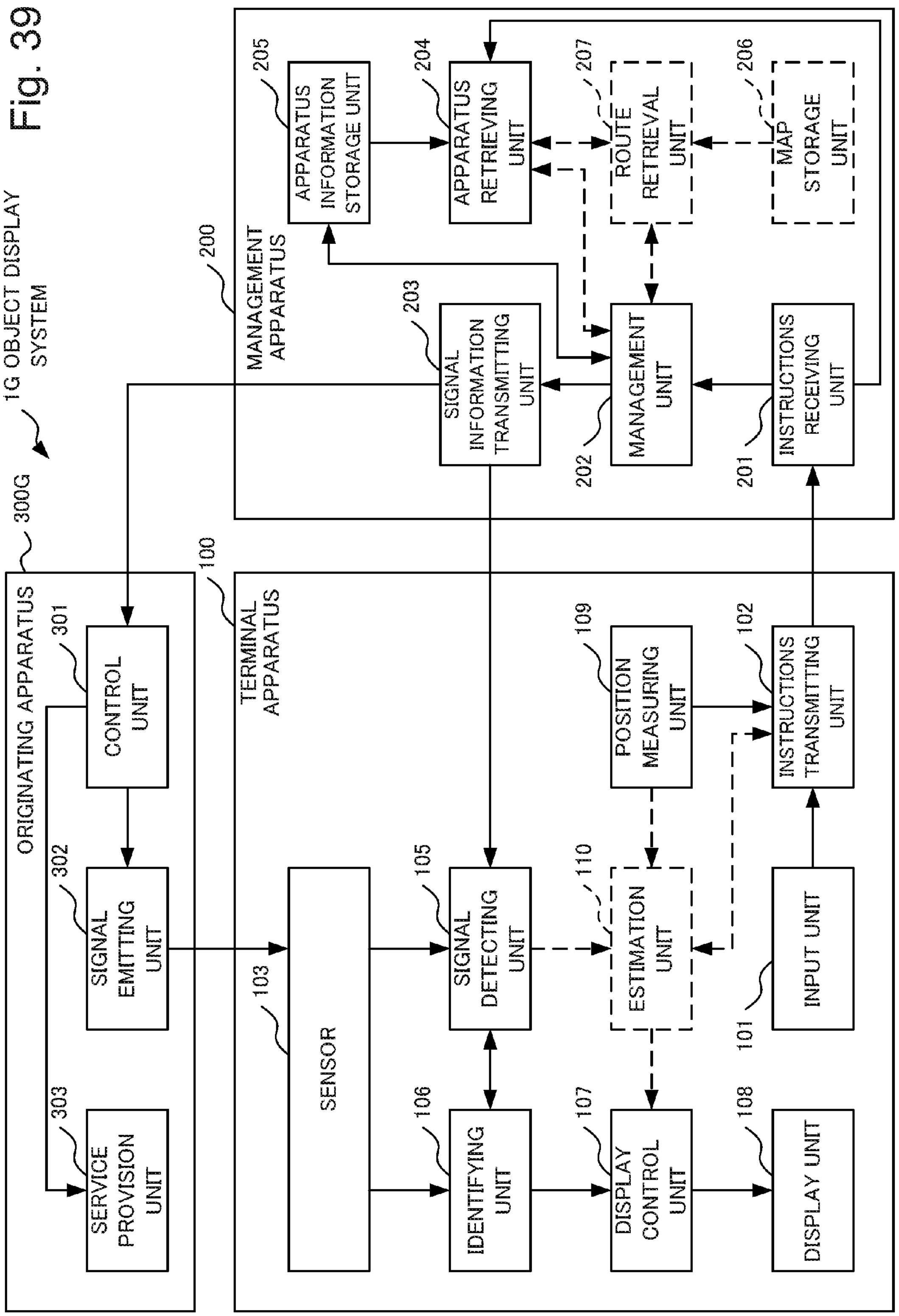
FIG. 39 is a block diagram illustrating an example of a configuration of an object display system according to a sixth exemplary embodiment of the present invention.

FIG. 39 is a block diagram illustrating an example of a configuration of an object display system 1G according to the preset exemplary embodiment.

When a configuration in FIG. 39 and a configuration of the object display system 1 in the second exemplary embodiment illustrated in FIG. 1 are compared, the object display system 1G in the present exemplary embodiment includes an originating apparatus 300G instead of the originating apparatus 300. In an example illustrated in FIG. 39, the object display system 1G includes one originating apparatus 300G. However, the object display system 1G may include two or more originating apparatuses 300G. The object display system 1G may further include one or more originating apparatuses 300. The object display system 1G in the present exemplary embodiment performs an operation described below to the originating apparatus 300G. The object display system 1G in the present exemplary embodiment performs the operation to the originating apparatus 300, the operation being the same as or similar to that of the object display system 1 in the second exemplary embodiment. A terminal apparatus 100 and a management apparatus 200 in the present exemplary embodiment may have configurations and functions which are the same as the configurations and functions of the terminal apparatus and the management apparatus according to the exemplary embodiments except for the second exemplary embodiment of the present invention. Hereinafter, description will be made in a case in which the terminal apparatus 100 and the management apparatus 200 of the present exemplary embodiment have configurations and functions which are the same as the configurations and functions of the terminal apparatus and the management apparatus according to the second exemplary embodiment of the present invention. The same reference signs are assigned to the same components as the components of the second exemplary embodiment among components of the present exemplary embodiment, and the description for the components is appropriately omitted. The same reference signs are assigned to the same operations as the operations of the second exemplary embodiment among operations of the present exemplary embodiment, and the description for the operations is appropriately omitted.

The originating apparatus 300G includes a service provision unit 303 in addition to the components of the originating apparatus 300 in the second exemplary embodiment.

The apparatus information storage unit 205 in the present exemplary embodiment further stores a service identifier representing a service which can be provided by the service provision unit 303 of the originating apparatus 300G, as an apparatus status included in the originating apparatus 300G. In the apparatus status exemplified to FIG. 7, the apparatus information storage unit 205 may store the service identifier, "service".

An instructions transmitting unit 102 of the terminal apparatus 100 in the present exemplary embodiment further detects an input of a service request from a user through an input unit 101. Then, the instructions transmitting unit 102 identifies a service requested by the service request of which the input is detected. In addition to the identifier of an object apparatus, the instructions transmitting unit 102 transmits a service identifier indicating the identified service to the instructions receiving unit 201.

When the instructions receiving unit 201 receives the identifier of the object apparatus and the service identifier, the management unit 202 of the management apparatus 200 in the present exemplary embodiment inquires, to the object apparatus, about whether or not the object apparatus can provide a service represented by the service identifier. When a response is received which represents that the service can be provided from the object apparatus, the management unit 202 transmits an instruction for the service provision indicated by the service identifier to the object apparatus in addition to the object identifier assigned to the object apparatus. When a response is received which represents that the service is not available from the object apparatus, the management unit 202 transmits a notification representing that the service provision is not available to the terminal apparatus 100 through the instructions receiving unit 201.

The service provision unit 303 provides a service for a user. The services provided by the service provision unit 303 are, for example, printing of a photograph, providing of a drink, or the like. The service provision unit 303 may provide other services. In addition, the service provision unit 303 starts the preparation for providing the service when the control unit 301 receives an instruction of service provision from the management apparatus 200.

The service provision unit 303 may start the preparation for providing the service so that the preparation for providing the service finishes before a time when a user reaches the object apparatus including the service provision unit 303. In that case, the management apparatus 200 may include, for example, the route retrieval unit 207 and the map storage unit 206. The instructions receiving unit 201 may acquire a position of the terminal apparatus 100 from the terminal apparatus 100, in addition to receiving of a service identifier from the terminal apparatus 100. The route retrieval unit 207 then retrieves a route from the position of the terminal apparatus 100 to the position of the object apparatus, and on the basis of the result, may calculate the time from leaving the position of the terminal apparatus 100 to arriving at the position of the object apparatus. The various required-time calculation methods currently used for existing navigation systems are applicable as the calculation method.

Next, an operation of the terminal apparatus 100 of the present exemplary embodiment will be described in detail with reference to drawings.

Figure 40:
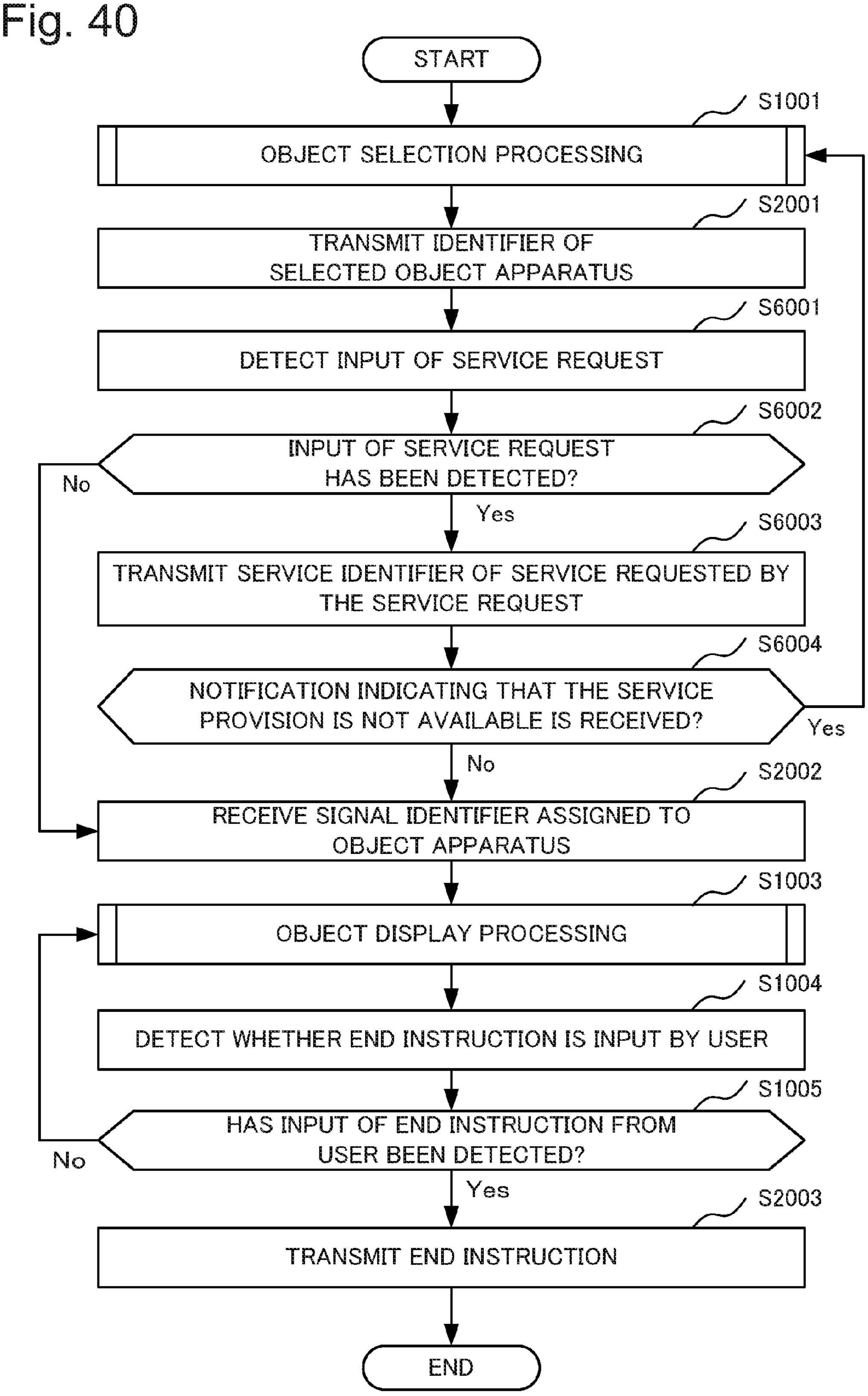
FIG. 40 is a flowchart illustrating an example of an operation of a terminal apparatus according to the sixth exemplary embodiment of the present invention.

FIG. 40 is a flowchart illustrating an example of an operation of the terminal apparatus 100 according to the present exemplary embodiment.

Referring to FIG. 40, the terminal apparatus 100 first performs object selection processing (step S1001). When displaying a list of the originating apparatuses 300G in the object selection processing, the terminal apparatus 100 of the present exemplary embodiment may display the service which can be provided by each of the originating apparatus 300G displayed. The instructions transmitting unit 102 transmits the selected identifier of the object apparatus to the management apparatus 200.

Furthermore, the instructions transmitting unit 102 detects the input of a service request from a user through the input unit 101 (step S6001). When the input of the service request is not detected (No in step S6002), the terminal apparatus 100 performs operations from step S2002 to step S2003. The operations from step S2002 to step S2003 of the present exemplary embodiment are the same as operations from step S2002 to step S2003 of the second exemplary embodiment, illustrated in FIG. 14.

When the input of the service request is detected (Yes in step S6002), the instructions transmitting unit 102 transmits the service identifier representing the service, providing thereof being required by the service request, to the management apparatus 200 (step S6003). When the object apparatus may not provide the required service, the management apparatus 200 sends back a notification indicating that the service provision is not available to the instructions transmitting unit 102.

When the notification indicating that the service provision is not available is sent back (Yes in step S6004), the terminal apparatus 100 repeats the operation illustrated in FIG. 40 from the object selection processing of step S1001.

When the notification indicating that the service provision is not available is not sent back (No in step S6004), the terminal apparatus 100 performs operations from step S2002 to step S2003.

After that, the terminal apparatus 100 ends the operation illustrated in FIG. 40.

Next, an operation of the management apparatus 200 in the present exemplary embodiment will described in detail with reference to drawings.

Figure 41:
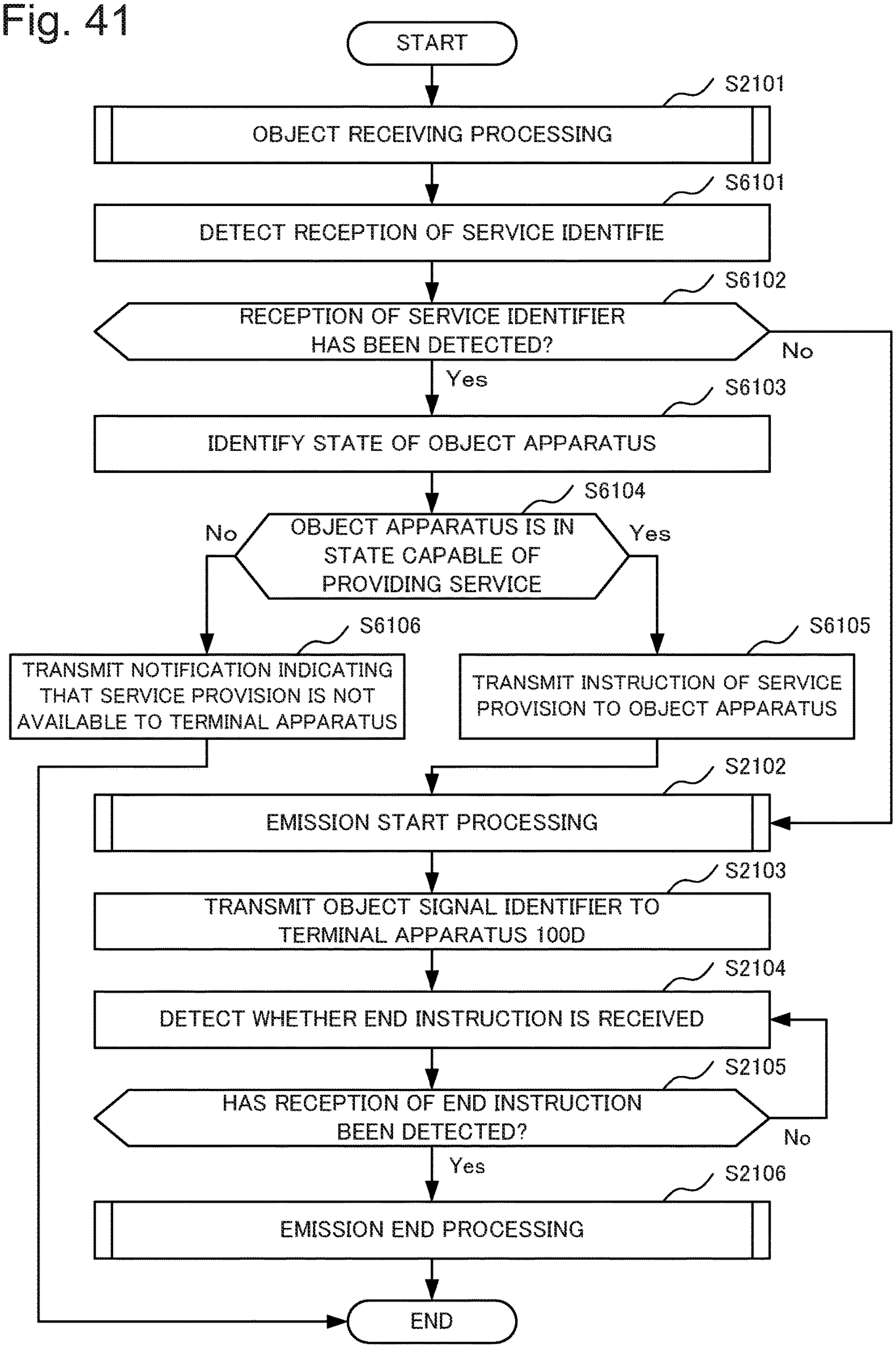
FIG. 41 is a flowchart illustrating an example of an operation of a management apparatus in the sixth exemplary embodiment of the present invention.

FIG. 41 is a flowchart illustrating an example of an operation of the management apparatus 200 in the preset exemplary embodiment.

Referring to FIG. 41, the management apparatus 200 in the present exemplary embodiment performs object receiving processing (step S2101). The object receiving processing in step S2101 is the same as the object receiving processing in the second exemplary embodiment illustrated in FIG. 15.

The instructions receiving unit 201 next detects reception of the service identifier from the terminal apparatus 100 (step S6101). The instructions receiving unit 201 may end the operation detecting the reception of the service identifier, for example, when the service identifier is not transmitted within predetermined period after the identifier of the object apparatus is transmitted. When the reception of the service identifier is not detected (No in step S6102), the management apparatus 200 performs operations from step S2102 to step S2106. The operations from step S2102 to step S2106 performed by the management apparatus 200 of the present exemplary embodiment are the same as the operations from step S2102 to step S2106, illustrated in FIG. 15, performed by the management apparatus 200 in the second exemplary embodiment.

When the reception of the service identifier is detected (Yes in step S6102), the management unit 202 identifies the state of the object apparatus, for example, through the signal information transmitting unit 203 (step S6103). The management unit 202 may transmit, for example, a message for inquiring about whether or not providing of the service indicated by the received service identifier is available to the object apparatus. For example, when a response representing that providing of the service is available is sent back as a response to the message from the object apparatus within predetermined period from the transmission of the message, the management unit 202 may determine that the object apparatus is in the state capable of providing the service. The management unit 202 may determine, otherwise, that the object apparatus is not in the state capable of providing the service.

When the object apparatus is not in the state capable of providing the service (No in step S6104), the management unit 202 transmits the notification indicating that the service provision is not available to the terminal apparatus 100 through the instructions receiving unit 201 (step S6106). After that, the management apparatus 200 ends the operation illustrated in FIG. 41.

When the object apparatus is in the state capable of providing the service (Yes in step S6104), the management unit 202 transmits an instruction of service provision to the object apparatus through the signal information transmitting unit 203 (step S6105). The management unit 202 may transmit the received service identifier as the instruction of service provision. When the originating apparatus 300G can provide a plurality of services, the originating apparatus 300G may start preparation for providing a service represented by the service identifier received as the instruction of service provision. The management apparatus 200 performs operations from step S2102 to step S2106, and then ends the operation illustrated in FIG. 41.

Next, an operation of the origination apparatus 300G in the present exemplary embodiment will described in detail with reference to drawings.

Figure 42:
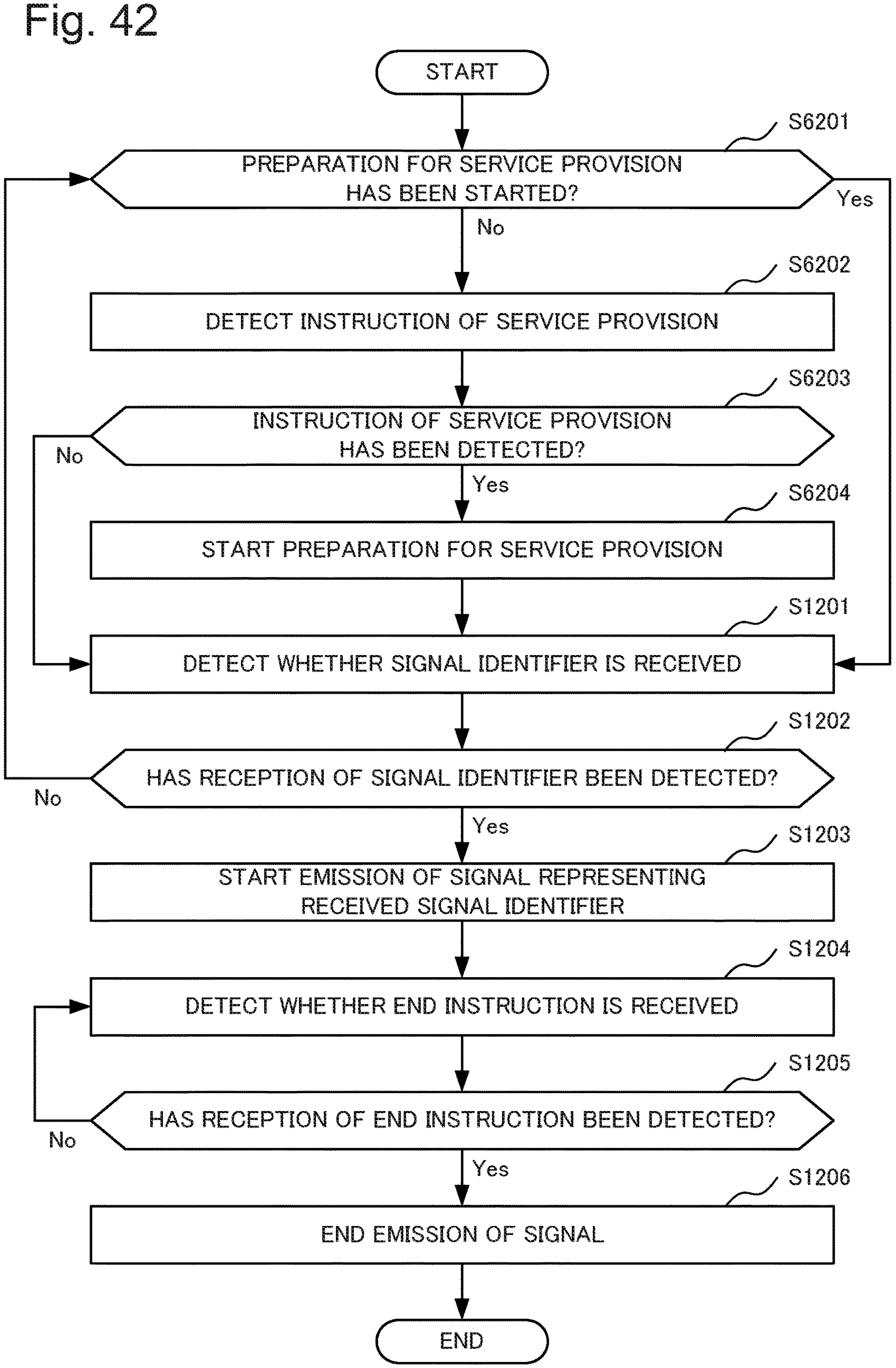
FIG. 42 is a flowchart illustrating an example of an operation of an originating apparatus in the sixth exemplary embodiment of the present invention.

FIG. 42 is a flowchart illustrating an example of an operation of the originating apparatus 300G in the present exemplary embodiment. The same reference signs are assigned to the steps, the processing details of which are the same as the steps in FIG. 13 illustrating the operation of the originating apparatus 300 in the first exemplary embodiment, among the steps illustrated in FIG. 42, description for the steps is appropriately omitted.

Referring to FIG. 42, when the service provision unit 303 has already started preparation for service provision (Yes in step S6201), the control unit 301 detects reception of the signal identifier (step S1201). When the reception of the signal identifier is detected (Yes in step S1201), the originating apparatus 300G performs operations from step S1203 to step S1206. The operations of the originating apparatus 300G of the present exemplary embodiment from step S1203 to step S1206 are the same as operations of the originating apparatus 300 in the first exemplary embodiment illustrated in FIG. 13 from step S1203 to step S1206. After that, the originating apparatus 300G ends the operation illustrated in FIG. 42. When the reception of the signal identifier is not detected (No in step S1201), the originating apparatus 300G repeats the operation illustrated in FIG. 42 from step S6201.

When the service provision unit 303 has not started the preparation of the service provision yet (No in step S6201), the control unit 301 detects an instruction of service provision (step S6202). For example, when the instructions of service provision is not detected within a predetermined period, the control unit 301 may end the operation of step S6202. When the instruction of service provision is not detected (No in step S6203), the originating apparatus 300G performs the operations of step S1201 and subsequent thereto.

When the instruction of service provision is detected (Yes in step S6203), the service provision unit 303 starts preparation of service provision (step S6204). The originating apparatus 300G then performs operations of step S1201 and subsequent thereto.

The above description is for a case in which the service provision unit 303 can prepare the service to be provided simultaneously to a plurality of users.

It may not be possible to prepare the service to be provided simultaneously to a plurality of users, depending on a type of service provided by the service provision unit 303 or a configuration of the service provision unit 303. In that case, for example, the apparatus status of the originating apparatus 300G stored in the apparatus information storage unit 205 may include a value (hereinafter, written as a "service state") representing whether or not the originating apparatus 300G is in the state capable of providing the service.

The management unit 202 may read the service state of the object apparatus, for example in step S6103 of FIG. 41. The management unit 202 may determine whether or not the object apparatus is in the state capable of providing the service on the basis of the read service state in step S6104.

Moreover, the originating apparatus 300G may transmit a message representing that providing of the service becomes possible to the management apparatus 200 when providing of service to a user is finished. When receiving the message indicating that providing of the service becomes possible from the originating apparatus 300G, the management unit 202 may change the service state of the originating apparatus 300G stored in the apparatus information storage unit 205 into a value representing a state capable of providing the service. When a user finishes the use of the service, the user may transmit a message representing that the use of the service has finished to the management apparatus 200 through the terminal apparatus 100. When the message is received from the terminal apparatus 100, the management unit 202 may change the service state of the originating apparatus 300G associated with the terminal apparatus 100 stored in the apparatus information storage unit 205 into a value representing a state capable of providing the service.

The present exemplary embodiment described above has the same advantageous effect as the first and second exemplary embodiments. The reason is the same as the reason why the advantageous effect occurs in the first and second exemplary embodiments.

The present exemplary embodiment further has an advantageous effect that a user can receive a service quickly when the user of the terminal apparatus 100 arrives at a place in which the object apparatus providing the service is installed.

This is because the signal information transmitting unit 203 of the management apparatus 200 transmits an instruction of preparation for the service to the control unit 301 of the originating apparatus 300G which is the object apparatus, on the basis of the instruction from the user of the terminal apparatus 100. When the instruction of preparation for the service is received, the control unit 301 controls the service provision unit 303 to start the preparation for service provision. The service provision unit 303 starts the preparation for service provision.

Seventh Exemplary Embodiment

Next, a seventh exemplary embodiment of the present invention will be described in detail with reference to drawings.

Figure 43:
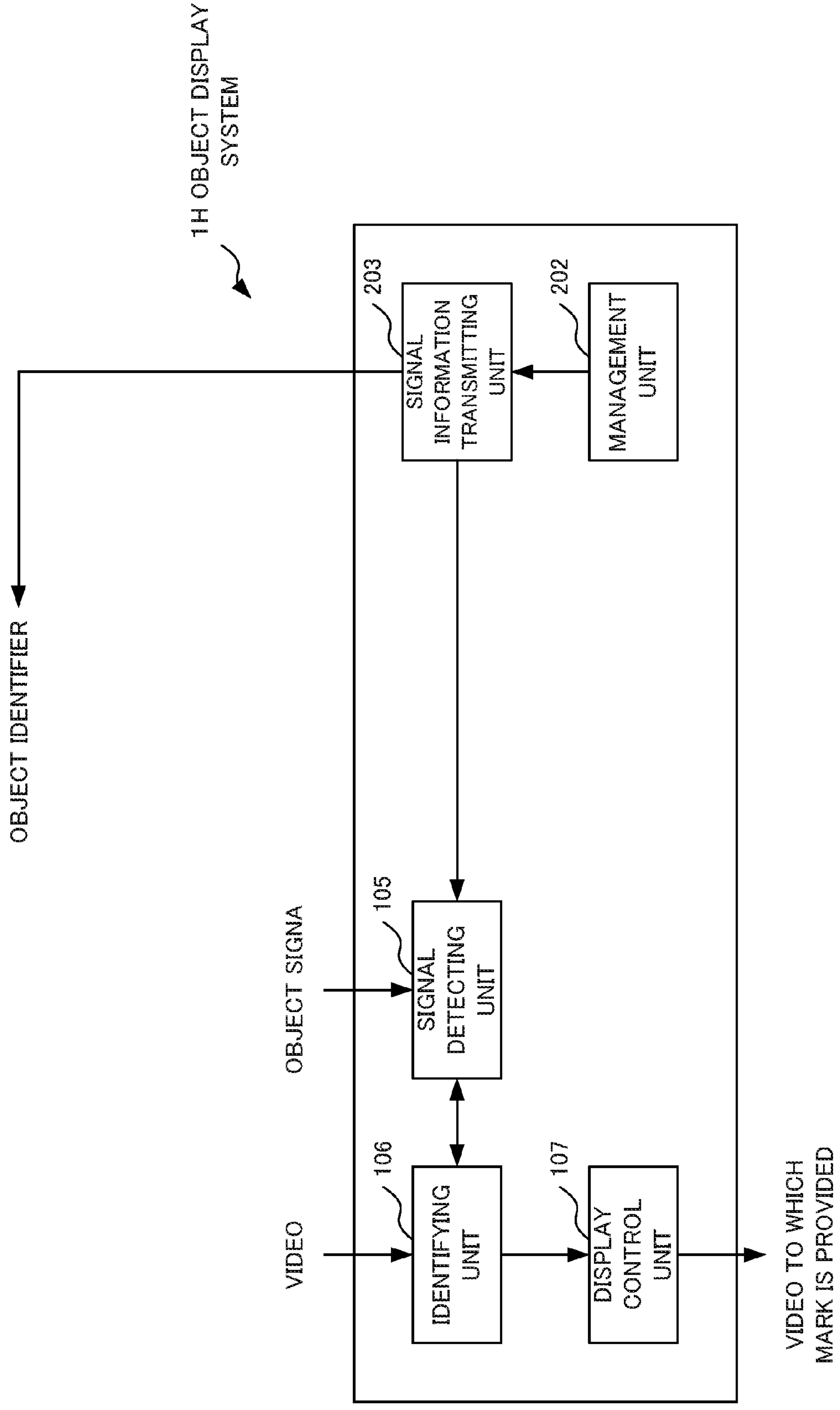
FIG. 43 is a block diagram illustrating an example of a configuration of an object display system according to a seventh exemplary embodiment of the present invention.

FIG. 43 is a block diagram illustrating an example of a configuration of an object display system 1H according to the present exemplary embodiment.

Referring to FIG. 43, an object display system 1H according to the present embodiment includes: a management unit 102 for generating an object identifier capable of distinguishing an object apparatus to which the object identifier is assigned in a predetermined region; a signal information transmitting unit 203 for transmitting the object identifier generated, to an object apparatus which is an originating apparatus 300 selected from a plurality of originating apparatuses 300 each sending a signal representing the object identifier, in response to reception of the object identifier; a signal detecting unit 105 for detecting the signal representing the object identifier transmitted to the object apparatus as an object signal which is a signal to be sent by the object apparatus, on the basis of on a sensing result by the sensor 103 detecting the signal; an identifying unit 106 for identifying an origination region from which the object signal is sent in a captured video; and a display control unit 107 for outputting the video in which a mark is provided on the origination region identified in the video.

The present exemplary embodiment described above has the same advantageous effect as the general advantageous effect of the first exemplary embodiment. The reason is the same as the reason why the general advantageous effect occurs in the first exemplary embodiment.

Other Exemplary Embodiments

Each of the object display system, the terminal apparatus, the management apparatus, and the originating apparatuses, according to each of the exemplary embodiments of the present invention can be implemented by circuitry. The circuitry is, for example, a computer including a processor and a memory on which a program for controlling the processor is loaded. The circuitry may be dedicated hardware, for example. The circuitry may be a combination of the above-mentioned computer and dedicated hardware. Each of the object display system, the terminal apparatus, the management apparatus, and the originating apparatuses may be implemented by a computer including a processor and a memory on which a program for controlling the processor is loaded. Each of the object display system, the terminal apparatus, the management apparatus, and the originating apparatuses may be implemented by dedicated hardware. Each of the object display system, the terminal apparatus, the management apparatus, and the originating apparatuses may be implemented by a combination of a computer including a processor and a memory on which a program for controlling the processor is loaded, and dedicated hardware. The above-mentioned computer may be one computer or may be two or more computers communicatively connected to each other. The above-mentioned dedicated hardware may be one circuitry or may be two or more circuitries communicatively connected to each other.

Figure 44:
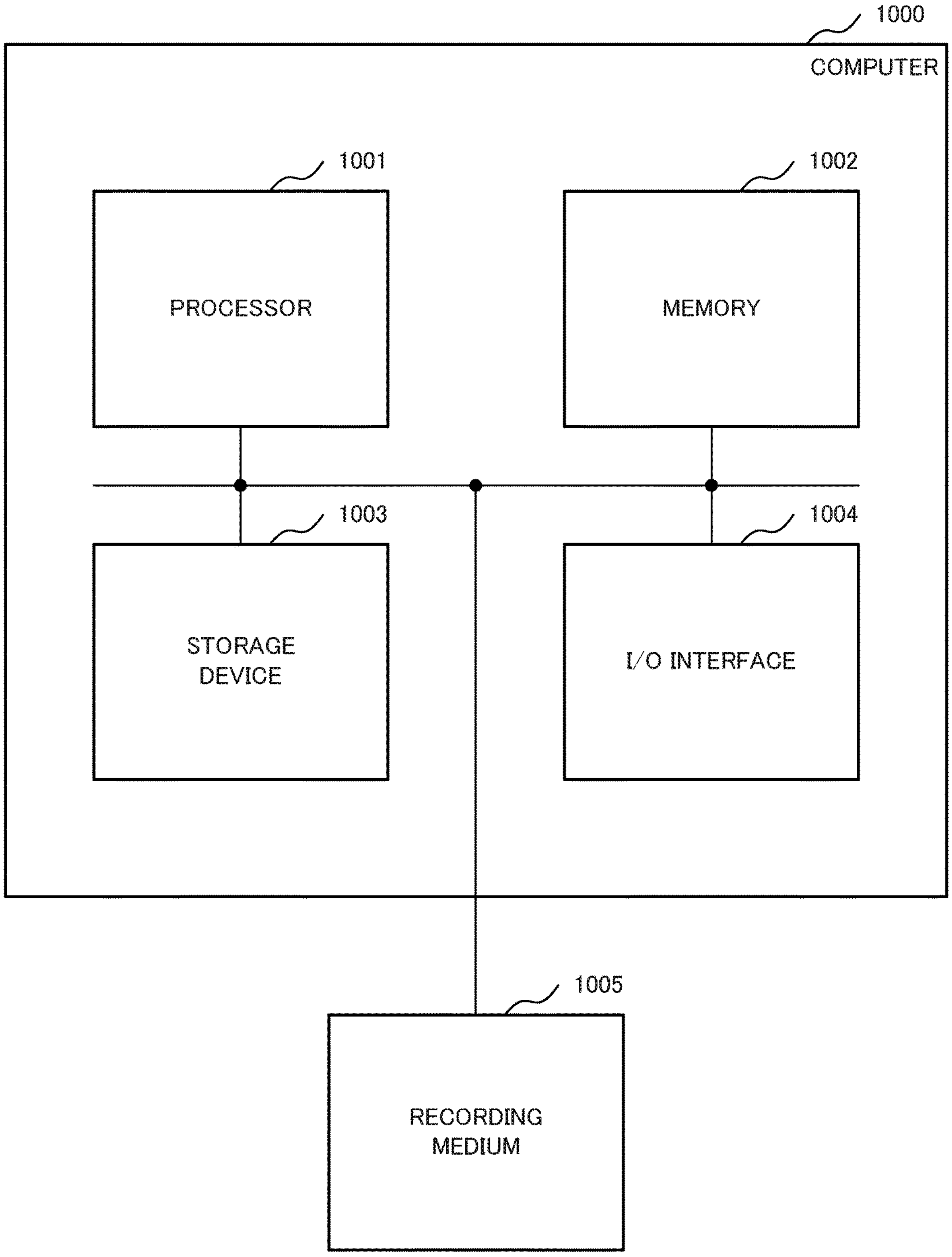
FIG. 44 is a drawing illustrating an example of a hardware configuration of a computer 1000 which can implement the terminal apparatus, the management apparatus, and the originating apparatus according to each exemplary embodiment of the present invention.

FIG. 44 is a drawing illustrating an example of a hardware configuration of a computer 1000 which can implement the terminal apparatus, the management apparatus, and the originating apparatuses according to each exemplary embodiment of the present invention. Referring to FIG. 44, the computer 1000 includes a processor 1001, a memory 1002, a storage device 1003, and an I/O (Input/Output) interface 1004. In addition, the computer 1000 can access the recording medium 1005. The memory 1002 and the storage devices 1003 are storage devices, such as RAM (Random Access Memory) and a hard disk, for example. The recording medium 1005 is a storage device such as RAM and a hard disk, a ROM (Read Only Memory), and a transportable recording medium, for example. The storage device 1003 may be the recording medium 1005. The processor 1001 can read out and write data and a program from/to the memory 1002 and the storage device 1003. The processor 1001 can access, for example, the communication network 4 through the I/O interface 1004. The processor 1001 can access the recording medium 1005. The recording medium 1005 stores a program causing the computer 1000 to implement any of the terminal apparatus, the management apparatus, and the originating apparatus according to each of the exemplary embodiment of the present invention The processor 1001 loads a program, which is stored in the recording medium 1005 and causes the computer 1000 to operate as any of the terminal apparatus, the management apparatus, and the originating apparatus according to each of the exemplary embodiments of the present invention, to the memory 1002. The processor 1001 executes the program loaded to the memory 1002, whereby the computer 1000 operates as any of the terminal apparatus, the management apparatus, and the originating apparatus according to each of the exemplary embodiments of the present invention, in accordance with the program loaded to the memory 1002.

The instructions transmitting unit 102, the signal detecting unit 105, the identifying unit 106, the display control unit 107, the position measuring unit 109, the estimation unit 110, the instructions receiving unit 201, the management unit 202, the signal information transmitting unit 203, the apparatus retrieving unit 204, the route retrieval unit 207, the communication unit 208, the control unit 301, and the service provision unit 303 can be implemented by, for example, a dedicated program which can implement a function of each unit and is read to the memory 1002 from the recording medium 1005 storing the program, and the processor 1001 executing the program. The apparatus information storage unit 205 and the map storage unit 206 can be implemented by the storage devices 1003 such as the memory 1002 and the hard disk drive included in the computer 1000. Alternatively, a part of or all of the input unit 101, the instructions transmitting unit 102, the sensor 103, the image-capturing unit 104, the display unit 108, the signal detecting unit 105, the identifying unit 106, the display control unit 107, the position measuring unit 109, the estimation unit 110, the instructions receiving unit 201, the management unit 202, the signal information transmitting unit 203, the apparatus retrieving unit 204, the apparatus information storage unit 205, the map storage unit 206, the route retrieval unit 207, the communication unit 208, the control unit 301, the signal emitting unit 302, and the service provision unit 303 can be implemented by a dedicated circuit implementing a function of each unit.

Figure 45:
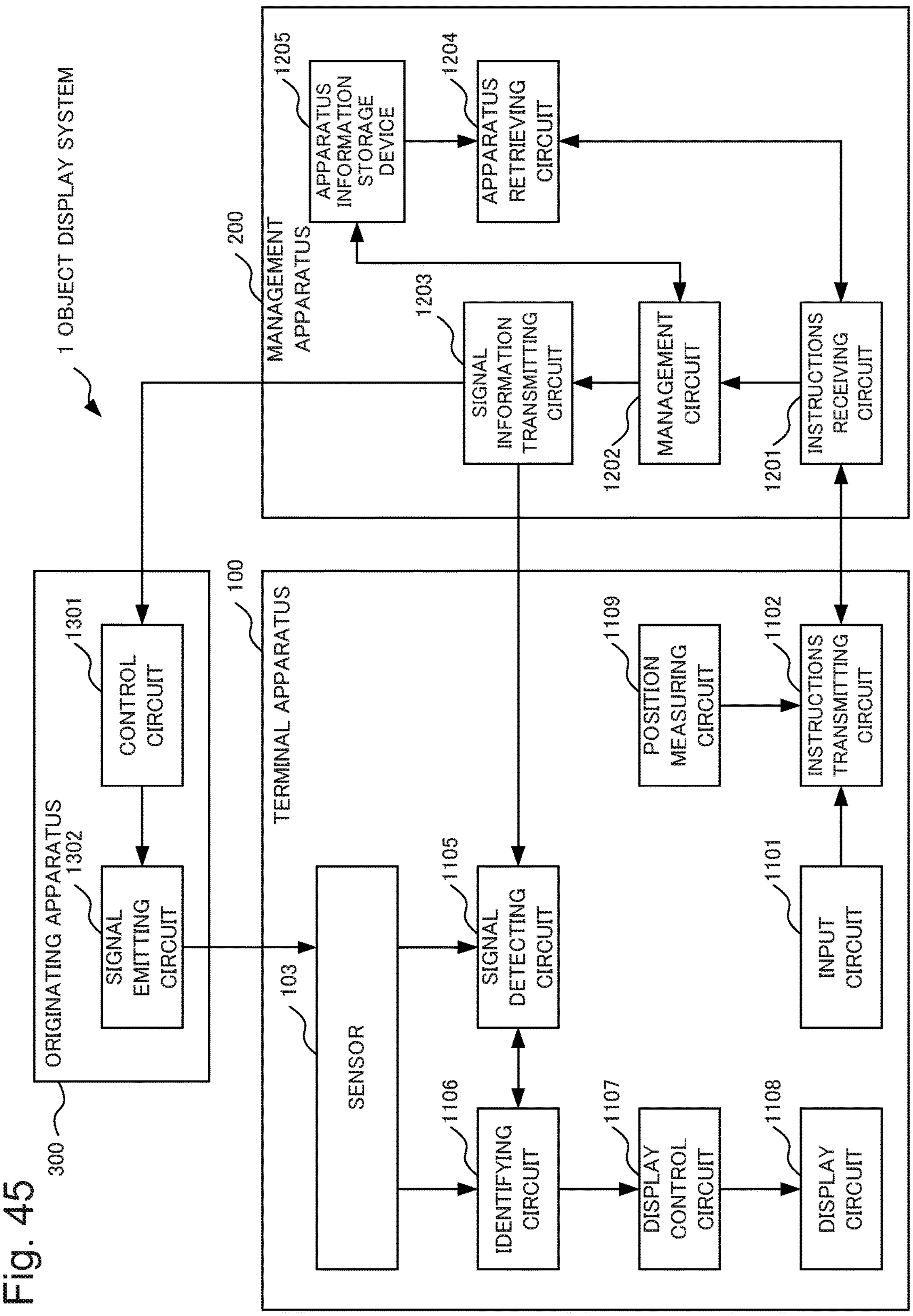
FIG. 45 is a block diagram illustrating a configuration of an object display system implemented by circuits according to the first and second exemplary embodiments of the present invention.
Figure 46:
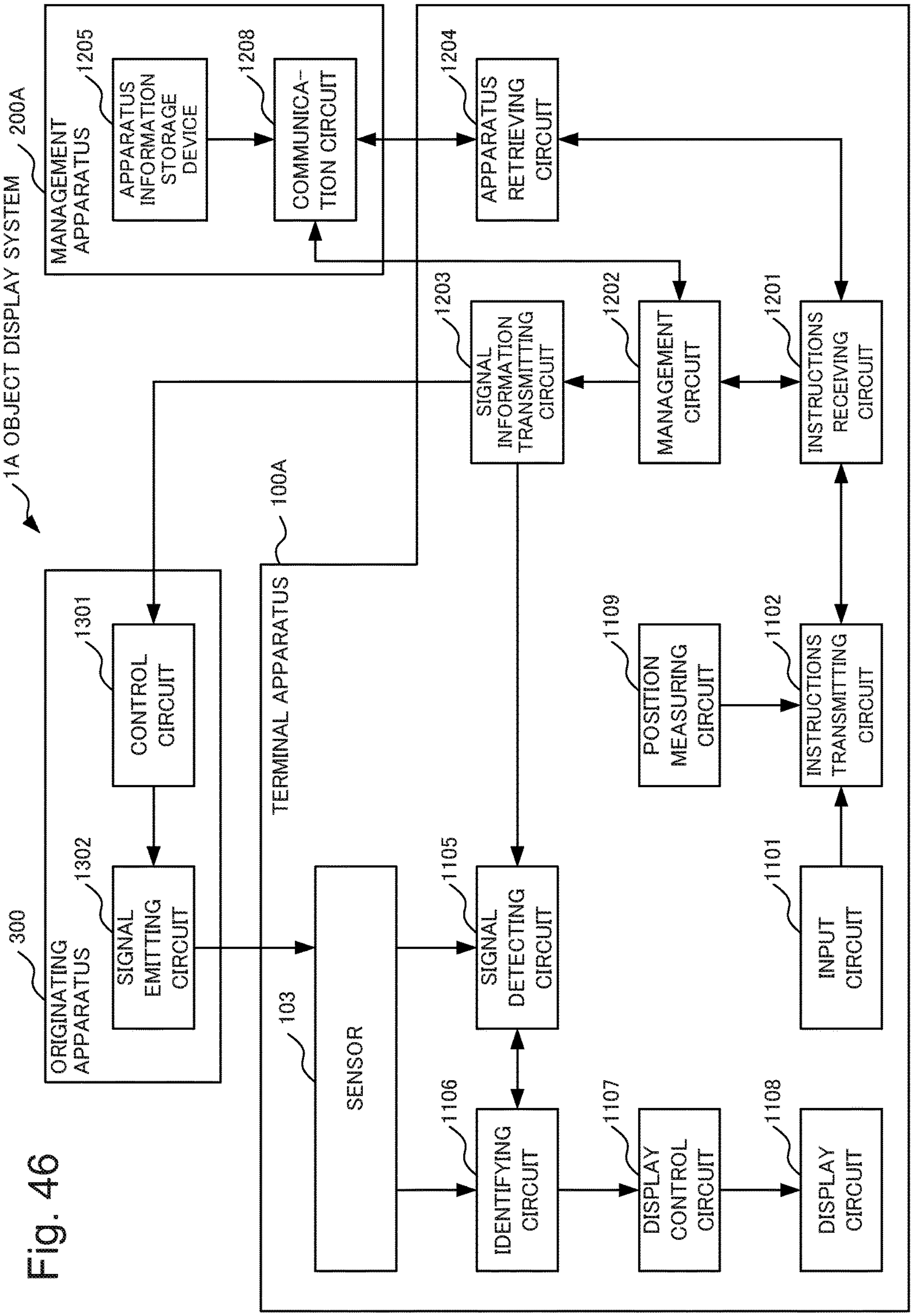
FIG. 46 is a block diagram illustrating a configuration of an object display system implemented by circuits according to the first variation of the first exemplary embodiment of the present invention.
Figure 47:
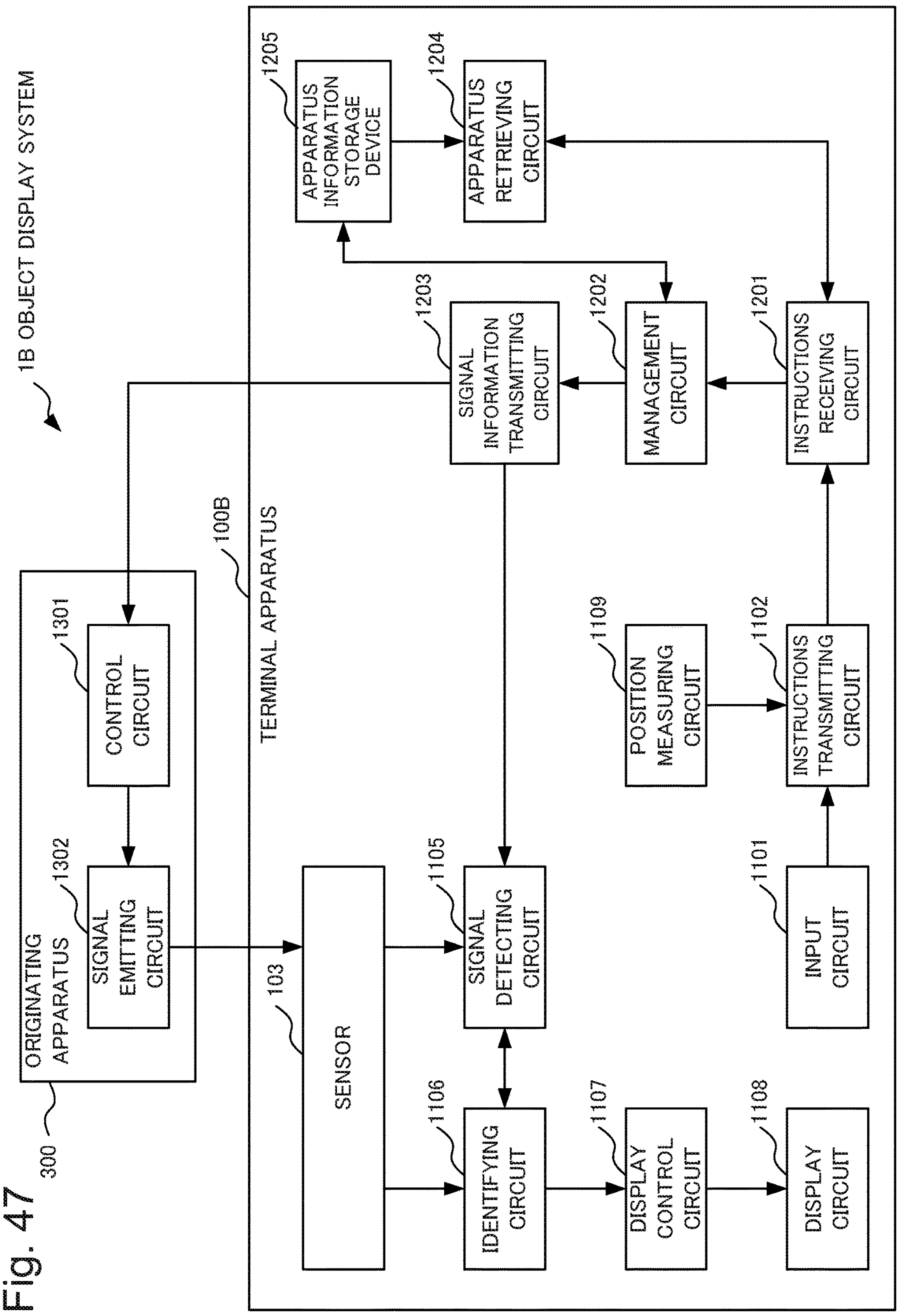
FIG. 47 is a block diagram illustrating a configuration of an object display system implemented by circuits according to the second variation of the first exemplary embodiment of the present invention.
Figure 48:
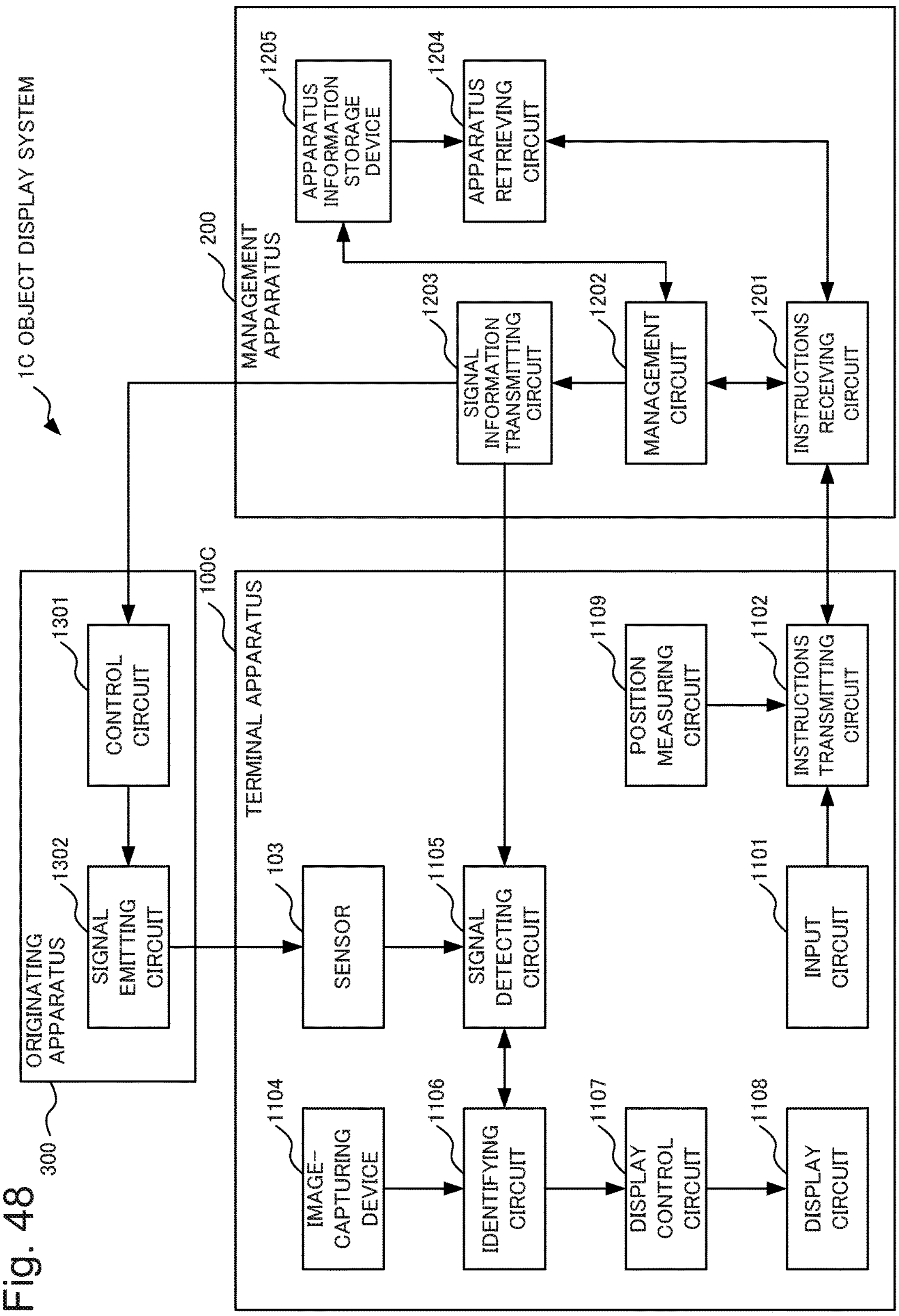
FIG. 48 is a block diagram illustrating a configuration of an object display system implemented by circuits according to the third variation of the first exemplary embodiment of the present invention.
Figure 49:
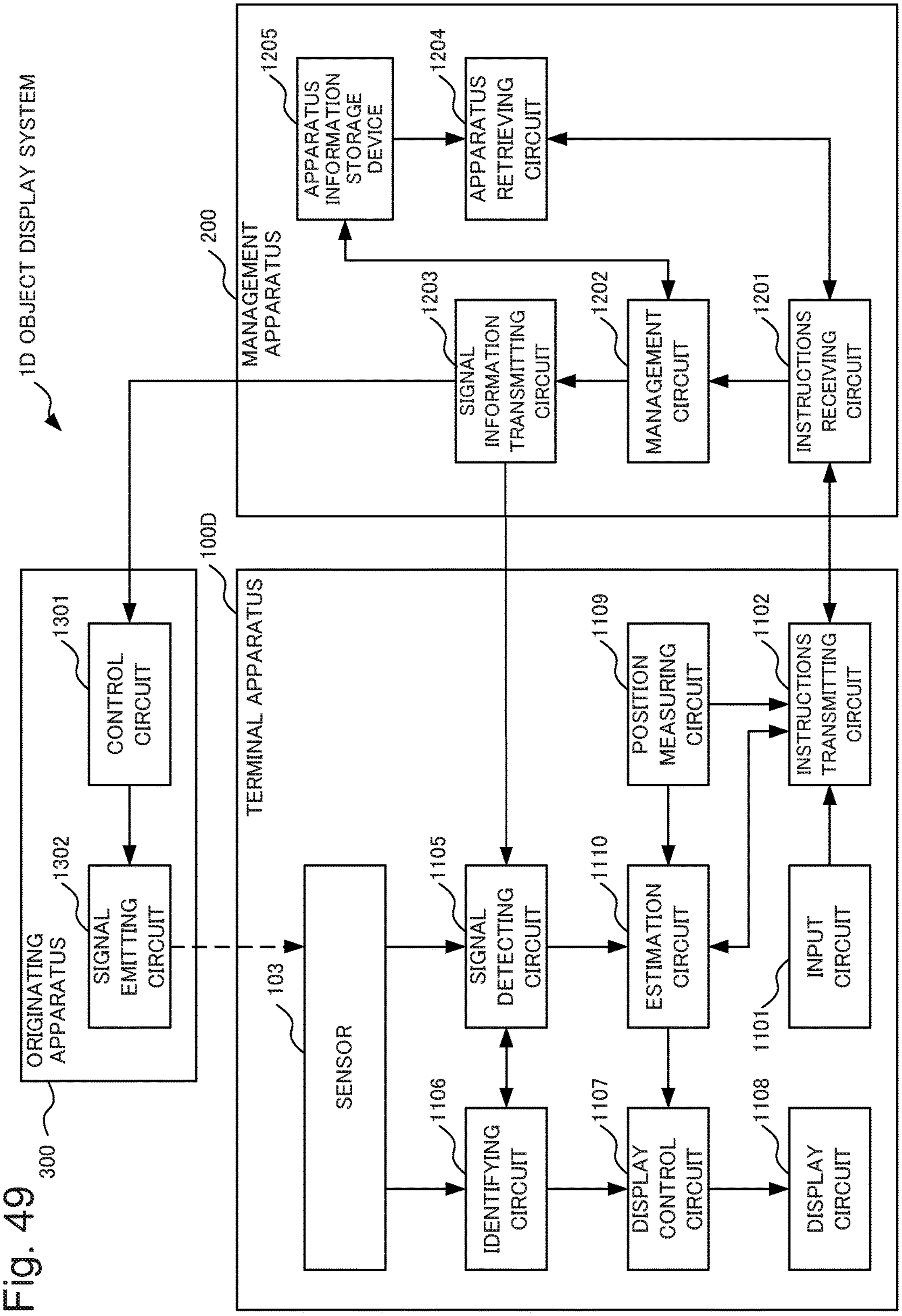
FIG. 49 is a block diagram illustrating a configuration of an object display system implemented by circuits according to the third exemplary embodiment of the present invention.
Figure 50:
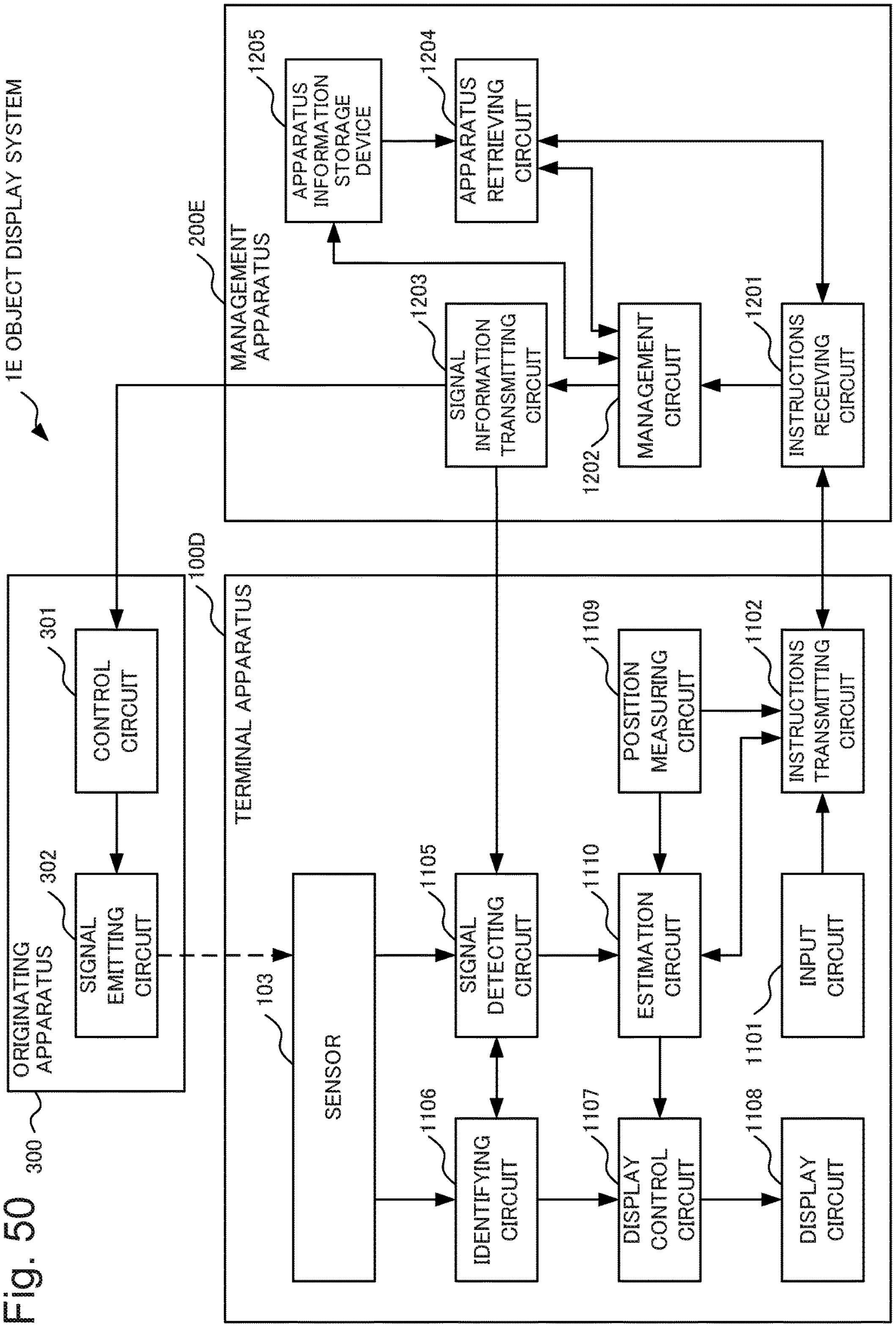
FIG. 50 is a block diagram illustrating a configuration of an object display system implemented by circuits according to the fourth exemplary embodiment of the present invention.
Figure 51:
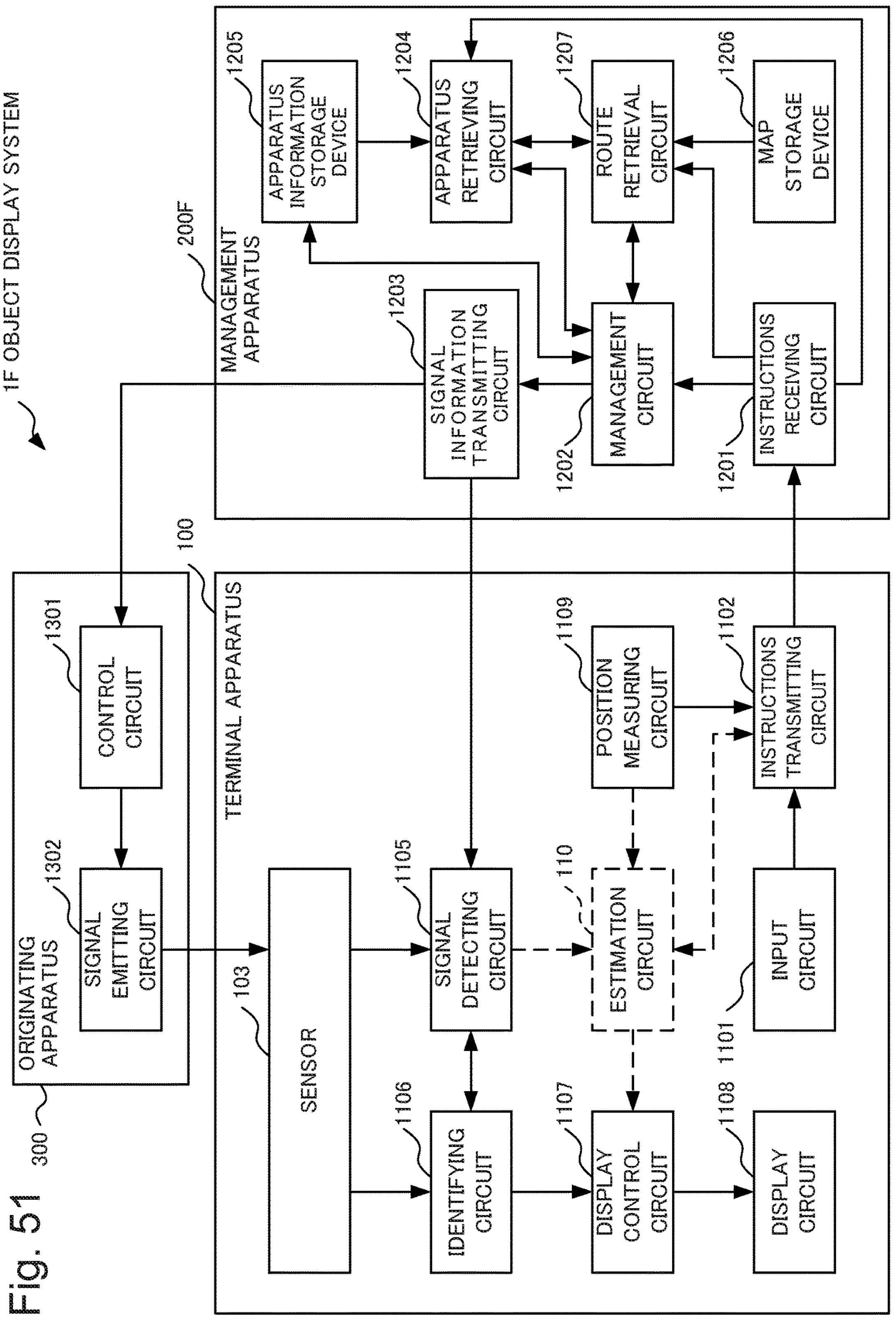
FIG. 51 is a block diagram illustrating a configuration of an object display system implemented by circuits according to the fifth exemplary embodiment of the present invention.
Figure 52:
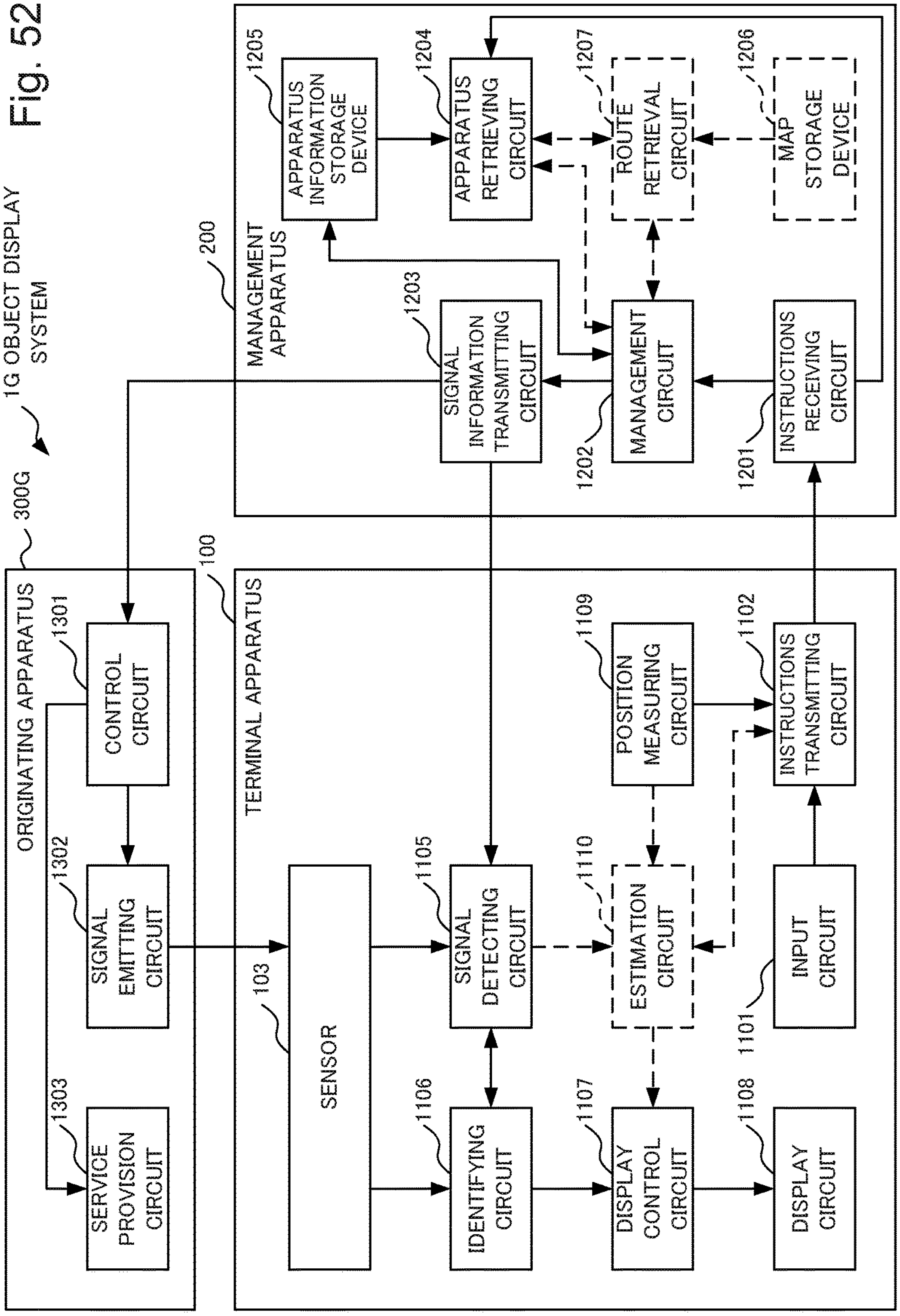
FIG. 52 is a block diagram illustrating a configuration of an object display system implemented by circuits according to the sixth exemplary embodiment of the present invention.
Figure 53:
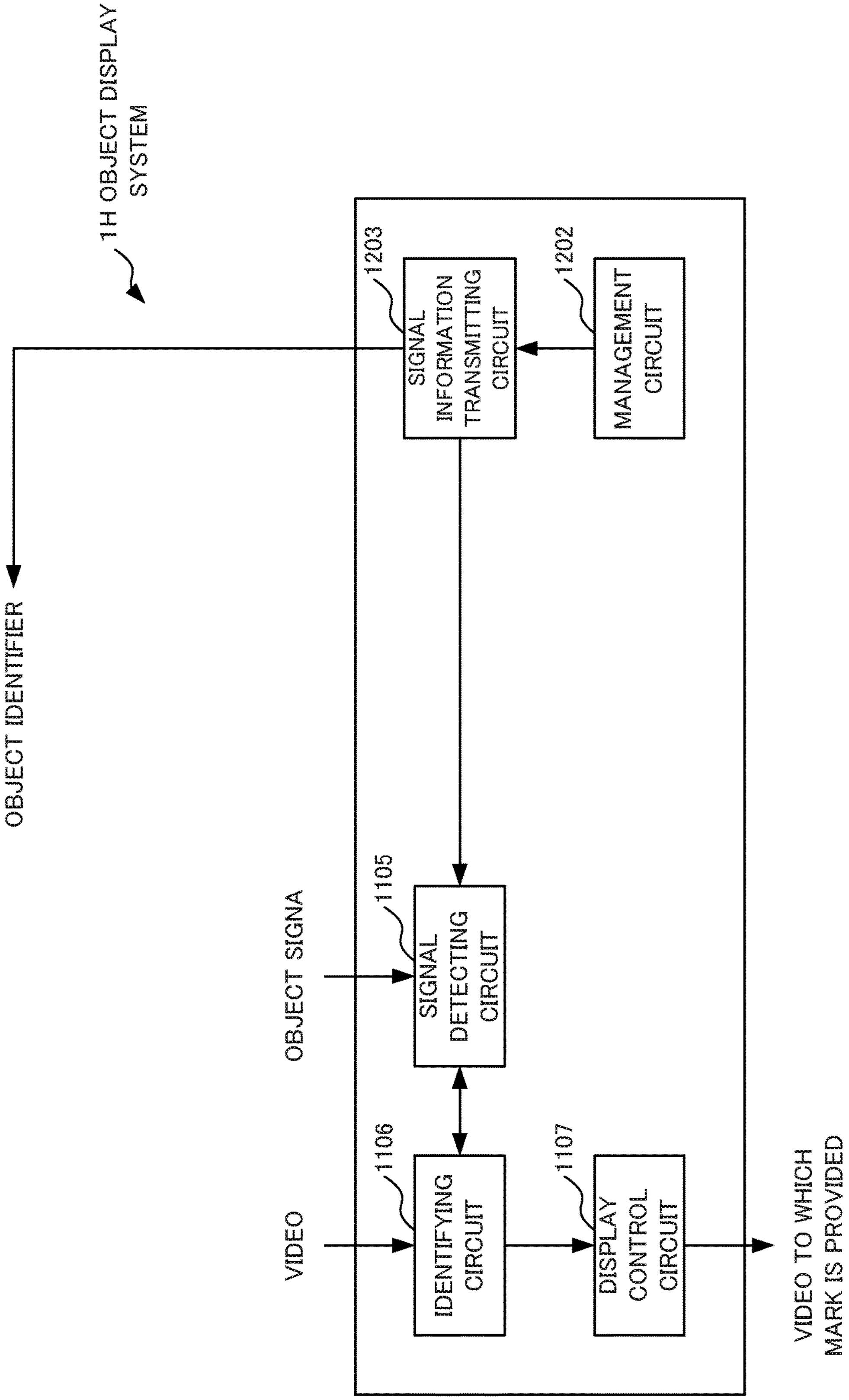
FIG. 53 is a block diagram illustrating a configuration of an object display system implemented by circuits according to the seventh exemplary embodiment of the present invention.

FIG. 45 is a block diagram illustrating a configuration of an object display system implemented by circuits according to the first and second exemplary embodiments of the present invention. FIG. 46 is a block diagram illustrating a configuration of an object display system implemented by circuits according to the first variation of the first exemplary embodiment of the present invention. FIG. 47 is a block diagram illustrating a configuration of an object display system implemented by circuits according to the second variation of the first exemplary embodiment of the present invention. FIG. 48 is a block diagram illustrating a configuration of an object display system implemented by circuits according to the third variation of the first exemplary embodiment of the present invention. FIG. 49 is a block diagram illustrating a configuration of an object display system implemented by circuits according to the third exemplary embodiment of the present invention. FIG. 50 is a block diagram illustrating a configuration of an object display system implemented by circuits according to the fourth exemplary embodiment of the present invention. FIG. 51 is a block diagram illustrating a configuration of an object display system implemented by circuits according to the fifth exemplary embodiment of the present invention. FIG. 52 is a block diagram illustrating a configuration of an object display system implemented by circuits according to the sixth exemplary embodiment of the present invention. FIG. 53 is a block diagram illustrating a configuration of an object display system implemented by circuits according to the seventh exemplary embodiment of the present invention.

In the apparatuses according to each of the exemplary embodiments of the present invention illustrated in these drawings, the input unit 101 is implemented by an input circuit 1101. The input circuit 1101 operates as the input unit 101. The instructions transmitting unit 102 is implemented by an instructions transmitting circuit 1102. The instructions transmitting circuit 1102 operates as the instructions transmitting unit 102. The image-capturing unit 104 is implemented by an image-capturing device 1104. The image-capturing device 1104 operates as the image-capturing unit 104. The display unit 108 is implemented by a display circuit 1108. The display circuit 1108 operates as the display unit 108. The signal detecting unit 105 is implemented by a signal detecting circuit 1105. The signal detecting circuit 1105 operates as the signal detecting unit 105. The identifying unit 106 is implemented by an identifying circuit 1106. The identifying circuit 1106 operates as the identifying unit 106. The display control unit 107 is implemented by a display control circuit 1107. The display control circuit 1107 operates as the display control unit 107. The position measuring unit 109 is implemented by a position measuring circuit 1109. The position measuring circuit 1109 operates as the position measuring unit 109. The estimation unit 110 is implemented by an estimation circuit 1110. The estimation circuit 1110 operates as the estimation unit 110.

The instructions receiving unit 201 is implemented by an instructions receiving circuit 1201. The instructions receiving circuit 1201 operates as the instructions receiving unit 201. The management unit 202 is implemented by a management circuit 1202. The management circuit 1202 operates as the management unit 202. The signal information transmitting unit 203 is implemented by a signal information transmitting circuit 1203. The signal information transmitting circuit 1203 operates as the signal information transmitting unit 203. The apparatus retrieving unit 204 is implemented by an apparatus retrieving circuit 1204. The apparatus retrieving circuit 1204 operates as the apparatus retrieving unit 204. The apparatus information storage unit 205 is implemented by an apparatus information storage device 1205. The apparatus information storage device 1205 operates as the apparatus information storage unit 205. The apparatus information storage device 1205 may be implemented by a circuit. The map storage unit 206 is implemented by a map storage device 1206. The map storage device 1206 operates as the map storage unit 206. The map storage device 1206 may be implemented by a circuit. The route retrieval unit 207 is implemented by a route retrieval circuit 1207. The route retrieval circuit 1207 operates as the route retrieval unit 207. The communication unit 208 is implemented by a communication circuit 1208. The communication circuit 1208 operates as the communication unit 208.

The control unit 301 is implemented by a control circuit 1301. The control circuit 1301 operates as the control unit 301. The signal emitting unit 302 is implemented by a signal originating circuit 1302. The signal originating circuit 1302 operates as the signal emitting unit 302. The service provision unit 303 is implemented by a service provision circuit 1303. The service provision circuit 1303 operates as the service provision unit 303.

The technique in PTL 1 blinks an LED so that a blink pattern may represent an ID uniquely assigned to a marker such as an IP address and a MAC Address of the marker. In other words, in the technique in PTL 1, a blink pattern unique to the marker is assigned to the marker. The technique in PTL 2 assigns a blink pattern unique to an LED marker to the LED marker.

The number of items connected to the Internet increases dramatically as IoT becomes in common. According to the technique in PTL 1, it is necessary to lengthen the ID in order not to overlap the ID when attaching the markers to which IDs are assigned to those items. In that case, the length of the blink pattern indicating the ID also increases. According to the technique of PTL 2, when assigning blink patterns unique to the markers attached to those items, the length of the blink patterns also increases as the number of those items increases.

On the other hand, in a general video camera, the number of captured frames is 30 frames per second. Therefore, the number of times of blink which can be recognized per unit time is limited. Therefore, time required for recognizing a marker by a blink pattern increases according to the increase of the length of blink pattern, i.e. the increase of the number of times of blink of the blink pattern. In other words, with the technique of PTLs 1 and 2, when assigning markers to items connected to the Internet, the increase of time required for recognition of the markers according to the increase of those items may not be prevented.

The present invention has an advantageous effect that the increment in time required for recognizing the object based on the signal sent by the object can be minimized even if the number of object increases.

Although some or all of above-described exemplary embodiments may be described also like the following supplementary notes, the invention is not limited to the followings.

(Supplementary Note 1)

An object display system including:

a management means for generating an object identifier capable of distinguishing an object apparatus to which the object identifier is assigned in a predetermined region;

a signal information transmitting means for transmitting the object identifier generated, to an object apparatus which is an originating apparatus selected from a plurality of originating apparatuses each sending a signal representing the object identifier, in response to reception of the object identifier;

a signal detecting means for detecting the signal representing the object identifier transmitted to the object apparatus as an object signal which is a signal to be sent by the object apparatus, on the basis of on a sensing result by a sensor detecting the signal; an identifying means for identifying an origination region from which the object signal is sent in a captured video; and a display control means for outputting the video in which a mark is provided on the origination region identified in the video.

(Supplementary Note 2)

The object display system according to Supplementary Note 1 further including:

an apparatus information storage means for storing, for each of the originating apparatuses, a position in which the originating apparatus is installed; and an apparatus retrieving means for selecting the originating apparatuses on the basis of positions stored in the apparatus information storage means, wherein the management means generates an identifier for each of support apparatuses which are the originating apparatuses selected, the signal information transmitting means transmits, to each support apparatus, a support identifier which is an identifier generated for the support apparatus, the signal detecting means detects each support signal which is the signal representing the support identifier, and the identifying means identifies a support area in which the support signal is sent in the video.

(Supplementary Note 3)

The object display system according to Supplementary Note 2, wherein the apparatus retrieving means selects a plurality of the support apparatuses according to a distance from the object apparatus on the basis of the positions stored in the apparatus information storage means, when the object signal is not detected, the signal information transmitting means transmits, to each support apparatus, the support identifier generated for the support apparatus, and the identifying means further estimates an area of the object apparatus in the video on the basis of a position in which the object apparatus is installed, a position in which the support apparatus is installed, and the identified support area, and identifies the area as the origination region.

(Supplementary Note 4)

The object display system according to Supplementary Note 2 or 3, further including:

a map storage means for storing map information in a region including the position in which the originating apparatus is installed;

a position measuring means for measuring a position; and a route retrieval means for retrieving a route from the position measured to a position of the object apparatus on the basis of the map information, wherein the management means selects the support apparatuses according to a distance from the route retrieved, and calculates a route distance which is a distance from the position measured on the route for each of the support apparatuses selected, and the display control means outputs the video in which a mark according to the route distance of the support apparatus is provided on an area of the support apparatus identified in the video.

(Supplementary Note 5)

The object display system according to Supplementary Note 1 or 2, further including:

a position measuring means for measuring a position; and a direction measuring means for measuring a direction, wherein the identifying means estimates an area of the object apparatus in the video, and identifies estimated area as the origination region on the basis of the position and the direction measured and a position in which the object apparatus is installed, when the object signal is not detected.

(Supplementary Note 6)

The object display system according to any one of Supplementary Notes 1 to 5, further including an instructions receiving means for receiving a reservation instruction for reserving provision of a service, the reservation instruction being to the object apparatus providing the service, wherein the signal information transmitting means transmits, to the object apparatus which prepares for the service to be provided in response to reception of a preparation instruction, the preparation instruction when the reservation instruction is received.

(Supplementary Note 7)

The object display system according to any one of Supplementary Notes 1 to 6, wherein the signal information transmitting means further transmits a data value representing a frequency range of the signal which can be measured by the sensor to the object apparatus sending the signal at a frequency included in a frequency range when the frequency range is received.

(Supplementary Note 8)

A management apparatus including:

an instructions receiving means for receiving an object apparatus identifier from a terminal apparatus transmitting the object apparatus identifier, the object apparatus identifier identifying an object apparatus which is an originating apparatus selected from originating apparatuses sending a signal representing the object identifier, in response to reception of the object identifier capable of distinguishing the object apparatus to which the object identifier is provided in a predetermined region; and a signal information transmitting means for transmitting the object identifier generated by the management means which generates the object identifier to the object apparatus, wherein the signal information transmitting means further transmits the object identifier to the terminal apparatus, and the terminal apparatus captures a video, detects the signal representing the object identifier on the basis of a sensing result by a sensor which senses the signal in response to reception of the object identifier, identifies a part in which the signal detected is sent in the video captured, and outputs the video in which a mark is provided on the part specified.

(Supplementary Note 9)

The management apparatus according to Supplementary Note 8, including an apparatus information storage means for storing an originating identifier which is the object identifier transmitted to the originating apparatus in association with the originating apparatus, wherein the signal information transmitting means stores the object identifier generated and transmitted to the object apparatus in the apparatus information storage means as the originating identifier transmitted to the object apparatus, in association with the originating apparatus, when the originating identifier is not associated with the object apparatus indicated by the object apparatus identifier received, and transmits the originating identifier which is read from the apparatus information storage means and is associated with the object apparatus to the terminal apparatus when the originating identifier is associated with the object apparatus.

(Supplementary Note 10)

An object display method comprising:

generating an object identifier capable of discriminating an object apparatus to which the object identifier is assigned in a predetermined region;

transmitting the object identifier generated, to an object apparatus which is an originating apparatus selected from a plurality of originating apparatuses each sending a signal representing the object identifier, in response to reception of the object identifier;

detecting the signal representing the object identifier transmitted to the object apparatus as an object signal which is a signal to be sent by the object apparatus, on the basis of on a sensing result by a sensor detecting the signal;

identifying an origination region from which the object signal is sent in a captured video; and outputting a video in which a mark is provided on the origination region specified in the video.

(Supplementary Note 11)

The object display method according to Supplementary Note 10, including:

storing, for each of the originating apparatuses, a position in which the originating apparatus is installed in an apparatus information storage means;

selecting the originating apparatuses on the basis of positions stored in the apparatus information storage means;

generating an identifier for each of support apparatuses which are the originating apparatus selected;

transmitting, to each of support apparatuses, the support identifier which is an identifier generated for the support apparatus;

detecting each support signal which is the signal indicating the support identifier, and identifying a support area in which the support signal is sent in the video.

(Supplementary Note 12)

The object display method according to Supplementary Note 11, including:

selecting a plurality of the support apparatuses according to a distance from the object apparatus on the basis of the positions stored in the apparatus information storage means, wherein when the object signal is not detected, transmitting, to each support apparatus, the support identifier generated for the support apparatus;

estimating an area of the object apparatus in the video on the basis of a position in which the object apparatus is installed, a position in which the support apparatus is installed, and a specified support-signal origination region, and specifies estimated area as the origination region.

(Supplementary Note 13)

The object display method according to Supplementary Note 11 or 12, including:

storing, in a map storage means, map information in a region including the position in which the originating apparatus is installed, measuring a position, retrieving a route from the position measured to a position of the object apparatus on the basis of the map information, selecting the support apparatuses according to a distance from the route retrieved, and calculating a route distance which is a distance from the position measured on the route for each of the route apparatuses selected, and outputting the video in which a mark according to a route distance of the support apparatus is provided on an area of the support apparatus identified in the video.

(Supplementary Note 14)

The object display method according to Supplementary Note 10 or 11, including:

measuring a position, measuring a direction, and estimating an area of the object apparatus in the video on the basis of the position and the direction measured, and a position in which the object apparatus is installed, when the object signal is not detected, and specifies estimated area as the origination region.

(Supplementary Note 15)

The object display method according to any one of Supplementary Notes 10 to 14, including:

receiving a reservation instruction for reserving provision of a service, the reservation instructions being to the object apparatus providing the service, and transmitting, to the object apparatus which prepares for the service to be provided in response to reception of a preparation instruction, the preparation instruction when the reservation instruction is received.

(Supplementary Note 16)

The object display method according to any one of Supplementary Notes 10 to 15, including:

further transmitting a data value representing a frequency range of the signal which can be measured by the sensor to the object apparatus sending the signal at a frequency included in the frequency range when the frequency range is received.

(Supplementary Note 17)

A management method comprising:

receiving an object apparatus identifier from a terminal apparatus transmitting the object apparatus identifier, the object apparatus identifier identifying an object apparatus which is an originating apparatus selected from originating apparatuses sending a signal representing the object identifier, in response to reception of the object identifier capable of distinguishing the object apparatus to which the object identifier is assigned in a predetermined region;

transmitting the object identifier generated by the management means which generates the object identifier to the object apparatus; and further transmitting the object identifier to the terminal apparatus, wherein the terminal apparatus captures a video, detects the signal indicating the object identifier on the basis of a sensing result by a sensor which senses the signal in response to reception of the object identifier, specifies a part in which the signal detected is sent in the video captured, and outputs the video in which a mark is provided on the part identified.

(Supplementary Note 18)

The management method according to Supplementary Note 17, wherein storing an originating identifier which is the object identifier transmitted to the originating apparatus in an apparatus information storage means in association with the originating apparatus, storing the object identifier generated and transmitted to the object apparatus in the apparatus information storage means as the originating identifier transmitted to the object apparatus, in association with the originating apparatus, when the originating identifier is not associated with the object apparatus indicated by the object apparatus identifier received, and transmitting the originating identifier which is read from the apparatus information storage means and is associated with the object apparatus to the terminal apparatus when the originating identifier is associated with the object apparatus.

(Supplementary Note 19)

A recording medium storing a management program causing a computer to execute:

an instructions receiving process for receiving an object apparatus identifier from a terminal apparatus transmitting the object apparatus identifier, the object apparatus identifier identifying the object apparatus which is an originating apparatus selected from the originating apparatuses transmitting a signal indicating the object identifier, in response to reception of the object identifier capable of distinguishing the object apparatus to which the object identifier is assigned in a predetermined region; and a signal information transmitting process for transmitting the object identifier generated by a management means which generates the object identifier to the object apparatus, wherein the signal information transmitting process further transmits the object identifier to the terminal apparatus, and the terminal apparatus captures a video, detects the signal representing the object identifier on the basis of a sensing result by a sensor which senses the signal in response to reception of the object identifier, identifies a part in which the signal detected is sent in the video captured, and outputs the video in which a mark is provided on the part identified.

(Supplementary Note 20)

The recording medium storing the management program according to Supplementary Note 19, the program causing a computer to execute:

storing processing of storing, into an apparatus information storage means for storing an originating identifier which is the object identifier transmitted to the originating apparatus in association with the originating apparatus, the object identifier generated and transmitted to the object apparatus as the originating identifier transmitted to the object apparatus, in association with the originating apparatus, when the originating identifier is not associated with the object apparatus represented by the object apparatus identifier received, and the signal information transmitting process transmitting the originating identifier which is read from the apparatus information storage means and is associated with the object apparatus to the terminal apparatus when the originating identifier is associated with the object apparatus.

The present invention has been described with reference to the exemplary embodiments as above, but the present invention is not limited to the above-mentioned exemplary embodiments. Various changes which can be understood by a person skilled in the art may be applied for the configuration and detail of the present invention within the scope of the present invention.

The invention claimed is:

1. An object display system comprising:

a memory that stores a set of instructions; and a processor configured to execute the set of instructions to:

generate an object identifier capable of distinguishing an object apparatus in a predetermined region, and assign the object identifier to the object apparatus;

transmit the generated object identifier, to the object apparatus via a communication network, the object apparatus being configured to receive the object identifier via the communication network and to send a signal representing the received object identifier;

detect, as an object signal, the signal representing the object identifier transmitted to the object apparatus on the basis of on a sensing result by a sensor detecting the signal, the object signal being a signal to be sent by the object apparatus;

identify, as an estimated position of the object apparatus, an origination region from which the object signal is sent in a captured video;

output the video in which a mark is provided on the origination region identified in the video, the mark indicating the estimated position of the object apparatus in the video, wherein the object apparatus is selected from originating apparatuses each of which is configured to receive an identifier via the communication network and to send a signal representing the received identifier, and the processor further configured to execute the set of instructions to select a support apparatus from the originating apparatuses on the basis of positions of the originating apparatuses, the positions being stored in apparatus information storage.

2. The object display system according to claim 1, wherein the processor further configured to execute the set of instructions to:

generate a support identifier for the support apparatus;

transmit the support identifier to the support apparatus;

detect a support signal which is a signal representing the support identifier; and identify a support area in which the support signal is sent in the video.

3. The object display system according to claim 2, wherein the processor further configured to execute the set of instructions to:

select a plurality of support apparatuses according to a distances from the object apparatus to the originating apparatuses on the basis of the positions stored in the apparatus information storage; and, when the object signal is not detected, transmit, to the plurality of support apparatuses, support identifiers generated for the plurality of support apparatuses via the communication network, identify the support area in which the support signal is sent in the video, the support signal representing a support identifier included in the support identifiers, and estimate an area of the object apparatus in the video on the basis of a position in which the object apparatus is installed, positions in which the plurality of support apparatuses are installed, and the specified support area, and identify the area as the origination region.

4. The object display system according to claim 2, wherein the processor further configured to execute the set of instructions to:

measure a position;

search for a route from the position measured to a position of the object apparatus on the basis of map information stored in map storage, the map information being of a region including positions of the originating apparatuses;

select support apparatuses from the originating apparatuses according to distances from the route to the originating apparatuses, and calculate a route distances which are distances along the route from the position measured to the support apparatuses selected;

transmit, to the support apparatuses, support identifiers generated for the support apparatuses via the communication network, identify the support areas in which the support signals are send in the video, the support signals each representing the support identifiers; and output the video in which marks based on the route distances of the support apparatuses are superimposed on the support areas of the support apparatuses identified in the video, the marks representing a guide toward the object apparatus.

5. The object display system according to claim 1, wherein the processor further configured to execute the set of instructions to:

measure a position;

measure a direction; and estimate, when the object signal is not detected, an area of the object apparatus in the video on the basis of the measured position, the measured direction and a position in which the object apparatus is installed, and identify estimated area as the origination region.

6. The object display system according to claim 1, wherein the processor further configured to execute the set of instructions to:

receive a reservation instruction to reserve provision of a service, the reservation instruction being directed to the object apparatus providing the service; and transmit a preparation instruction to the object apparatus via the communication network when the reservation instruction is received, the preparation instruction being an instruction to prepare for a service, the object apparatus being configured to prepare for the service to be provided in response to reception of the preparation instruction.

7. A management apparatus comprising:

a memory that stores a set of instructions; and a processor configured to execute the set of instructions to:

receive an object apparatus identifier from a terminal apparatus transmitting the object apparatus identifier via an communication network, the object apparatus identifier identifying an object apparatus which is an originating apparatus selected from originating apparatuses each sending signals representing object identifiers in response to reception of the object identifiers, the object identifiers each being capable of distinguishing the object apparatuses to which the object identifiers are assigned in a predetermined region;

generate an object identifier assigned to the object apparatus identified by the object apparatus identifier;

transmit the generated object identifier to the object apparatus via the communication network;

further transmit the object identifier to the terminal apparatus via the communication network, wherein the terminal apparatus captures a video, detects the signal representing the object identifier on the basis of a sensing result by a sensor which senses the signal in response to reception of the object identifier via the communication network, identifies, as an estimated position of the object apparatus, a part in which the signal detected is sent in the video captured, and outputs the video in which a mark is provided on the part identified, the object apparatus is selected from originating apparatuses each of which is configured to receive an identifier via the communication network and to send a signal representing the received identifier, and the processor further configured to execute the set of instructions to select a support apparatus from the originating apparatuses on the basis of positions of the originating apparatuses, the positions being stored in apparatus information storage.

8. The management apparatus according to claim 7, further comprising:

apparatus information storage storing an originating identifier, which is the object identifier transmitted to the originating apparatus, the object identifier being associated with the originating apparatus, wherein the processor further configured to execute the set of instructions to:

associate the object identifier generated and transmitted to the object apparatus with the object apparatus indicated by the object apparatus identifier received and store the object identifier in the apparatus information storage as the originating identifier transmitted to the object apparatus, when the originating identifier is not associated with the object apparatus indicated by the object apparatus identifier received; and read out the originating identifier associated with the object apparatus from the apparatus information storage and transmit the originating identifier to the terminal apparatus via the communication network, when the originating identifier is associated with the object apparatus.

9. An object display method comprising:

generating an object identifier capable of discriminating an object apparatus in a predetermined region, and assign the object identifier to the object apparatus;

transmitting the generated object identifier to the object apparatus via a communication network, the object apparatus being configured to receive the object identifier via the communication network and send a signal representing the received object identifier;

detecting, as an object signal the signal representing the object identifier transmitted to the object apparatus on the basis of on a sensing result by a sensor detecting the signal, the object signal being a signal to be sent by the object apparatus;

identifying an origination region from which the object signal is sent in a captured video;

outputting a video in which a mark is provided on the origination region specified in the video, wherein the object apparatus is selected from originating apparatuses each of which is configured to receive an identifier via the communication network and to send a signal representing the received identifier, and the object display method further comprises selecting a support apparatus from the originating apparatuses on the basis of positions of the originating apparatuses, the positions being stored in apparatus information storage.

* * * * *

UNITED STATES PATENT AND TRADEMARK OFFICE
CERTIFICATE OF CORRECTION

PATENT NO. : 9,959,469 B2
APPLICATION NO. : 14/993629
DATED : May 1, 2018
INVENTOR(S) : Yusuke Inutsuka Page 1 of 1

It is certified that error appears in the above-identified patent and that said Letters Patent is hereby corrected as shown below:

In the Claims

Column 63, Claim 3, Line 19; after "to", delete "a"

Signed and Sealed this
Eighth Day of January, 2019

Andrei Iancu
*Director of the United States Patent and Trademark Office*